United States Patent [19]

Nickolls et al.

[11] Patent Number: 5,280,474
[45] Date of Patent: Jan. 18, 1994

[54] SCALABLE PROCESSOR TO PROCESSOR AND PROCESSOR-TO-I/O INTERCONNECTION NETWORK AND METHOD FOR PARALLEL PROCESSING ARRAYS

[75] Inventors: John R. Nickolls, Los Altos; John Zapisek, Cupertino; Won S. Kim, Fremont; Jeffery C. Kalb, Saratoga; W. Thomas Blank; Eliot Wegbreit, both of Palo Alto; Kevin Van Horn, Mountain View, all of Calif.

[73] Assignee: Maspar Computer Corporation, Sunnyvale, Calif.

[21] Appl. No.: 461,492

[22] Filed: Jan. 5, 1990

[51] Int. Cl.$^5$ ............................................ H04L 12/56
[52] U.S. Cl. ..................................... 370/60; 370/94.1; 371/49.3
[58] Field of Search ............... 370/60, 85.9, 85.11, 370/85.12, 85.13, 85.14, 94.1, 94.3; 364/133, 200, 229.2; 371/11.2, 38.1, 48, 49, 149.3; 340/825.02, 825.79, 825.8, 85.85; 395/800, 325, 425, 375

[56] References Cited

U.S. PATENT DOCUMENTS

| | | | |
|---|---|---|---|
| 3,800,289 | 3/1974 | Batcher | 395/425 |
| 3,812,467 | 5/1974 | Batcher | 395/800 |
| 3,863,233 | 1/1975 | Eddey et al. | 365/50 |
| 3,936,806 | 2/1976 | Batcher | 395/800 |
| 3,987,419 | 10/1976 | Morrill et al. | 395/325 |
| 4,314,349 | 2/1982 | Batcher | 364/716 |
| 4,316,244 | 2/1982 | Grondalski | 395/425 |
| 4,447,877 | 5/1984 | Grondalski | 395/325 |
| 4,462,073 | 7/1984 | Grondalski | 395/375 |
| 4,598,400 | 7/1986 | Hillis | 370/94.1 |
| 4,709,327 | 11/1987 | Hillis et al. | 395/375 |
| 4,773,038 | 9/1988 | Hillis et al. | 395/500 |
| 4,791,641 | 12/1988 | Hillis | 371/376 |
| 4,797,882 | 1/1989 | Maxemchuk | 370/94.1 |
| 4,805,091 | 2/1989 | Thiel et al. | 395/800 |
| 4,805,173 | 2/1989 | Hillis et al. | 371/40.1 |
| 4,827,403 | 5/1989 | Steele, Jr. et al. | 395/800 |
| 4,890,281 | 12/1989 | Balboni et al. | 370/60 |
| 4,893,303 | 1/1990 | Nakamura | 370/60 |
| 4,920,484 | 4/1990 | Ranade | 370/60 |
| 4,922,486 | 5/1990 | Lidinsky et al. | 370/60 |
| 4,974,224 | 11/1990 | Boone | 370/94.1 |
| 4,979,165 | 12/1990 | Dighe et al. | 370/94.1 |
| 4,983,962 | 1/1991 | Hammerstrom | 340/825.02 |
| 4,984,235 | 1/1991 | Hillis et al. | 370/60 |
| 5,001,702 | 3/1991 | Teraslinna et al. | 370/60 |
| 5,031,139 | 7/1991 | Sinclair | 370/60 |

FOREIGN PATENT DOCUMENTS

WO88/06764 9/1988 PCT Int'l Appl. .

OTHER PUBLICATIONS

An Interconnection Scheme for a tightly coupled massively parralled computer network, J. D. Harris and H.E.T. Connell, 1985, IEEE.

"Eight Thousand Heads Are Better", *New Developments*, High Technology Business, Sep./Oct. 1989, p. 6.

Primary Examiner—Douglas W. Olms
Assistant Examiner—Dang Ton
Attorney, Agent, or Firm—Skjerven, Morrill, MacPherson, Franklin & Friel

[57] ABSTRACT

A massively parallel computer system is disclosed having a global router network in which pipeline registers are spatially distributed to increase the messaging speed of the global router network. The global router network includes an expansion tap for processor to I/O messaging so that I/O messaging bandwidth matches interprocessor messaging bandwidth. A route-opening message packet includes protocol bits which are treated homogeneously with steering bits. The route-opening packet further includes redundant address bits for imparting a multiple-crossbars personality to router chips within the global router network. A structure and method for spatially supporting the processors of the massively parallel system and the global router network are also disclosed.

11 Claims, 34 Drawing Sheets

150

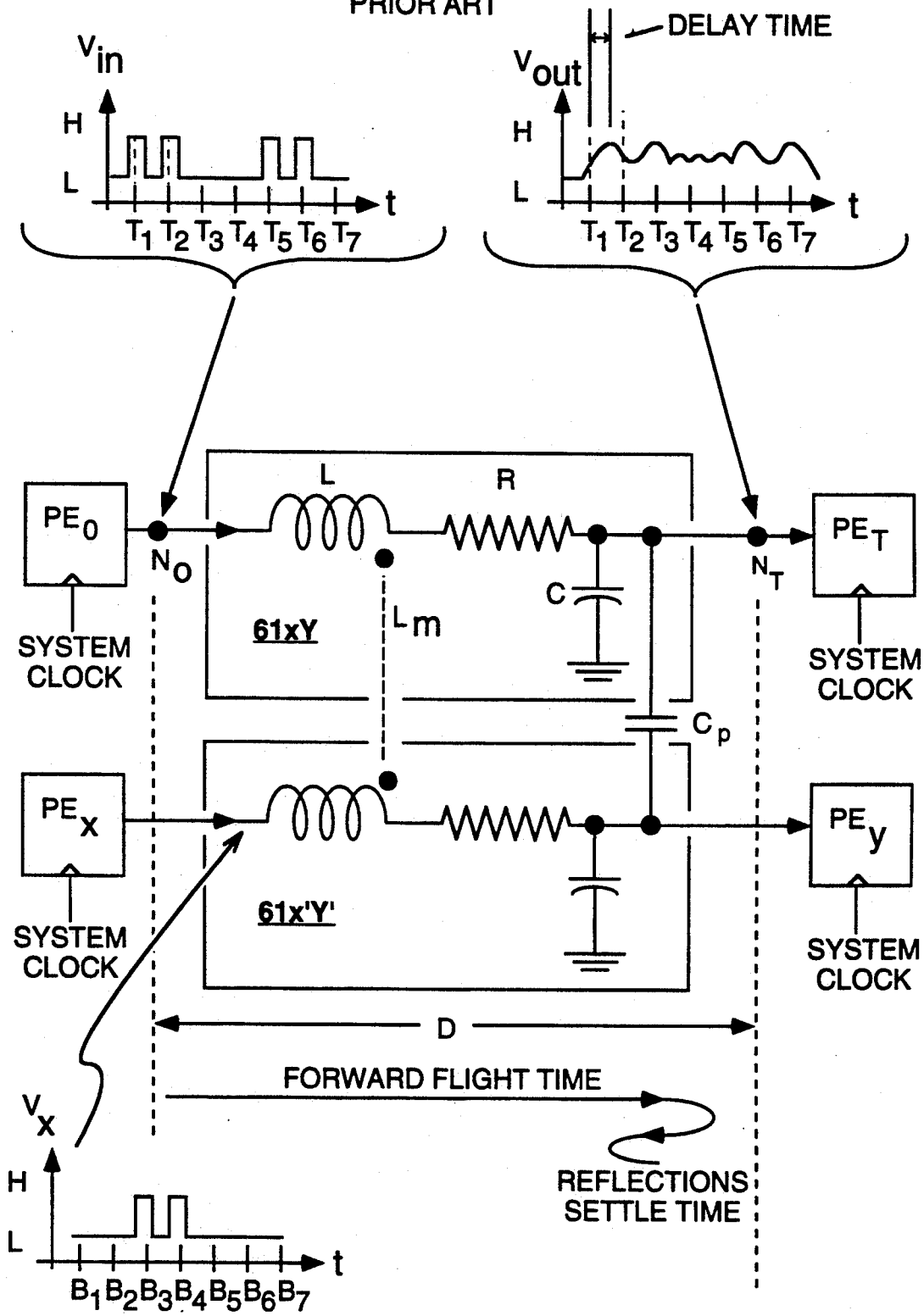

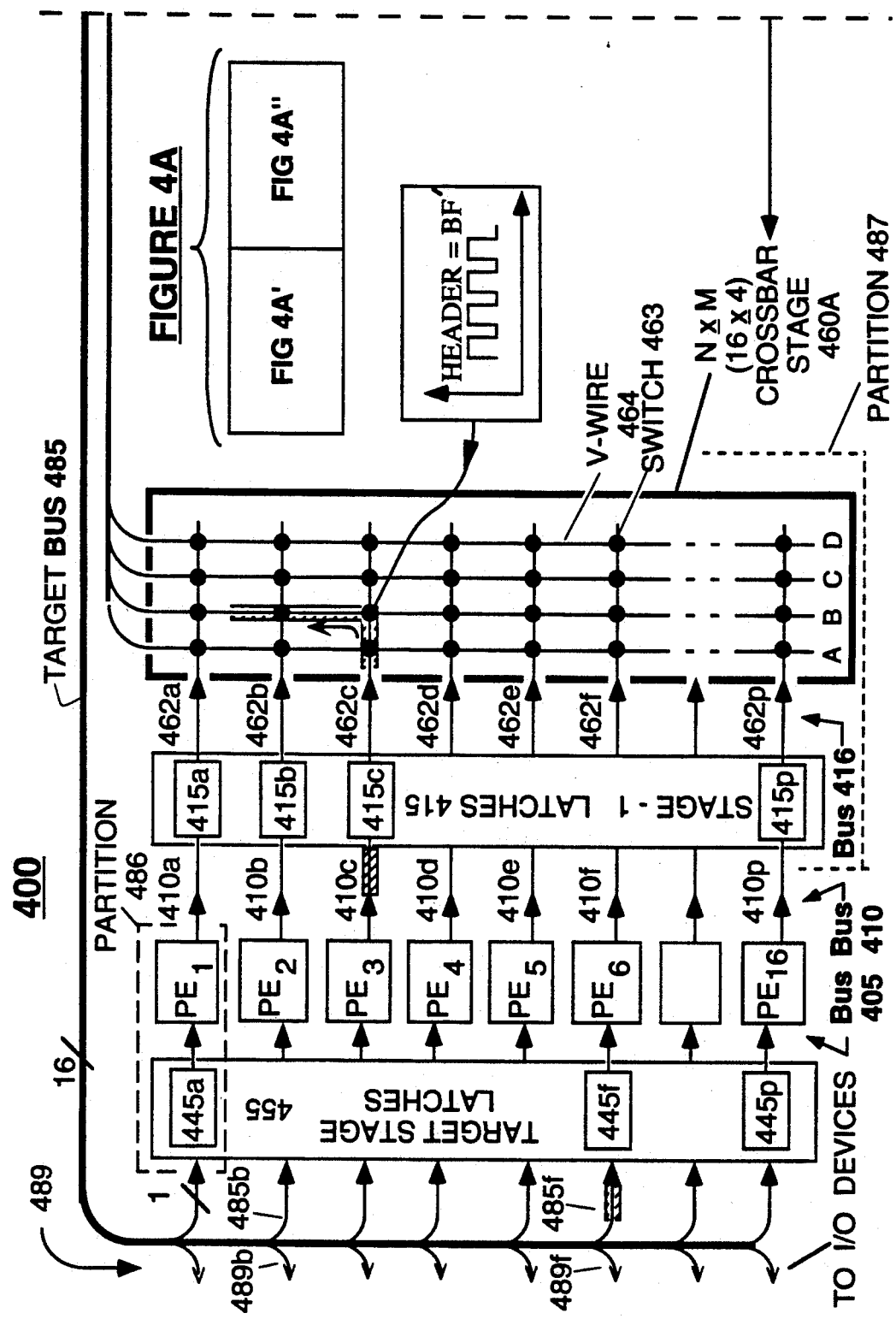

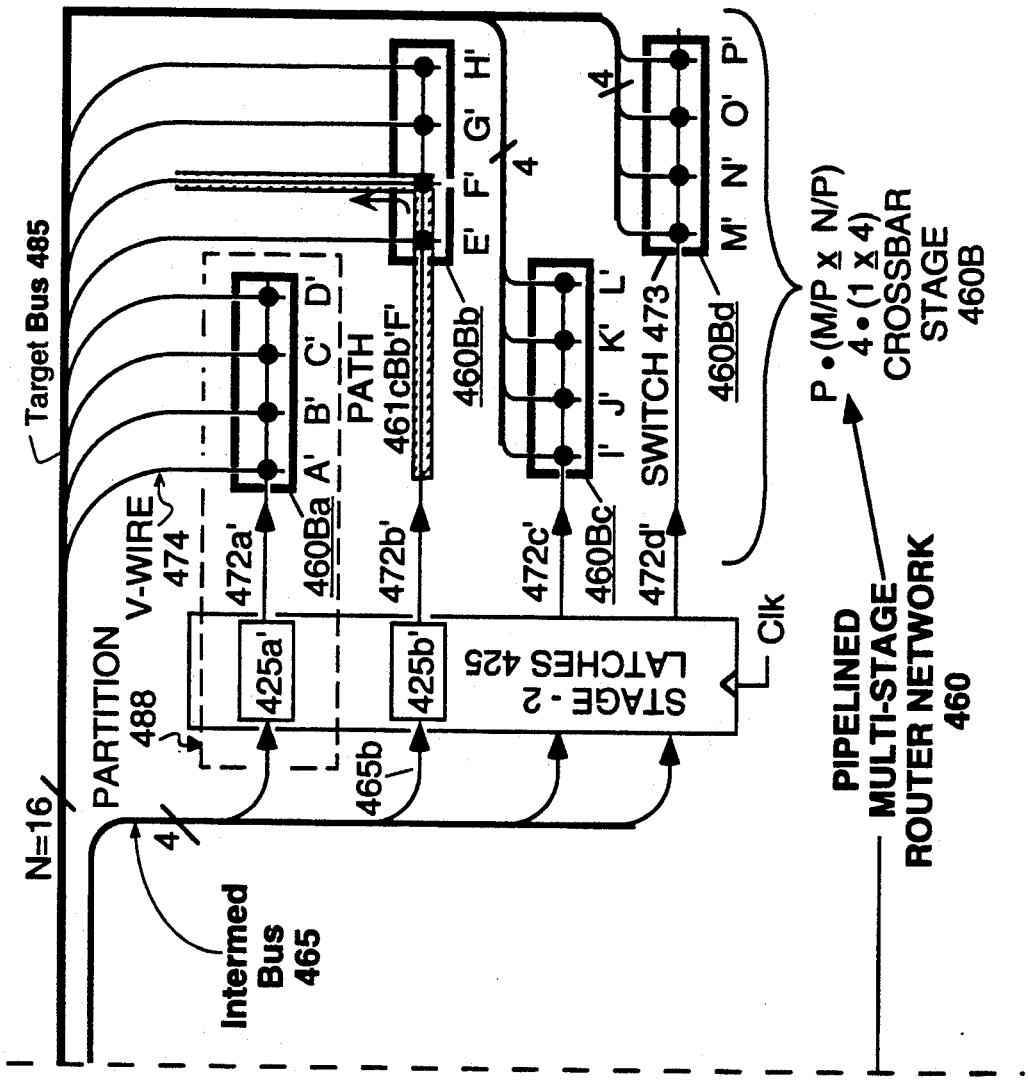
FIGURE 4A"

FIGURE 4B

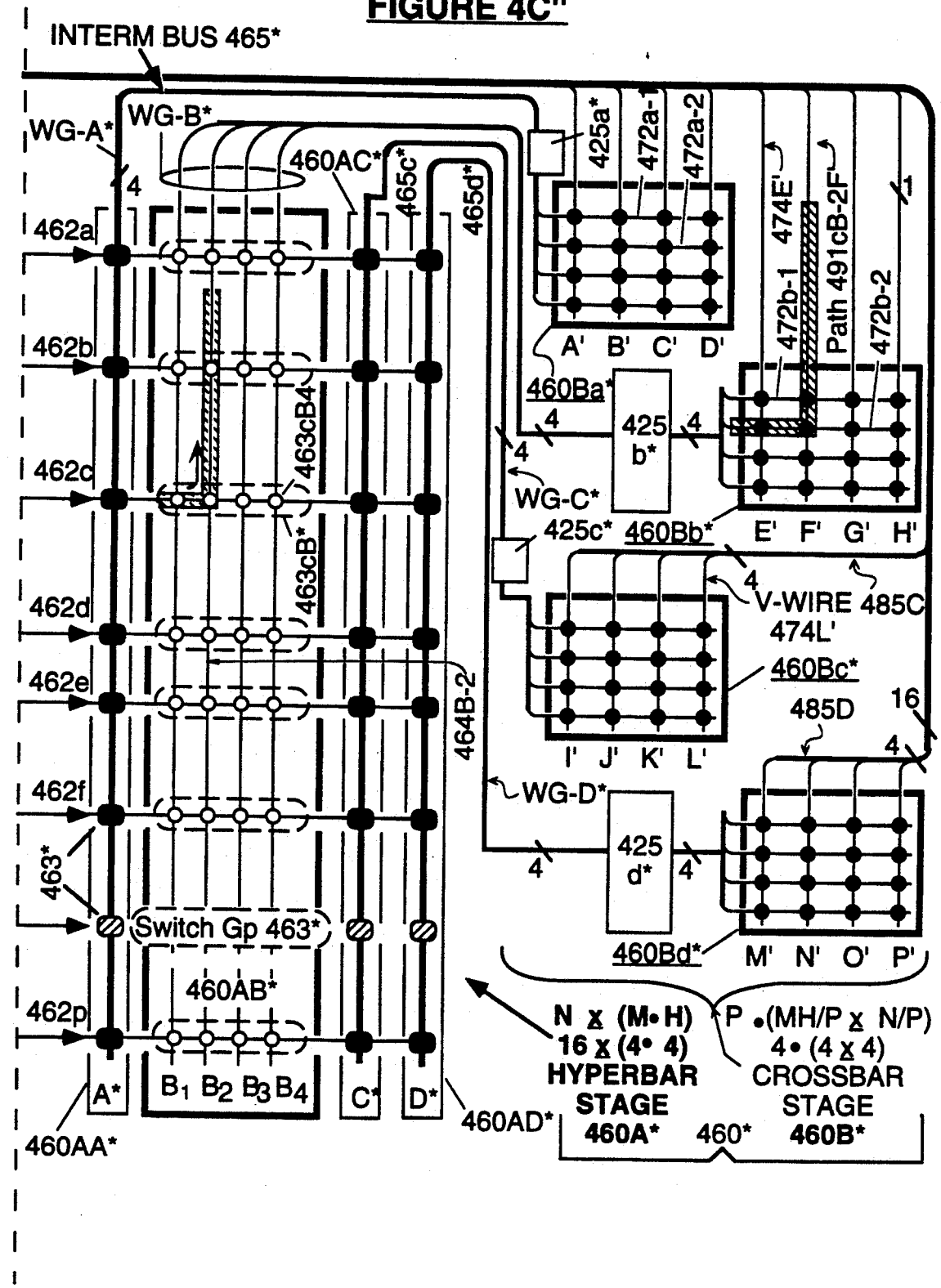
FIGURE 4C"

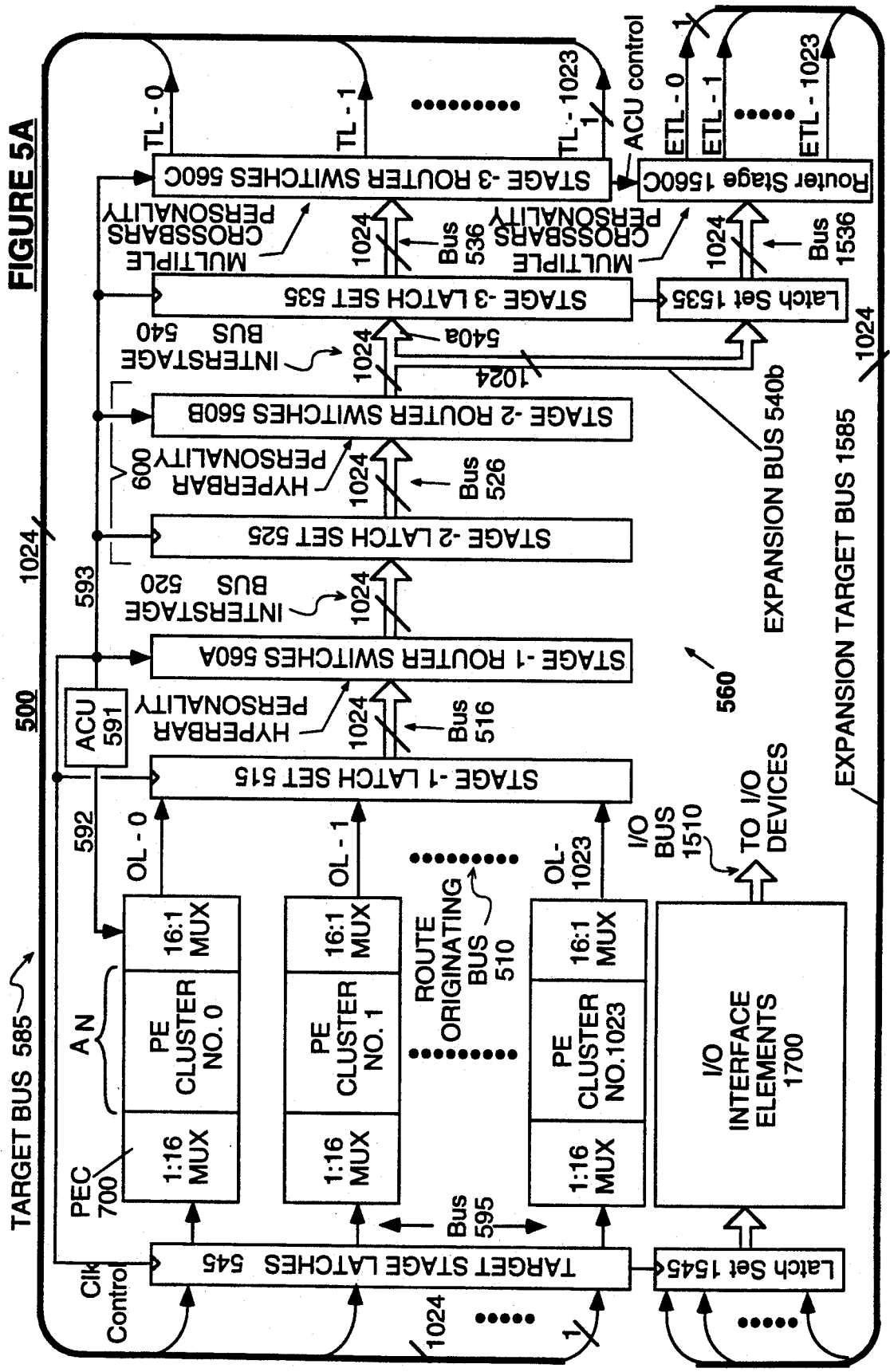

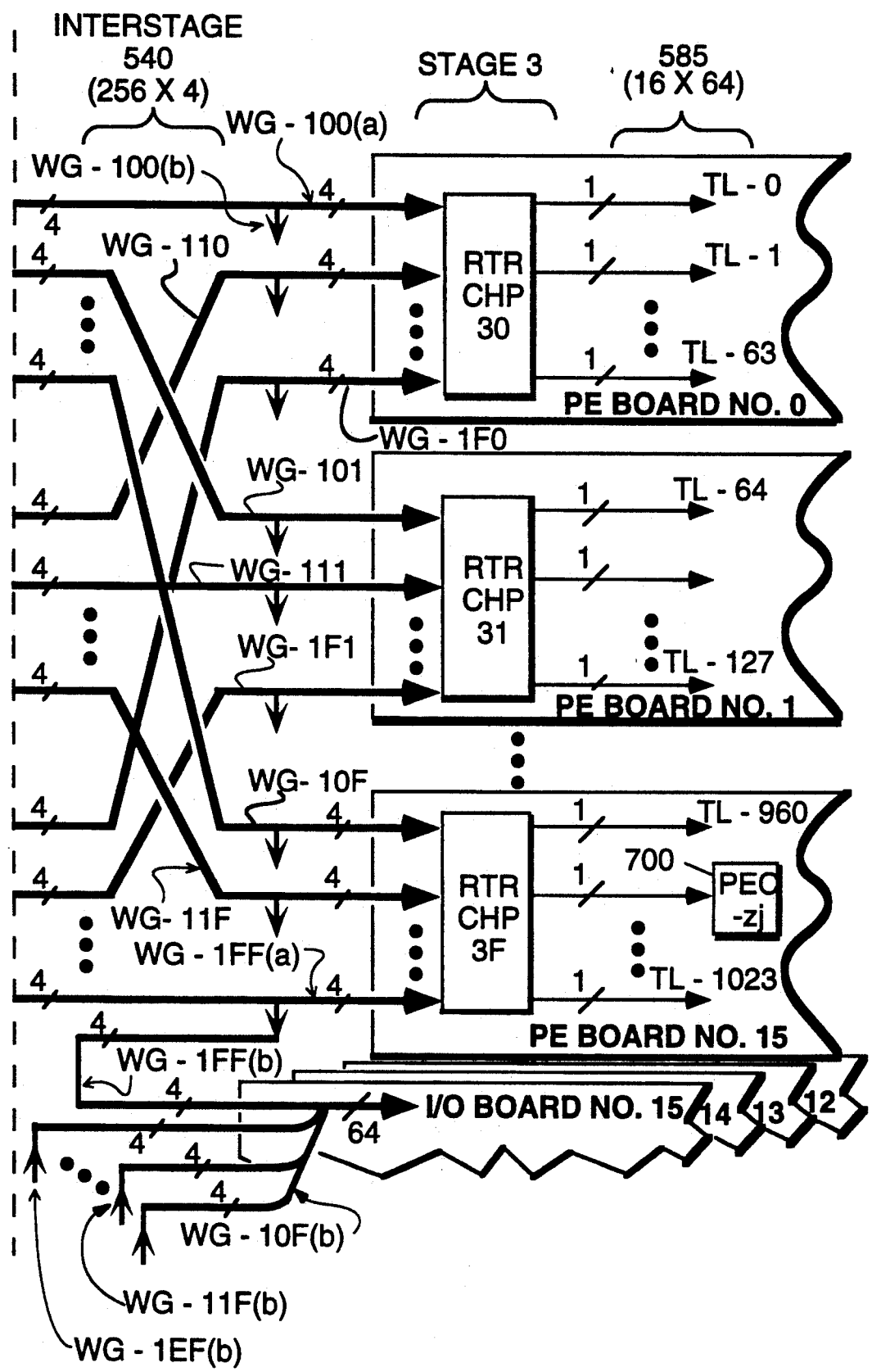
FIGURE 5B"

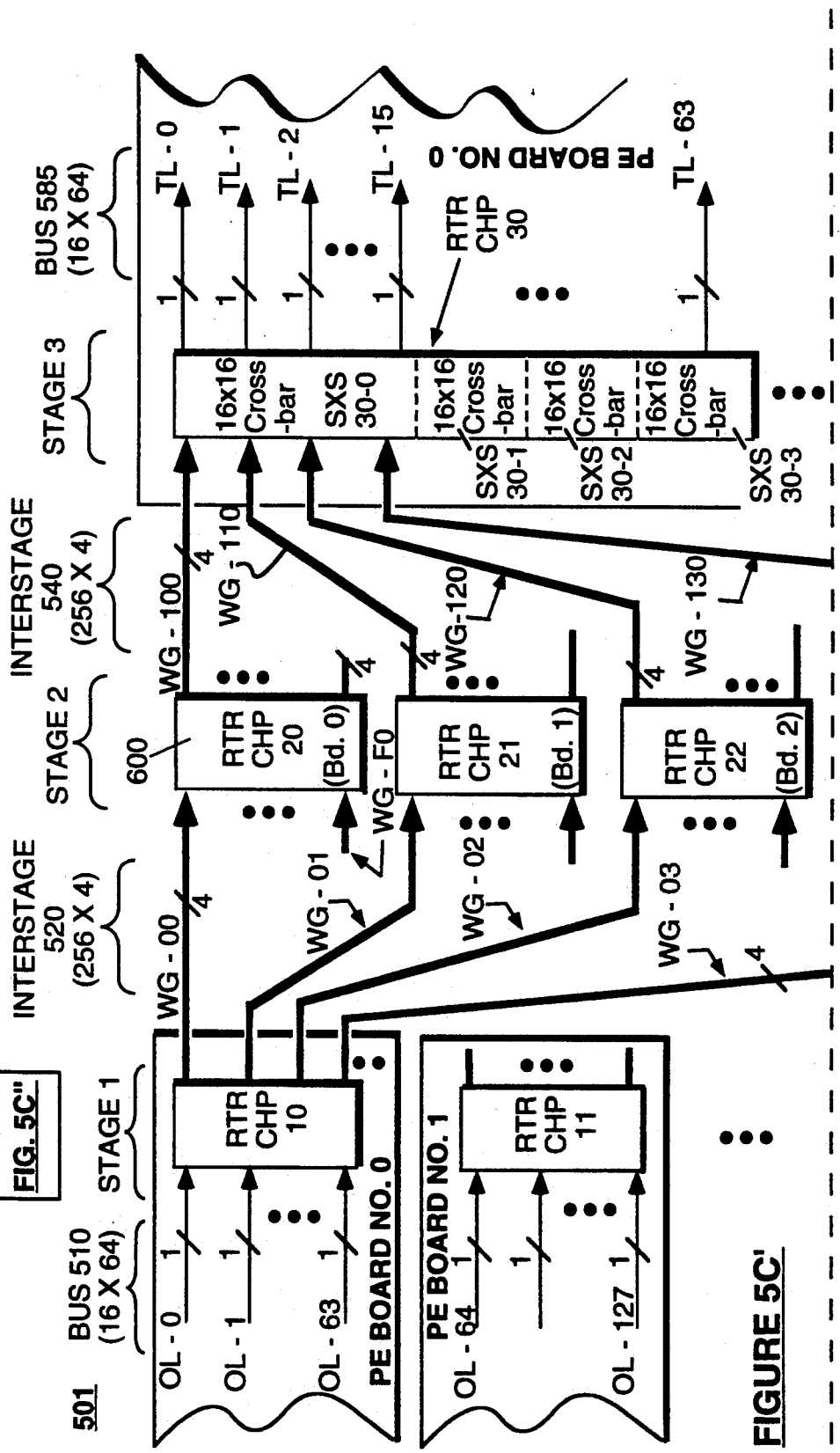

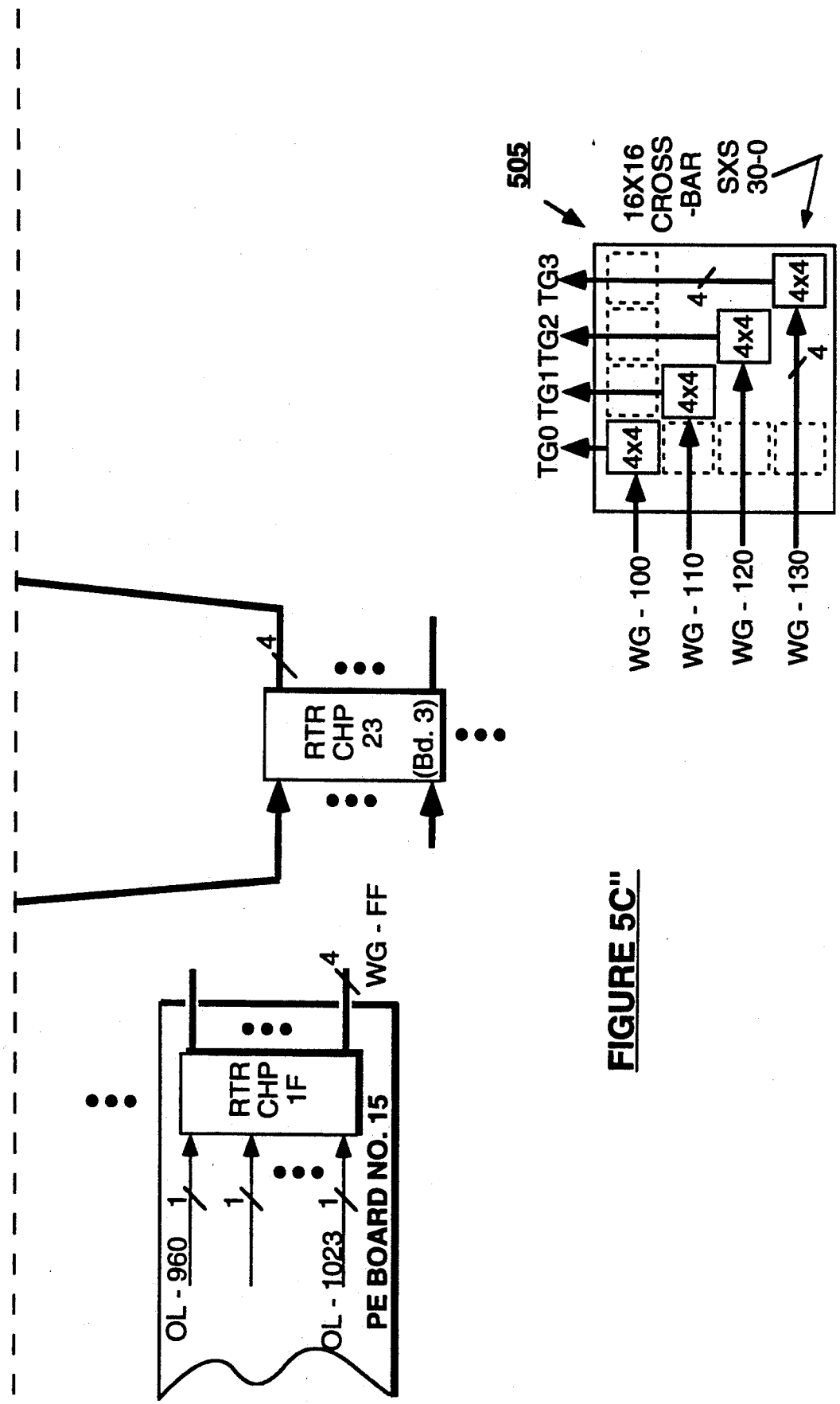
FIGURE 5C"

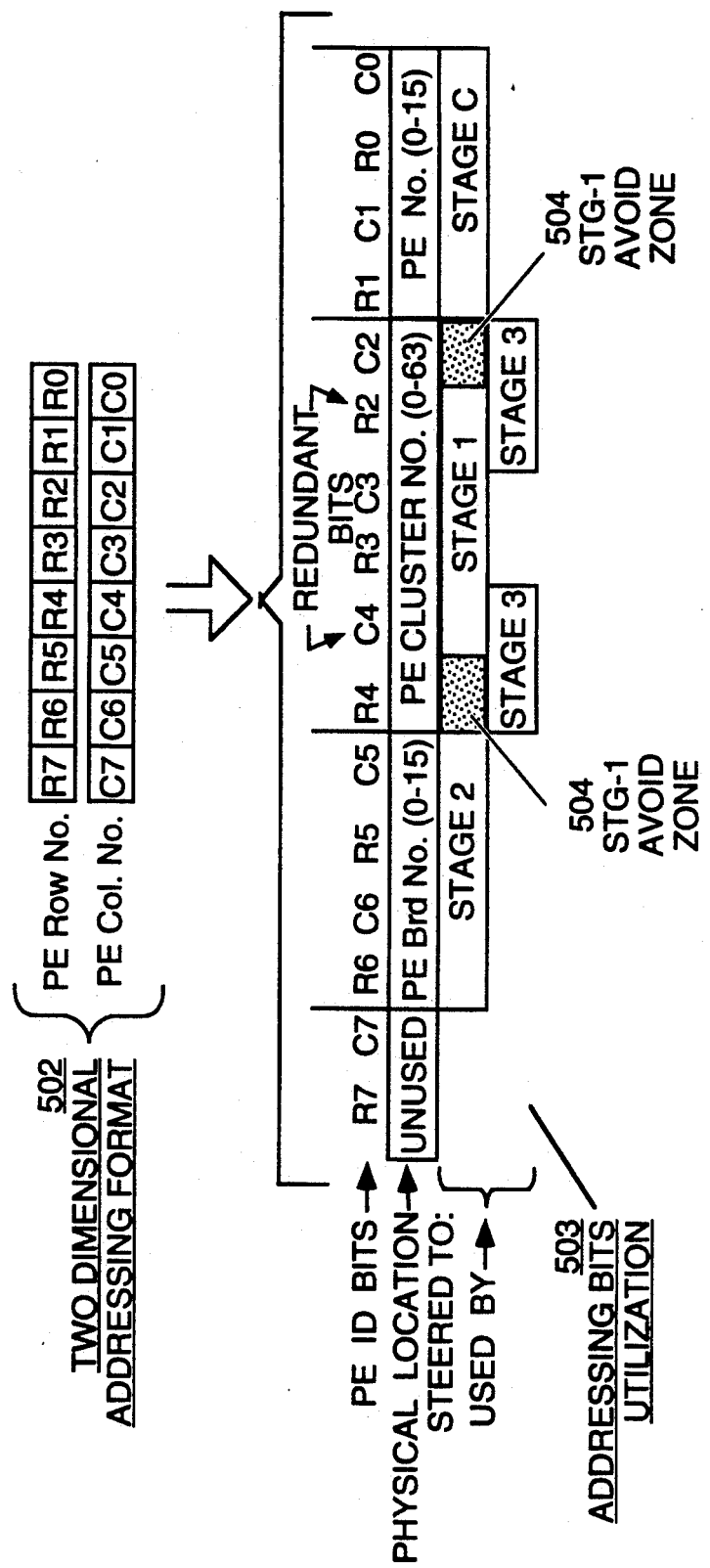

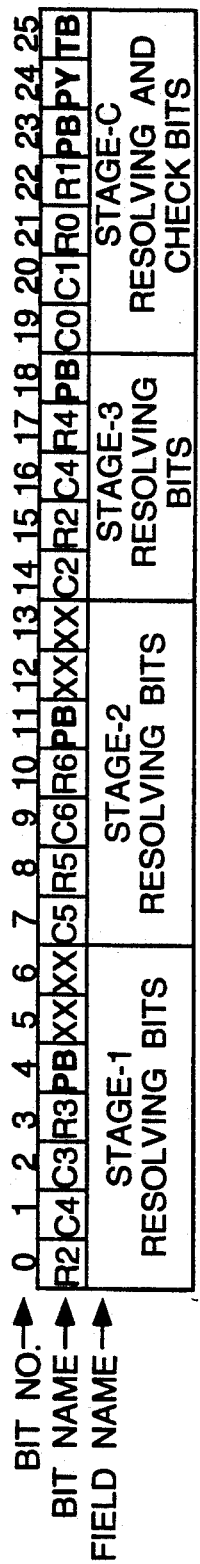
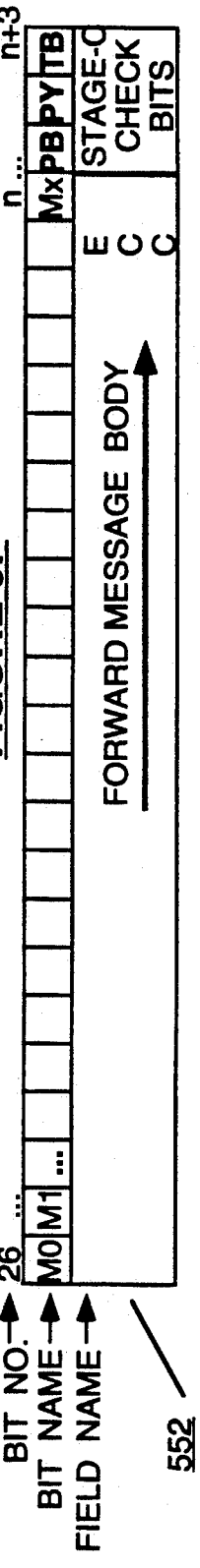
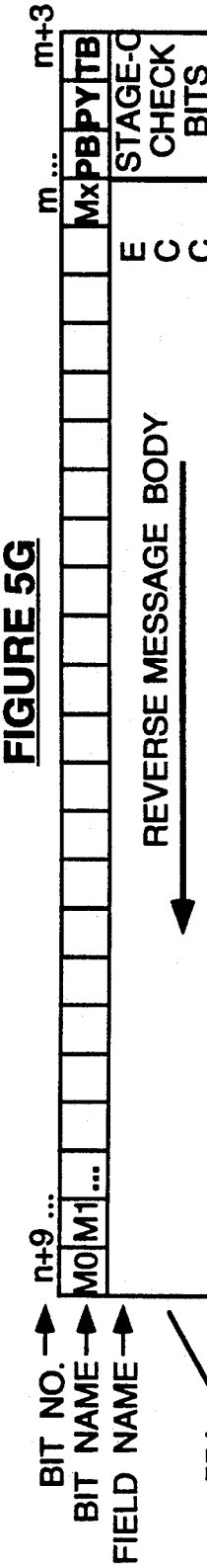

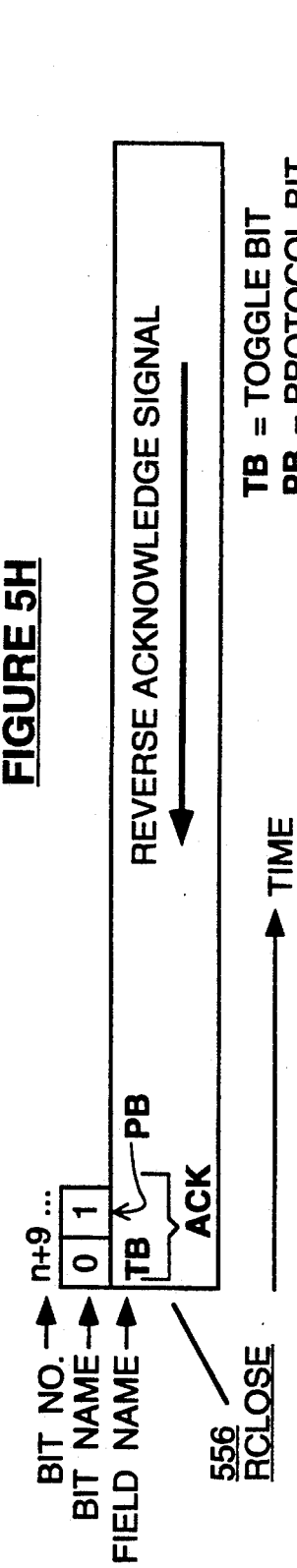
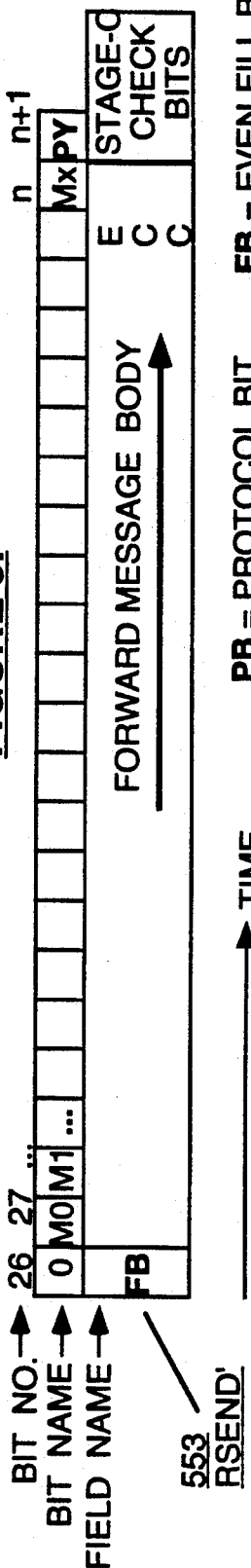
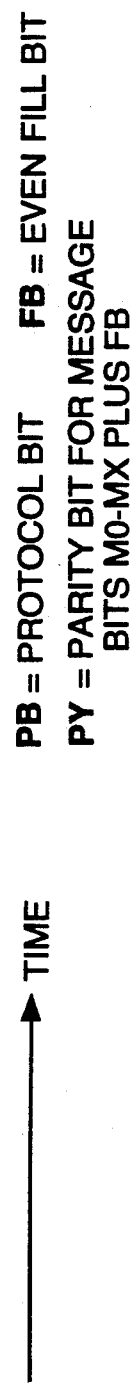
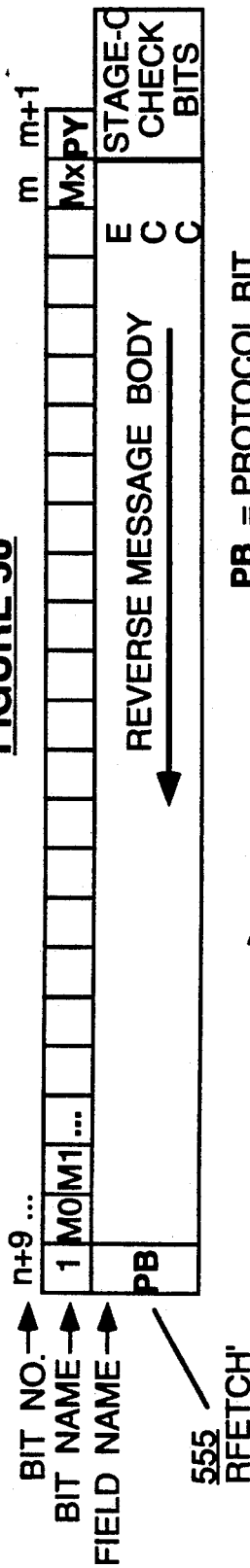

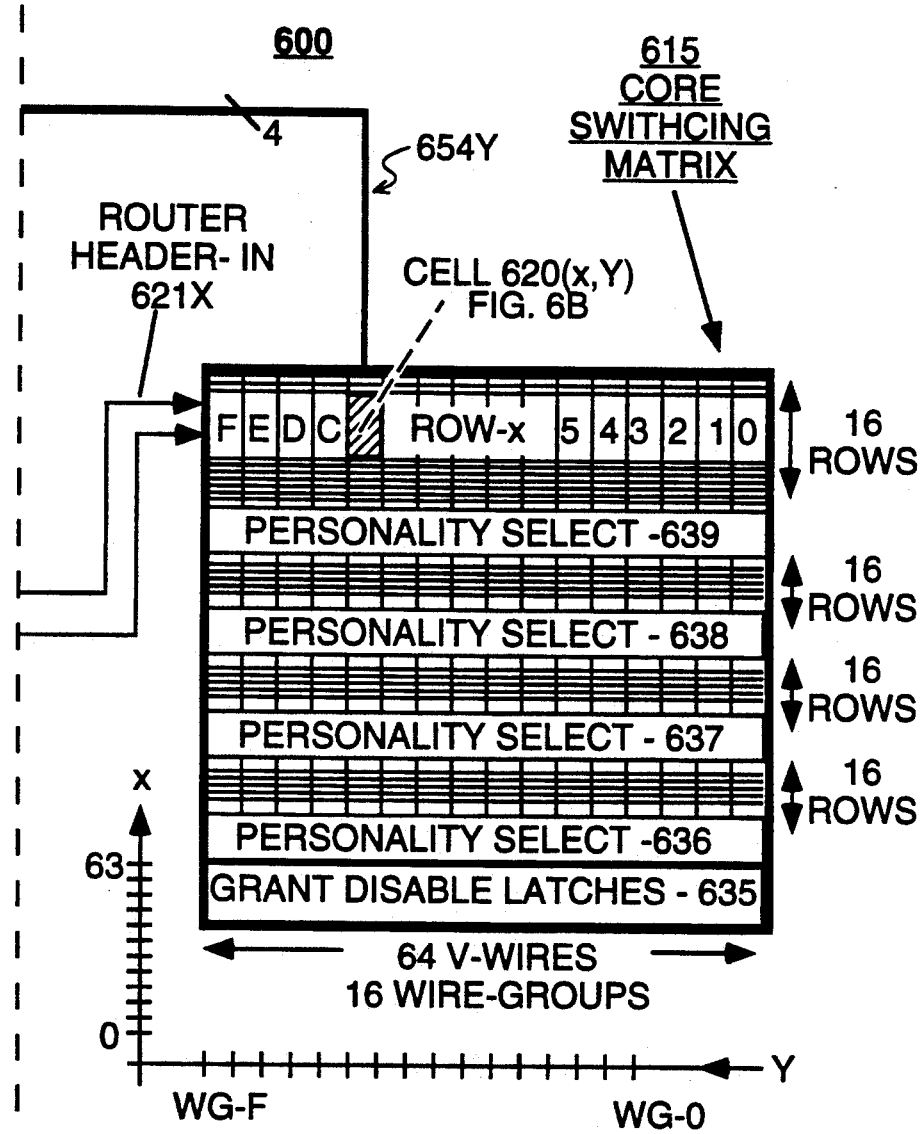
FIGURE 6A"
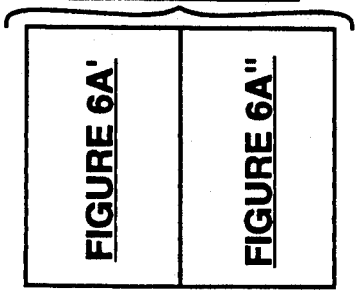
FIGURE 6A

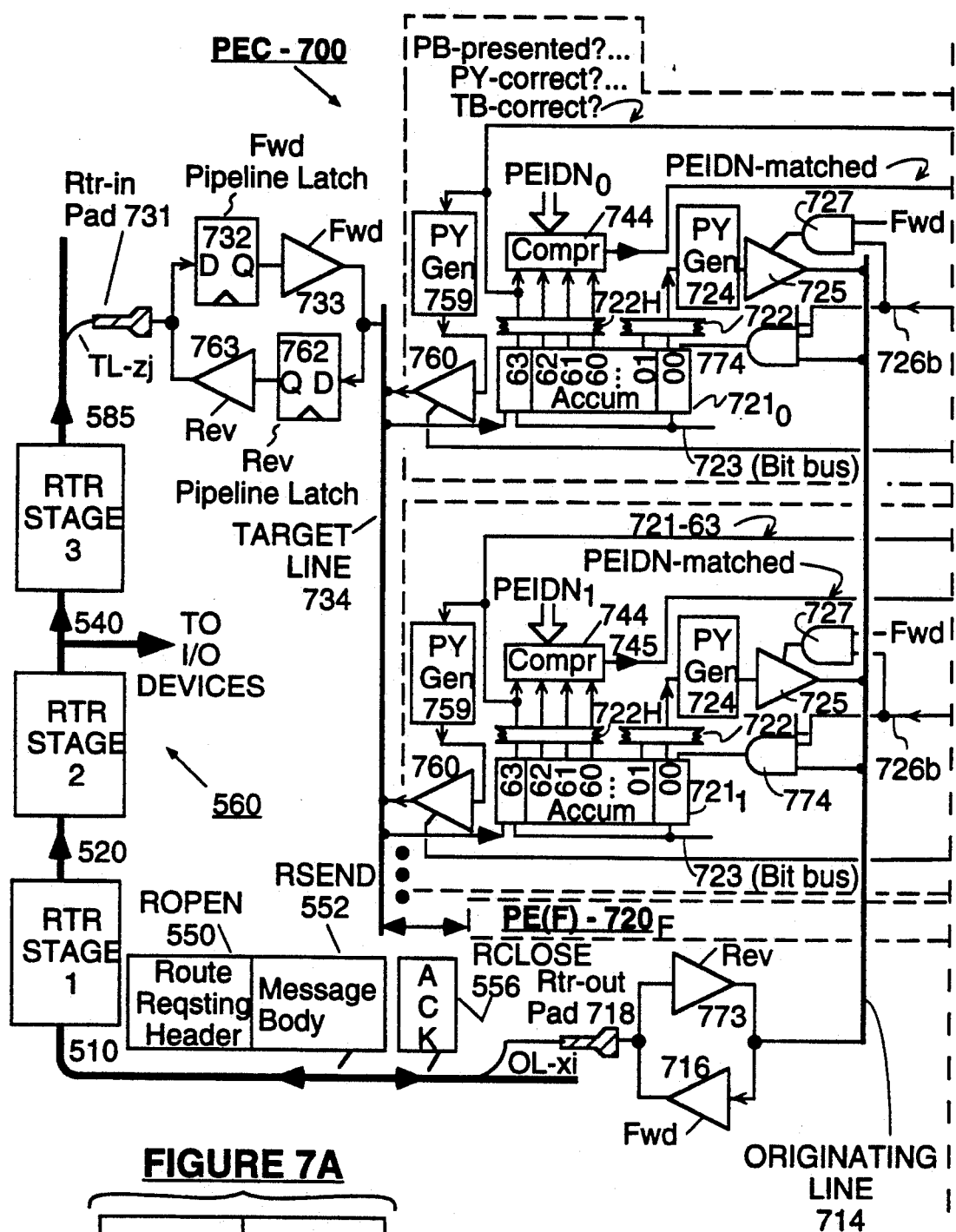
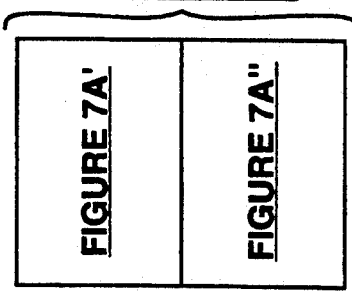

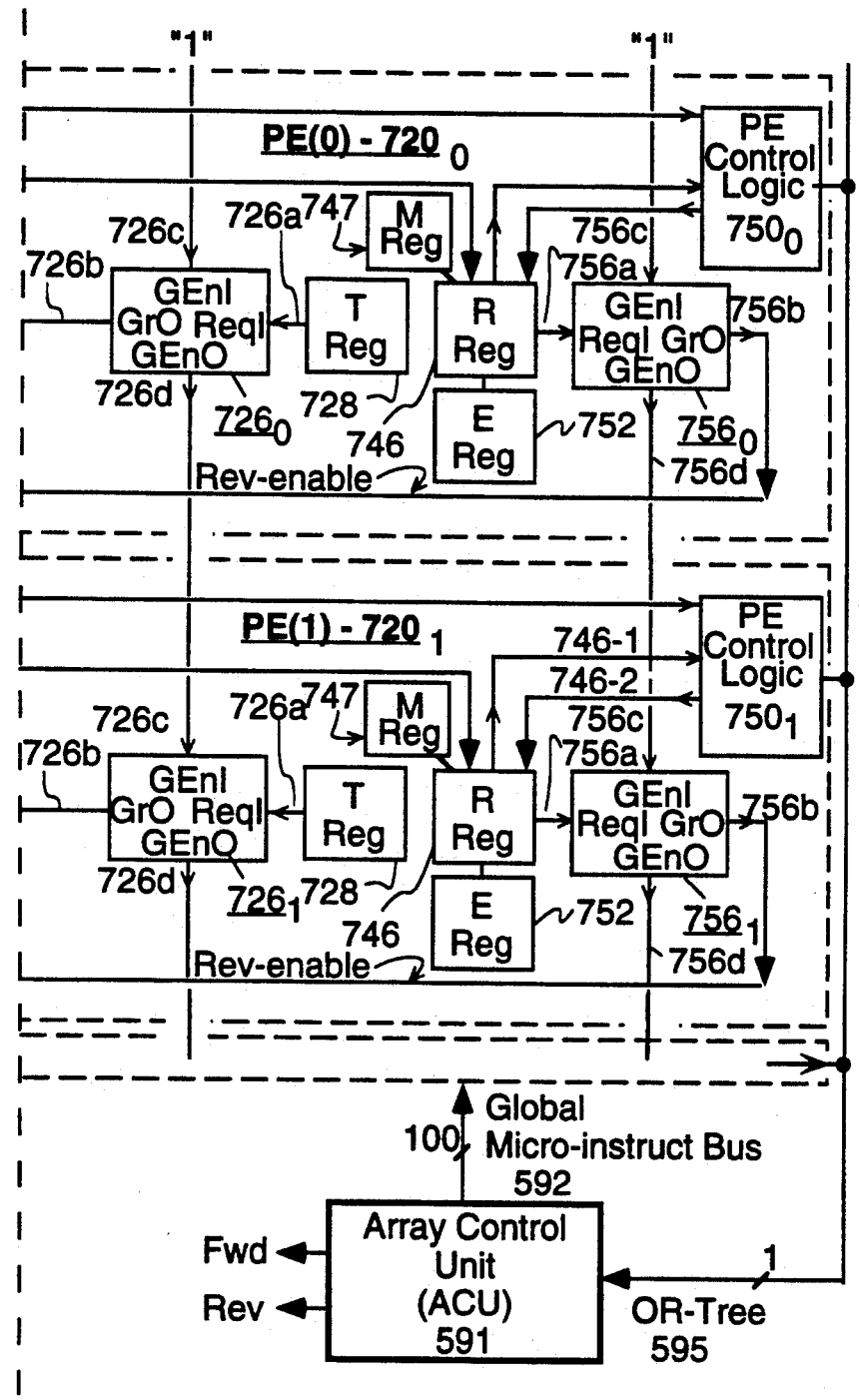
FIGURE 7A"

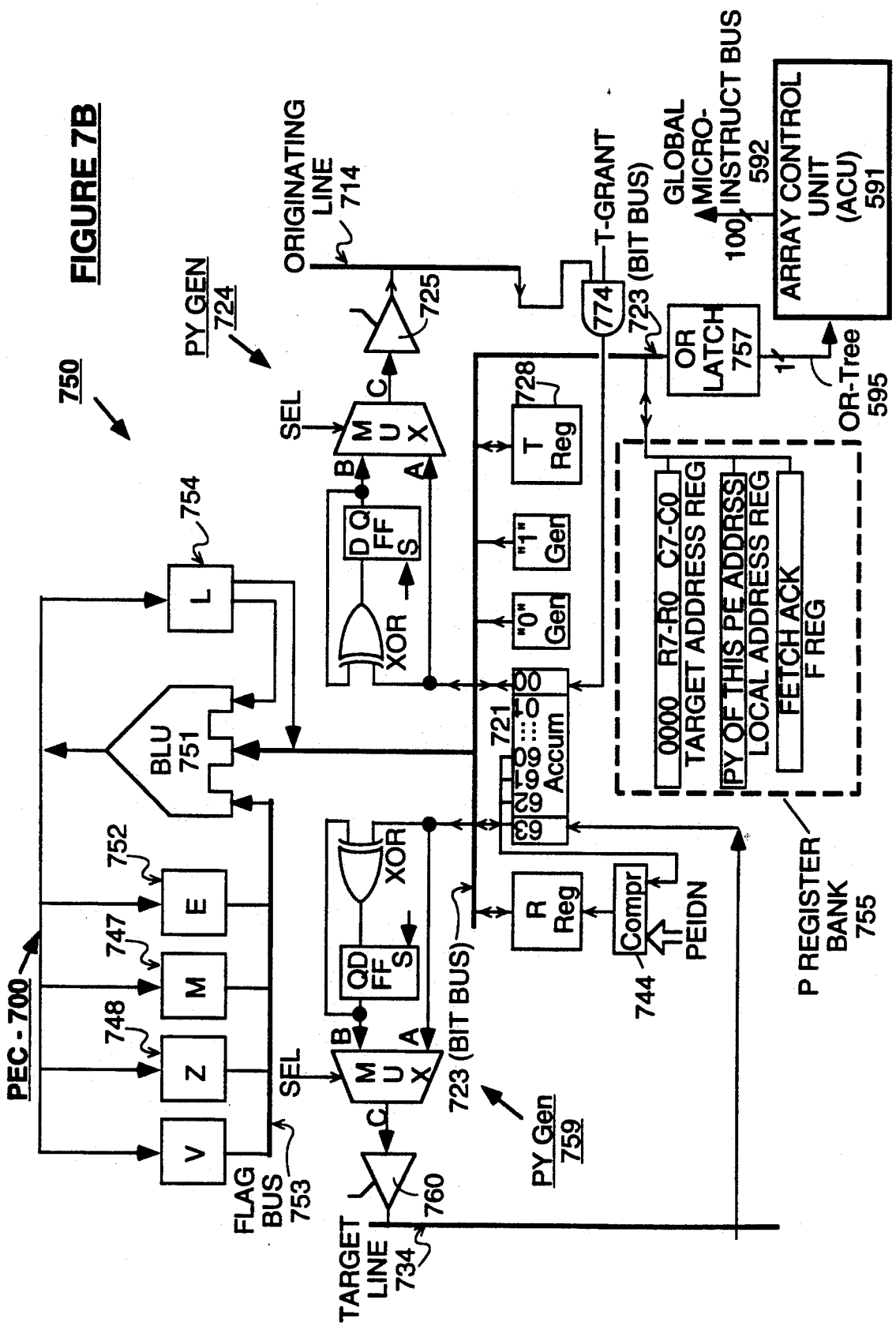

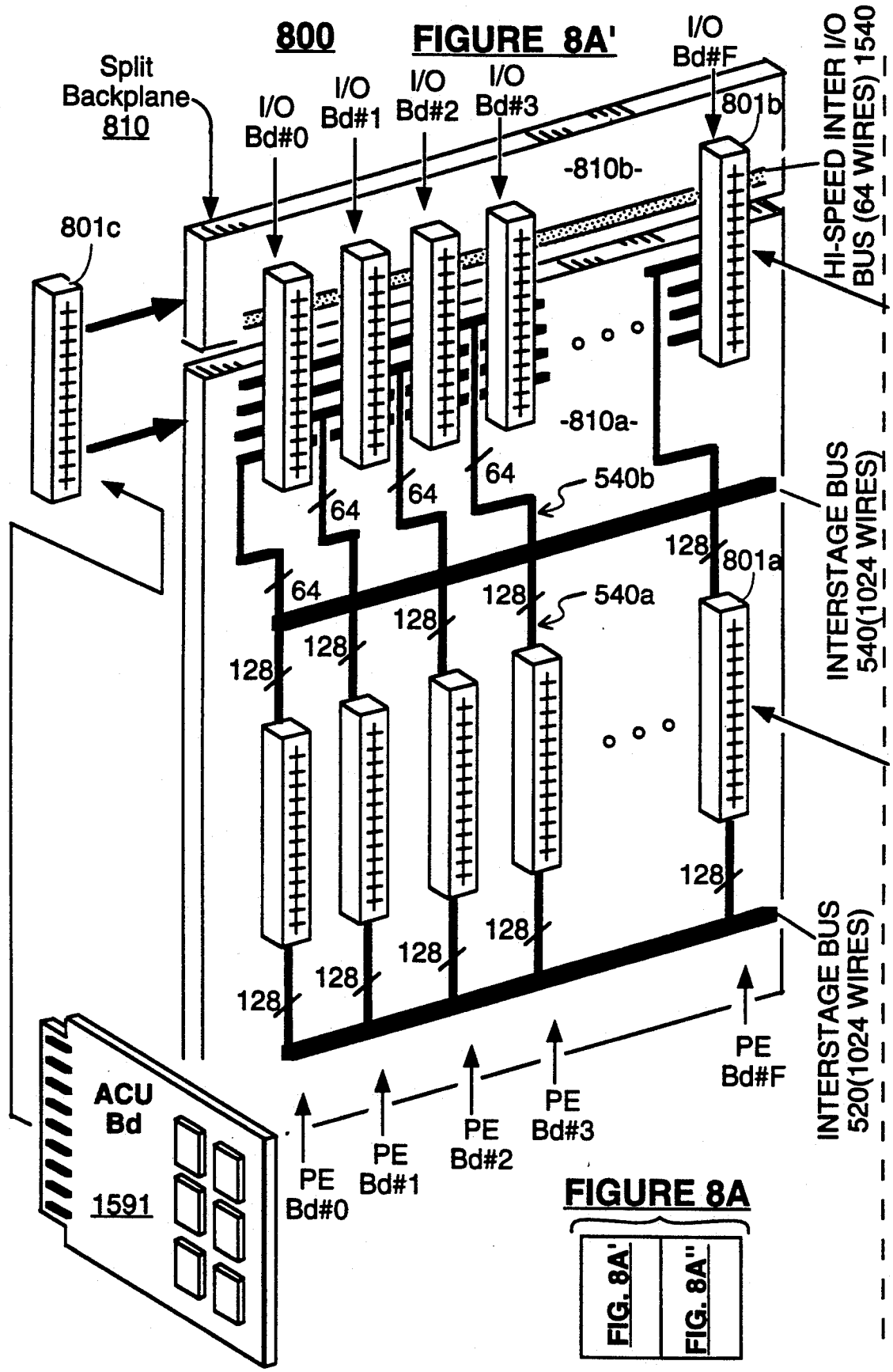

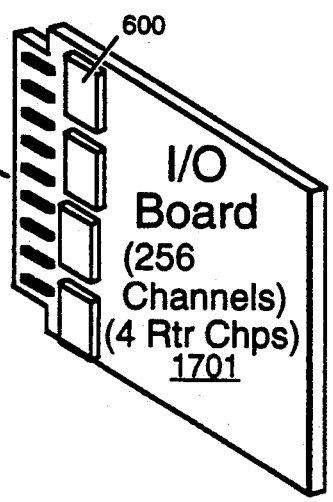
FIGURE 8A"
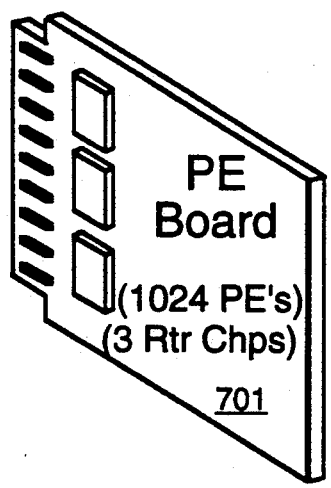

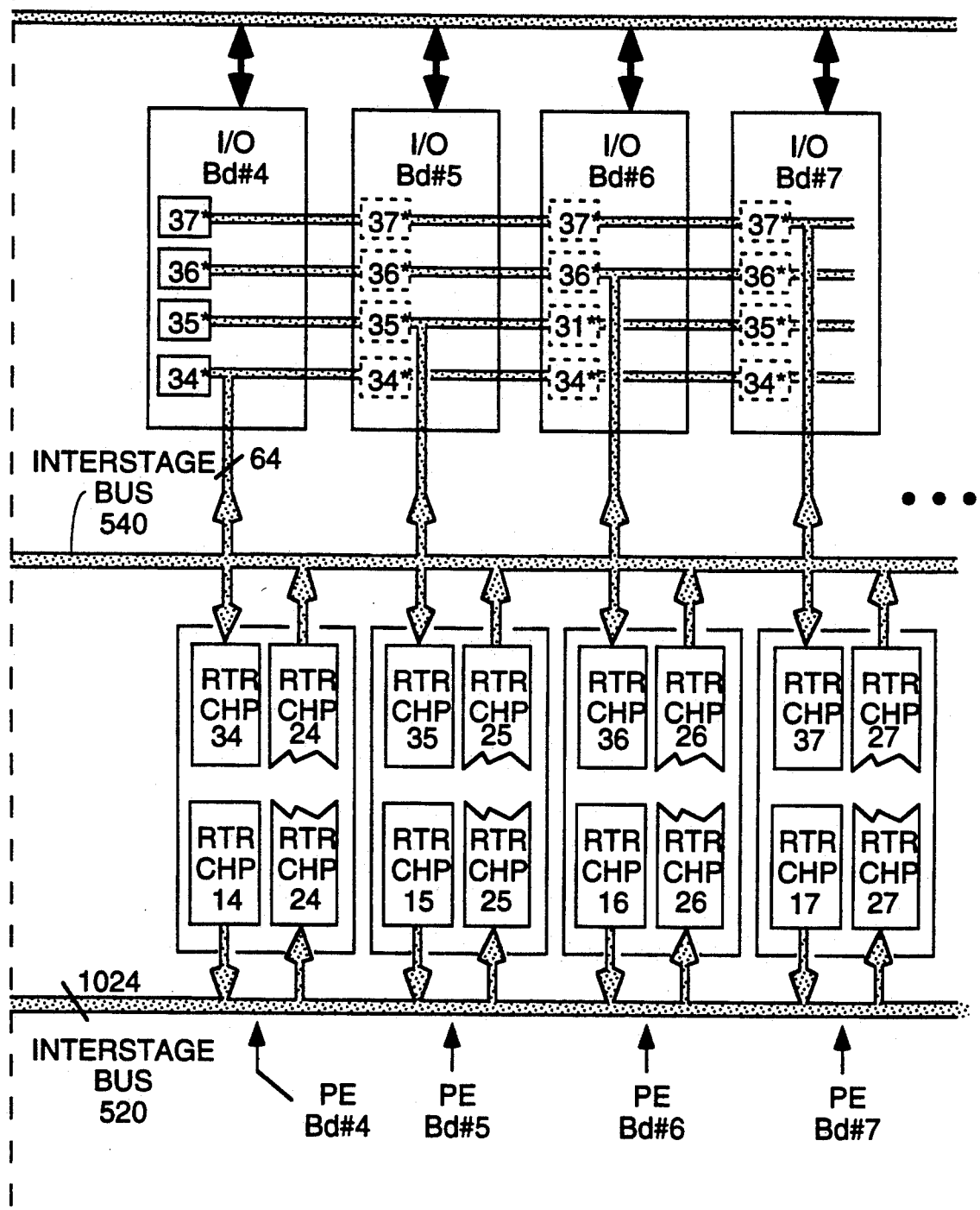

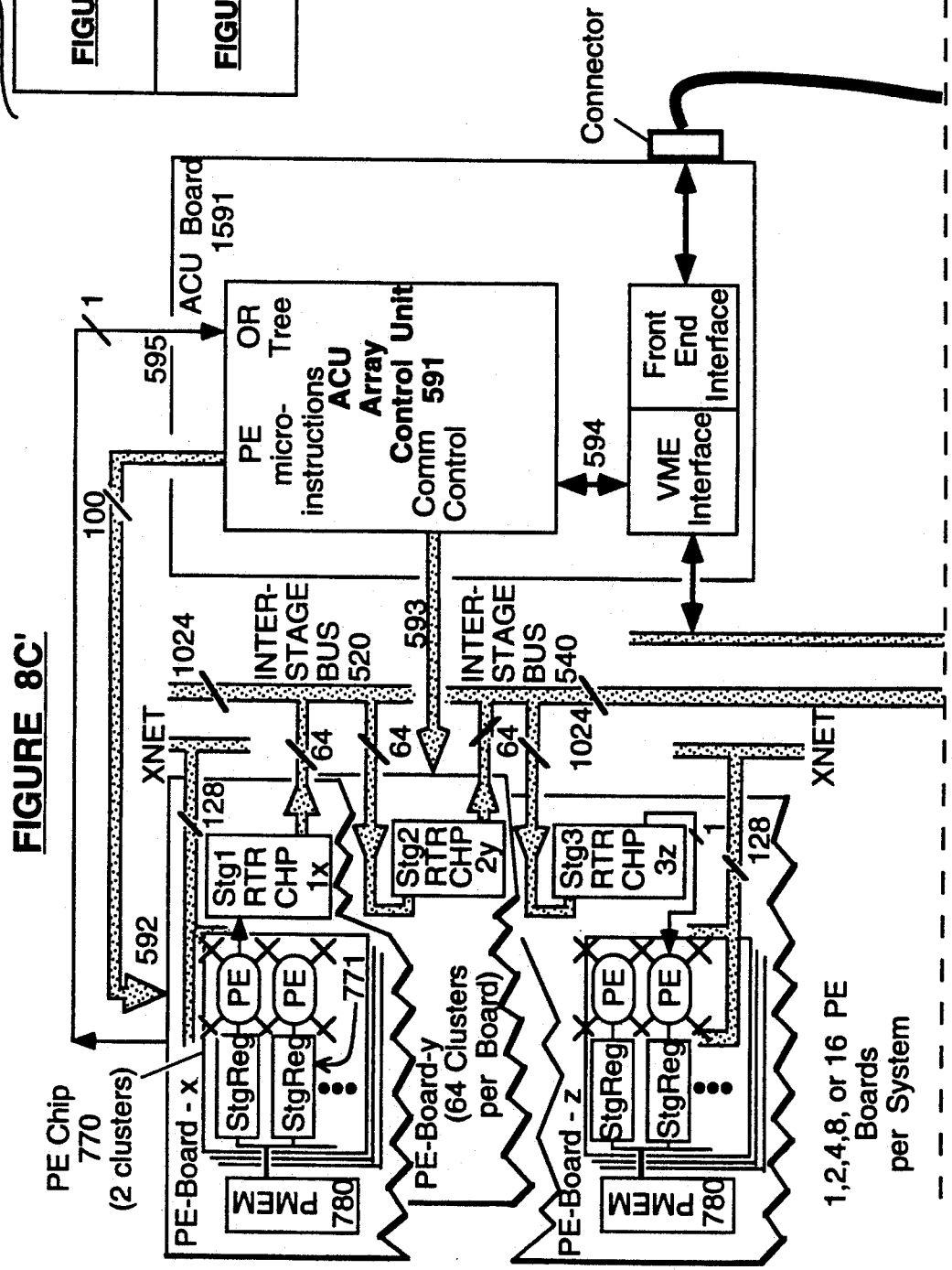

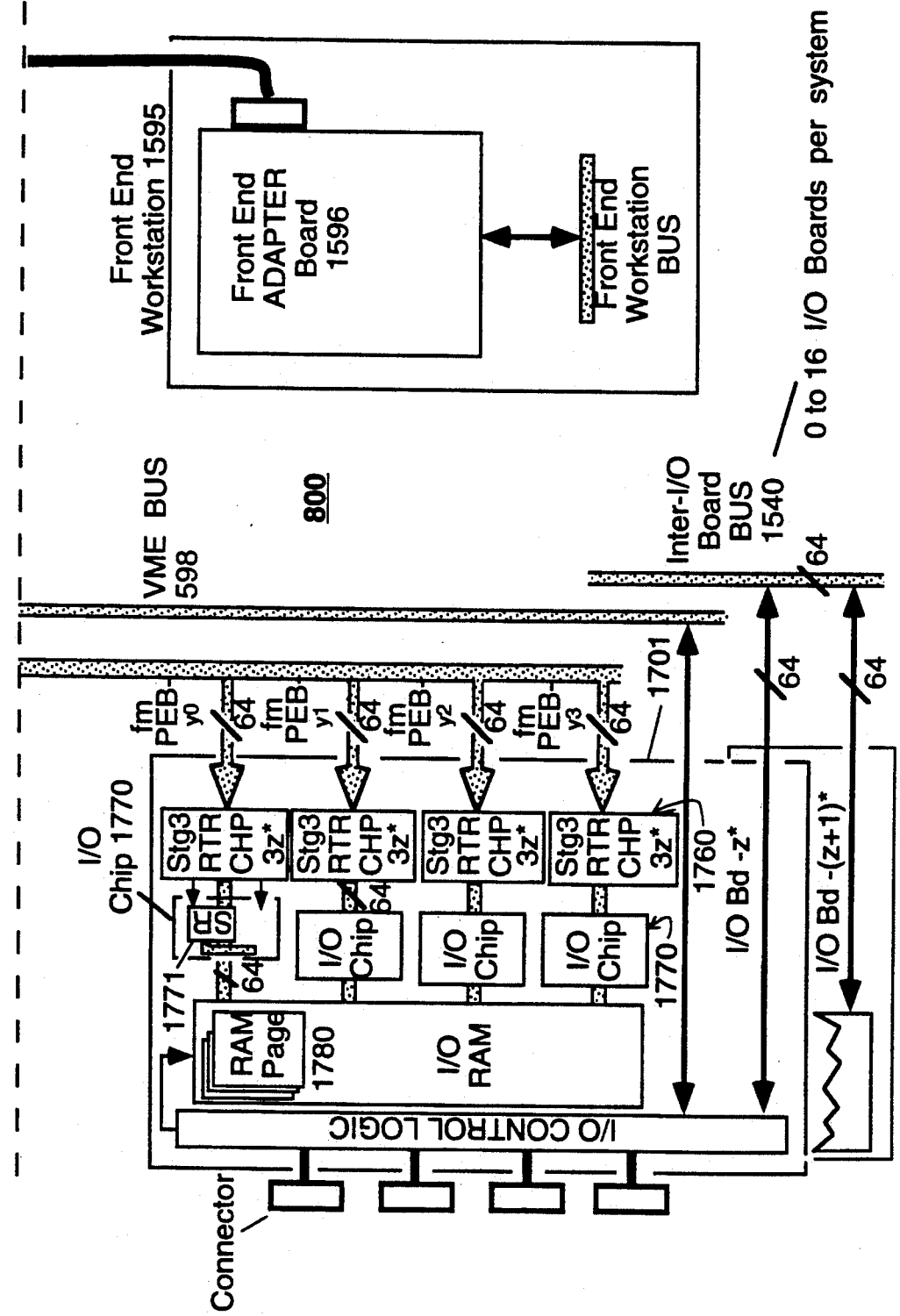
FIGURE 8C"

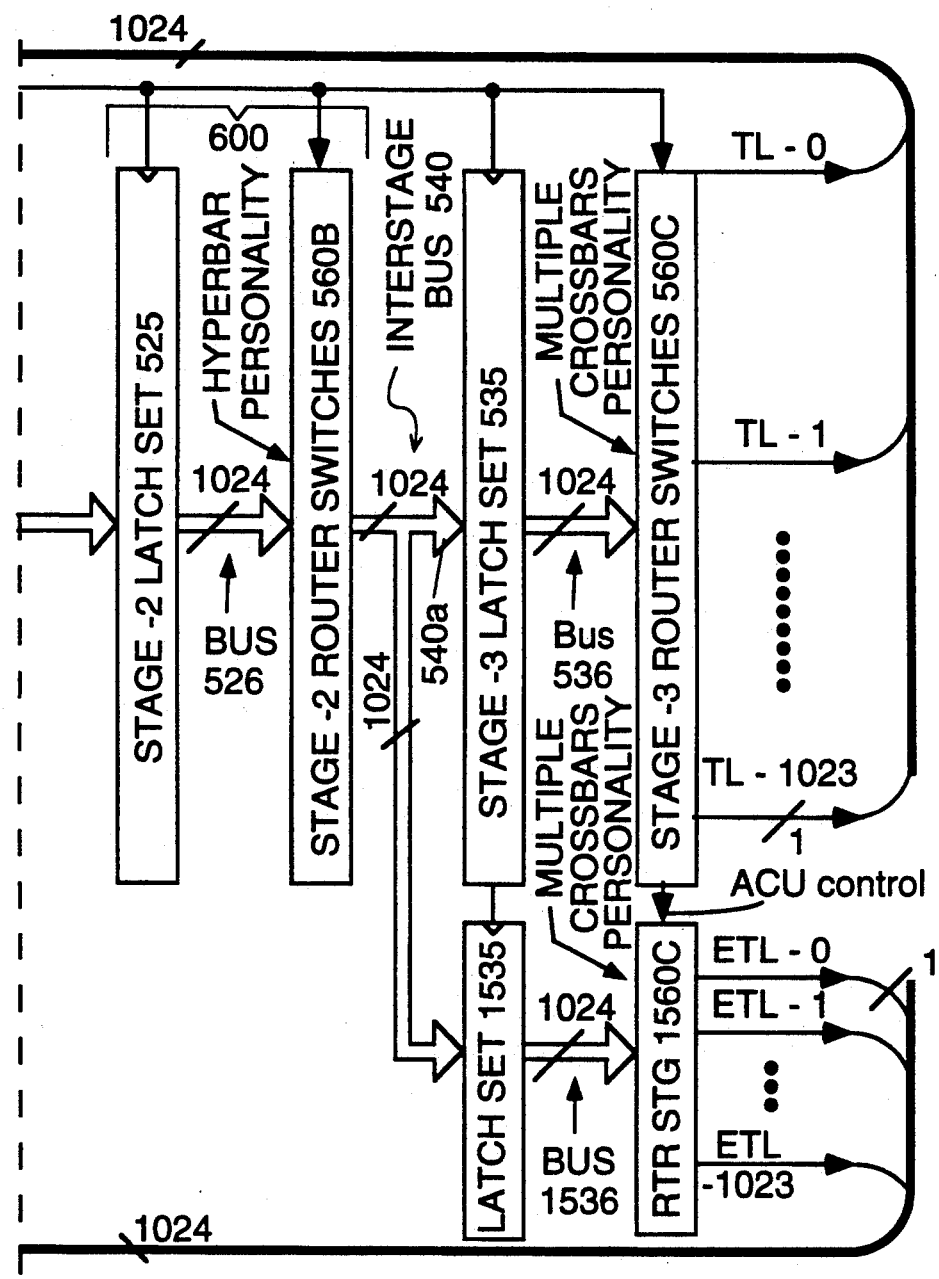
FIGURE 10"

SCALABLE PROCESSOR TO PROCESSOR AND PROCESSOR-TO-I/O INTERCONNECTION NETWORK AND METHOD FOR PARALLEL PROCESSING ARRAYS

BACKGROUND OF THE INVENTION

1. Cross-Reference to Related Applications

The following co-pending patent applications are assigned to the same assignee of the present application and are related to the present application: "Router Chip with Quad-Crossbar and Hyperbar Personalities" by John Zapisek filed concurrently herewith and assigned Ser. No. 07/461,551; "Parallel Processor Memory System" by Won Kim, David Bulfer, John Nickolls, Tom Blank and Hannes Figel filed concurrently herewith and assigned Ser. No. 07/461,567; and "Network and Method for Interconnecting Router Elements Within Parallel Computer System" by Stuart Taylor filed concurrently herewith and assigned Ser. No. 07/461,572. The disclosures of these concurrently filed applications are incorporated herein by reference.

2. Field of the Invention

The invention disclosed here is generally related to parallel processing systems and more specifically to the transmission of information through so-called massively-parallel Single Instruction Multiple Data (SIMD) computing machines.

3. Description of the Relevant Art

It has been a desire for a long time and continues to be such in the computer arts to produce a computing machine which can process large amounts of data in minimum time. Electronic computing machines have been generally designed within the confines of the so-called "von Neumann" architecture. In such an architecture, all instructions and data are forced to flow serially through a single, and hence central, processing unit (CPU). The bit width of the processor's address/data bus (i.e., 8, 16 or 32 bits wide) and the rate at which the processor (CPU) executes instructions (often measured in millions of instructions per second, "MIPS") tend to act as critical bottlenecks which restrict the flow rate of data and instructions. CPU execution speed and bus width must be continuously pushed to higher levels if processing time is to be reduced.

Von Neumann machines have previously enjoyed quantum reductions in data processing times (by factors of ten every decade or so), but artisans in the computing field are now beginning to suspect that the exponential growths previously witnessed in processor bandwidth (CPU bus width, W, multiplied by CPU instruction-execution speed, f) are about to come to an end. Von Neumann style architectures appear to be reaching the physical limits of presently known semiconductor technology. Attention is being directed, therefor, to a different type of computing architecture wherein problems are solved not serially but rather by way of the simultaneous processing of parallel-wise available data information) in a plurality of processing units. These machines are often referred to as parallel processing arrays. When large numbers of processing units are employed (i.e. 64, 128, 1024 or more) the machines are referred to as massively parallel computers. When all processors of a massively parallel machine simultaneously receive a single instruction, broadcast from a central array control unit (ACU), the machine is referred to as a SIMD machine (single instruction, multiple data).

The advantage of parallel processing is simple. Even though each processing unit (PU) may have a finite, and therefore speed-limiting, processor bandwidth (abbreviated hereafter as "pubw"), an array having a number N of such processors will have a total computation bandwidth of N times pubw, and from the purely conceptual point of view, because the integer N is unlimited, it should be possible to forever increase the resultant computing speed Npubw of an array simply by adding more processors. It should be possible to build massively parallel machines having thousands or even millions of processors which in unison provide computing power that eclipses today's standards.

The physical world is unfortunately not kind enough to allow for unchecked growth. It turns out that the benefits derived from increasing the size of a parallel array (scaling N upwardly to an arbitrarily large value) are countered by a limitation in the speed at which messages can be transmitted to and through the parallel array, i.e., from one processor to another or between one processor and an external I/O (input/output) device. Inter-processor messaging is needed so that intermediate results produced by one processing unit ($PU_1$) can be passed on to another processing unit ($PU_2$) within the array. Messaging between the array's parallel memory structure and external I/O devices such as high speed disks and graphics systems is needed so that problem data can be quickly loaded into the array and solutions can be quickly retrieved. The array's messaging bandwidth at the local level, which is the maximum rate in terms of bits per second that one randomly located processor unit ($PU_x$) can send a message to any other randomly located processor unit ($PU_y$) and/or to any randomly named external I/O device, will be abbreviated herein as "armbw" and referred to as the "serial" messaging bandwidth.

Hopefully, messaging should take place in parallel so that a multiple number, M, of processors are simultaneously communicating at one time thereby giving the array a parallel messaging bandwidth of M times the serial bandwidth armbw. Ideally, M should equal N so that all N processors in the array are simultaneously able to communicate with each other. Unfortunately, there are practical considerations which place limits on the values of M and armbw. Among these considerations are the maximum number of transistors and/or wires which can be defined on a practically-sized integrated circuit chip (IC), the maximum number of IC's and/or wires which can be placed on a practically-sized printed circuit board (PCB) and the maximum number of PCB's which can be enclosed within a practically-sized card cage. Wire density is typically limited to a finite, maximum number of wires per square inch and this tends to limit the value of M in practically-sized systems. Component density is similarly limited so as to require a finite distance between components which, because signals cannot propagate faster than the speed of light, limits the value of armbw. Thus there appears to be an upper bound on the parallel messaging bandwidth, Marmbw, of practical systems.

If the ultimate goal of parallel processing is to be realized (unlimited expansion of array size with concomitant improvement in solution speed and price/performance ratio), ways must be found to maximize both the serial random messaging bandwidth, armbw, of the array and the parallel messaging bandwidth Marmbw so that the latter factors do not become new bottlenecking limitations on the speed at which parallel machines can input problem data, exchange intermediate results within the array, and output a solution after processing is complete. If ways are not found to expand these messaging bottlenecks the messaging bandwidth limiting factors of parallel machines (M and armbw) can come to replace the so-called von Neumann bottleneck factors (f and W) that previously limited computing speed in non-parallel (scalar) machines and the advantage of scalability in massively parallel machines is lost.

Several inter-processor messaging schemes have been proposed By way of example, Thinking Machines Co. of Boston, Mass. has developed a hypercube structure referred to as the "Connection Machine" which is described in U.S. Pat. No. 4,805,091, issued to Thiel et al. Feb. 14, 1989 and also in U.S. Pat. No. 4,598,400 issued to Hillis, July 1, 1986; the disclosures of said patents being incorporated herein by reference. Goodyear Aerospace Corp. of Ohio has developed an X-Y grid for allowing each processor within a two dimensional array to communicate with its nearest North, East, West and South (NEWS) neighbors. The Goodyear NEWS system is described in U.S. Pat. No. 4,314,349, issued to Batcher Feb. 2, 1982, the disclosure of said patent being incorporated herein by reference. DEC (Digital Equipment Corp. of Massachusetts) has developed a multistage crossbar type of network for allowing clusters of processor units to randomly communicate with other clusters of processor units in a two dimensional n×m array. The DEC crossbar system is described in PCT application WO 88/06764 of Grondalski which was published Sep. 7, 1987 and is based on U.S. patent application Ser. No. 07/018,937. The disclosures of the Grondalski applications are incorporated herein by reference.

The problems with these previous approaches to interprocessor messaging are as follows. In the Goodyear NEWS network, each processor of a MIMD or SIMD machine is positioned in a two dimensional X-Y grid and limited to communicating by way of hardware with only its four nearest neighbors. Software algorithms (parallel processing programs) which call for messaging between non-neighboring processors do not run efficiently within the constraints of such a two dimensional NEWS topology. Complex software schemes have to be devised so that globally broadcast SIMD instructions ultimately allow a first positioned processor to talk (communicate) with another processor located for example, three rows and four columns away in the X-Y grid. The message is sent during a first SIMD machine cycle to the memory of a neighboring NEWS processor. The neighbor then passes the message on to one of its NEWS neighbors in a subsequent SIMD machine cycle and the process repeats until eventually the message gets to the intended recipient. In this software-mediated form of a message store and forward scheme, so-called SIMD instruction-obey enabling bits (E-bits) of individual processors are typically toggled on and off so that intermediate processors do not actively accept a message not intended for them. Preferably, message bits of parallel paths should arrive at destination processors in synchronism so that all receiving processors can respond simultaneously within a SIMD machine to a single instruction broadcast by a centralized array control unit. If the time for transmitting a message from source processor to destination processor varies across the array, all receiving processors must wait until the last message is delivered before they can all simultaneously respond to a SIMD instruction broadcast by the centralized array control unit. Sophisticated software has to be developed for routing messages efficiently. The cost of software development and the execution time overhead for such a strategy detract from the performance of the overall system.

As more processors are added to the Goodyear NEWS array, random messaging time disadvantageously tends to increase. This is because the time for message transfer between one randomly located processor and any other randomly located member of the processor array is at least roughly proportional to the two dimensional distance between processors. (Number of hops is roughly proportional to $N^{\frac{1}{2}}$.) Users who attempt to increase the price/performance ratios of their systems by increasing the number N of processors in a NEWS array do not necessarily realize any improvement in system price/performance, and in some instances, the act of increasing array size may actually be detrimental to the price/performance ratio of the machine.

The hypercube structure of the Connection Machine suffers from similar drawbacks. Instead of being limited to direct communication with only four neighboring processors, each processor of an H-dimensional hypercube can talk via hardware directly with H neighboring processors, each of the neighbors being a processor which belongs to one of H hypercube planes theoretically passing through the message originating processor. A packet switching scheme is used to allow message packets to hop from one node to the next until the message packet reaches a destination node that is identified by a fixed-length header field of the packet. If a message originating processor wishes to communicate with a hypercube member other than its H immediate neighbors, such messaging must be carried out with a store and forward scheme similar to that of the NEWS network, except that it is mediated mostly by hardware rather than software. Message forwarding distance is usually much shorter in the hypercube environment than it is in the two-dimensional NEWS grid (because of the unique H-dimensional nature of a hypercube), but because the packet switching circuitry of each processor (node) in an H-dimension hypercube might be simultaneously receiving as many as H requests from its neighbors to act as an intermediary and to perform message store and forward operations, the message handling capabilities of the intermediate message-forwarding circuitry can be easily overwhelmed when more processors are added (when N is scaled upwardly) and the value of H increases. If the packet-switching circuits of destination processors are also being overwhelmed by store and forward requests, such that they are "too busy" to receive the message packets meant for them, the message packets have to be temporarily directed elsewhere (by modifying the destination field in the packet header) and there is the danger, in some cases, that a (multiply-modified) message packet may never get to its intended recipient. The danger of this increases as the value of H increases and thus, the hypercube does not provide an architecture whose number of processors (N) may be easily scaled upwardly.

A further drawback of the hypercube structure has to do with its wire density. At least H message-carrying wires must radiate from each node of a hypercube having $2^H$ nodes. (A node can be a single processor or a cluster of processors.) As H increases, the number of wires in the hypercube increases as ½(H2^H). For massively parallel machines (i.e., H≧10), there is the problem of how to concentrate such a massive number of wires (H2^H/2) in a practical volume and how to minimize cross talk between such radially concentrated wires (H wires per node).

The crossbar type of multi-stage interconnect network (MIN) described in the Grondalski application overcomes some of the problems associated with wire concentration. It is not a true crossbar switching matrix of the kind which allows any processor to directly communicate through a single switching element with any other processor in the array, but rather the Grondalski system is a multi-stage interconnect network (MIN) wherein pluralities of processors are grouped into clusters and each cluster communicates indirectly with any other cluster including itself through a message routing path formed by a series of spaced apart router "stages" each having message routing switches (message steering stages) and each being coupled to the next by lengths of stage-connecting wires. Each cluster has one wire for sending a transmission into the multi-stage interconnect network (MIN) and one wire for receiving a transmission from the interconnect network. Processors within a cluster access the transmit and receive wires by way of multiplexing. A routing path is created through the MIN by a sequential series of switch closings in the stages rather than by a single switch closing. This approach of assigning processors to clusters and forming an intercluster message routing network wherein routing paths are defined by plural switches (plural steering stages) advantageously reduces the number of wires and switches that would otherwise be required for a true crossbar switching matrix.

While it has many beneficial attributes, the Grondalski network suffers from a major drawback. The Grondalski routing system has an excessively long per-path message transmission time (i.e., 250 nanoseconds per bit) which grows disadvantageously as the size of the routing system is scaled upwardly. This drawback arises from the same factor which gives the Grondalski network its benefits. It is because each message routing path in the Grondalski network is defined by a plurality of spaced-apart "stages" and thus defined by a plural number of serially coupled switches, relatively long wires or other serially-connected message routing devices and because each such device has an inherent signal propagation delay (i.e., signal flight time), that the time it takes for a single bit to travel through the message routing path is so long (i.e. 250 nS per bit). Messaging time disadvantageously increases in proportion to the number of serially-connected routing devices employed to define each routing path and the lengths of wires which connect these devices together. Thus, system performance is affected detrimentally as the size of the routing system is scaled upwardly by adding more routing devices and/or longer lengths of connecting wires. But, on the other hand, it is necessary to add more routing devices if the computation bandwidth Npubw of a parallel array and the parallel messaging bandwidth, Marmbw, of the routing system are to be scaled upwardly in an efficiently matched manner. If the computation power, Npubw, of an array were to be increased while the parallel messaging bandwidth, Marmbw, remains constant, messaging time would begin to overshadow computation time.

A designer wishing to build a system in accordance with the teachings of Grondalski is therefore caught in a dilemma On the one hand, it is desirable to be able to add more processing units so that the total computational bandwidth, Npubw, increases. On the other hand, it is necessary to limit wire length and the number of switching elements in each path of the message routing network so that messaging time does not become excessively long. At some point, the advantages of increased computing bandwidth, Npubw, are outweighed by the drawbacks of decreased messaging bandwidth, armbw and/or Marmbw, and upward scaling of the parallel processing machine no longer makes sense from the vantage point of price versus performance.

There exists in the field of parallel processing a need for a scalable message routing system whose messaging delays do not grow substantially with size.

SUMMARY OF THE INVENTION

It is an object of the present invention to provide a scalable inter-processor messaging system for parallel processor arrays wherein the message delay characteristics of the messaging system do not increase in direct proportion to or at a faster rate than the size of the messaging system (for the case of relatively long bit streams, i.e., serial streams of more than 25 bits).

This and other objectives are realized, in accordance with a first aspect of the invention, by partitioning a message routing path spatially into fractional segments and providing pipeline registers at the junctures of the segments for temporarily storing the bits of a transmitted message. When the bits of a serially transmitted message are pipelined in a spatially distributed manner along a single message routing path, plural bits (i.e., two or more) can propagate simultaneously through short segments of the message routing path and consequently, the maximum data flow rate of the path (as measured in terms of bits per second per path) increases. A slight time penalty is paid for filling the pipeline with an initial portion of a serial bit stream, but once the pipeline is primed with message bits, and the message bits begin emerging at the output end of the routing path, a substantial increase is observed in the messaging speed of the routing path (number of bits transferred per path per second). This increased speed can be many times larger (i.e., two or more times faster) than that of a similar routing path not having the pipeline registers. The transmission time of each one of the multiple bits traveling simultaneously through a pipelined path is determined by a fraction (i.e., one half or less) rather than the entire length of the path and as such, higher data flow rates can be sustained through the path.

Each message routing path is preferably partitioned into segments of approximately equal propagation delay and/or length, and/or inductance, and/or resistance and/or capacitance so that no one segment by itself substantially limits the data flow rate of the overall path. A pipeline register (i.e., master-slave flip flop, latch, or other bit storing and forwarding means) is provided at each division point in a partitioned path to couple one segment to the next. Preferably, each pipeline register is bidirectional to allow messaging both from a route-creating (opening) device to a target device and from the target device back to the route-opening device. Appropriate transmission line termination means such as voltage-clamping diodes and reflection damping resistors are preferably provided at the ends of relatively long connecting-wires within path segments for minimizing the signal settling time needed between bits that are sequentially transmitted over the corresponding path segment.

A second aspect of the invention deals with the problem of providing high speed messaging between a parallel processing array (composed of a plurality of processor elements, hereafter abbreviated as "PE's") and external input/output devices (I/O peripherals). According to the invention, the above-described pipelining technique is also used for minimizing I/O messaging time. Preferably, the above-described inter-processor routing network is integrated with an I/O message routing network such that the two networks share at least one message carrying bus and/or one stage of pipeline registers. An "expansion tap" is provided within a router network for creating a path from a route-opening processor element (PE) to devices (i.e., I/O devices) other than PE's within the array to which the route-opening PE belongs. Messages are steered to either or both of a target processor element (PE) and a target I/O device according to address bits included in message-routing headers placed in front of the messages. A control bit within the message or a control signal applied on a separate wire instructs the PE's and/or I/O devices and/or switching stages of the routing network when to listen or not listen to a message delivered to them by previous stages of the router network. Because each path created by a route-opening processor element ($PE_O$) is bidirectional, the target I/O elements do not need to contain special logic for opening a route from their end. This reduces the cost of adding I/O capability to the massively parallel system. Because messages are steered through the same hardware to either a target processor element ($PE_T$) or to a target input/output element ($IOE_T$), data within these target elements can be considered as belonging to a homogeneous data space. This simplifies the management of software-mediated data transfer between any type of route-originating or target element (be it another processor element PE or an input/output element IOE) and its counterpart target or originating element. The messaging bandwidth of the "expansion tap" is preferably equal to the bandwidth of processor to processor communication. When the size of the global interprocessor messaging network is scaled upwardly, the size of the "expansion tap" should be concomitently increased in size so that PE to I/O messaging bandwidth increases in step with PE to PE messaging bandwidth.

A third aspect of the invention deals with the problem of how to partition, spacially place and interconnect the parallel processor elements (PE's), I/O device drivers, wires and other message routing elements (router chips) of a parallel processing system having a large number of such components (i.e., 1000 or more PE's). In massively parallel systems, processor elements (PE's) are usually distributed among a plurality of integrated circuit chips (IC's), printed circuit boards or other discrete support means. I/O device drivers are similarly distributed across space.

According to a further aspect of the invention, the routing of messages between any one processor on a first processor board and any other arbitrary processor on the same or another processor board (or any I/O device on the same or another board), takes place by defining a message routing path which passes in the recited order through at least a first route-selecting stage, a second route-selecting stage and a third route-selecting stage. Components of the first route-selecting stage are located on the board of a message originating processor, components of the third route-selecting stage are located on the board of the message receiving processor (or message-receiving I/O device) and the components of the second route-selecting stage are located either on the board of the message originating processor, or on the board of the message receiving device, or on some other board depending on how the message is steered. The second route-selecting stage steers messages between a route-opening board and a target board. The first stage steers messages between parts of the route-opening board and parts of the second stage. The third stage steers messages between parts of the second stage and parts of the target board. Pipeline registers are placed at the front end, back end or both ends of each route-selecting stage so that more than one bit can be simultaneously traversing through each serial communication path that is established within the router network.

BRIEF DESCRIPTION OF THE DRAWINGS

The invention will be described with reference to the following figures in which:

FIG. 3C is an equivalent circuit schematic explaining how the overall length and RLC characteristics of a message routing path, formed by either of the single-stage and multi-stage networks respectively shown in FIGS. 3A and 3B, limit the speed at which each bit in a digital message may be serially transmitted through the message routing path.

FIG. 4A is a block diagram of a first "pipelined" multi-stage message routing network in accordance with the invention.

FIG. 4B is an equivalent circuit schematic of the network shown in FIG. 4A for explaining how message transmitting delays and/or corruption may be reduced in accordance with the pipelining technique of the invention.

FIG. 5A is a block diagram of a cluster-based global routing network in accordance with the invention.

FIG. 5C is a detailed schematic of the layout shown in FIG. 5B for explaining a redundant address bit aspect of the invention.

FIG. 5D shows a mapping technique for switching between the two dimensional coordinates of a NEWS style "local" router and a three stage routing address utilized by the "global" router of FIG. 5A.

FIGS. 5E to 5J show a plurality of messaging protocols respectively labelled as ROPEN, RSEND, RFETCH, RCLOSE, RSEND' (alternate form) and RFETCH' (alternate form) which may be used in the embodiment of FIG. 5A.

FIG. 7A is a block diagram showing a processor cluster chip in accordance with the invention.

FIG. 7B is a detailed schematic of a logic portion of FIG. 7A.

FIG. 8A is a perspective view of a multi-board machine in accordance with the invention.

FIG. 8C is a block diagram of a multi-board parallel processing engine utilizing a global message routing network for inter-processor and processor-to-I/O messaging in accordance with the invention.

DETAILED DESCRIPTION

The following detailed description includes the best modes presently contemplated by the inventors for carrying out the invention. It should be understood that the described embodiments are intended to be merely illustrative of the principles of the invention and that they should not be taken in a limiting sense.

Figure 1:
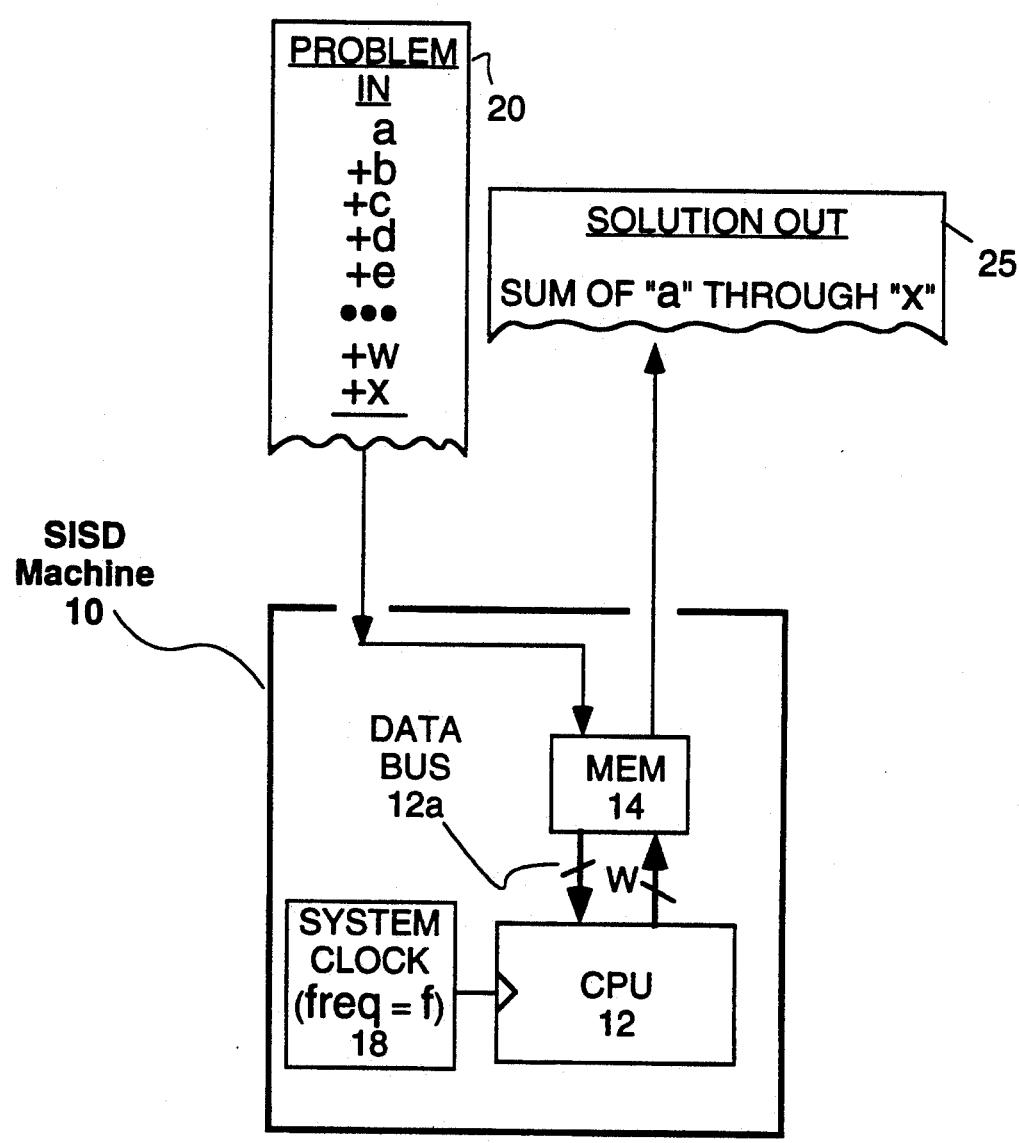
FIG. 1 is a block diagram of a single instruction, single data (SISD) type of computing machine.

Referring to FIG. 1, there is shown the traditional von Neumann machine (or "single-instruction, single-data", SISD machine) 10 which comprises a single, and therefore central, processor unit (CPU) 12 coupled to a memory unit (MEM) 14 by way of a single CPU data bus 12a. The CPU data bus 12a has a width of W bits (or W wires) and a transmission frequency matching the instruction execution speed of the central processor unit 12. The execution speed of the CPU 12 is usually governed by the frequency, f, of a system clock generator 18 and by the physical limitations of materials used to construct the processor unit 12.

When a predefined problem (i.e. one defined within a scalar computer program) 20 is to be solved (processed) by the processor unit (CPU) 12, an input set of data pieces (i.e., numbers a, b, c, ... x of problem 20) is first serially loaded and stored in the memory unit (MEM) 14 of the SISD machine 10. Then, as the solution program is executed, small (i.e., byte-sized) pieces of the input data set are serially transmitted one at a time through the processor's data bus 12a to internal computing circuits within the CPU 12 in a predefined sequence at a speed dictated by the maximum bandwidths, $bw = W \times f$, of all of the CPU data bus 12a, the processor unit 12 and the memory unit 14. A processing result (solution) 25 is formed in the memory unit (MEM) 14 at the end of the sequence and the result is then serially output from the memory unit 14 to a solution receiving means (i.e. a display, not shown). The term "von Neumann bottleneck" arises from the fact that solution speed is limited by the bandwidth (bw) of the single CPU data bus 12a.

Figure 2A:
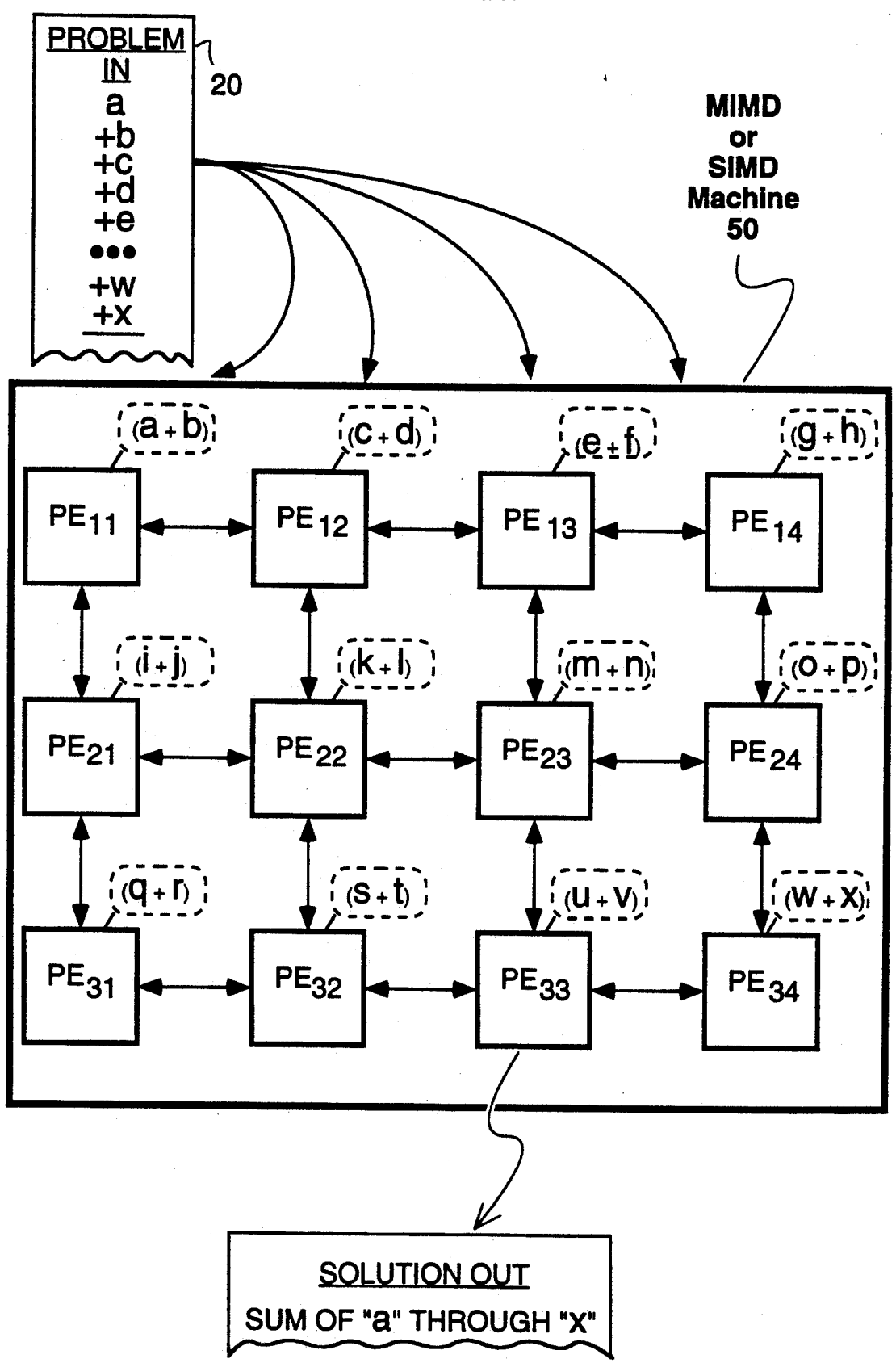
FIG. 2A is a block diagram of a single instruction, multiple data (SIMD) type or multiple instruction, multiple data (MIMD) type of computing machine whose processor elements (PE's) communicate through a NEWS style interconnection grid.
Figure 2B:
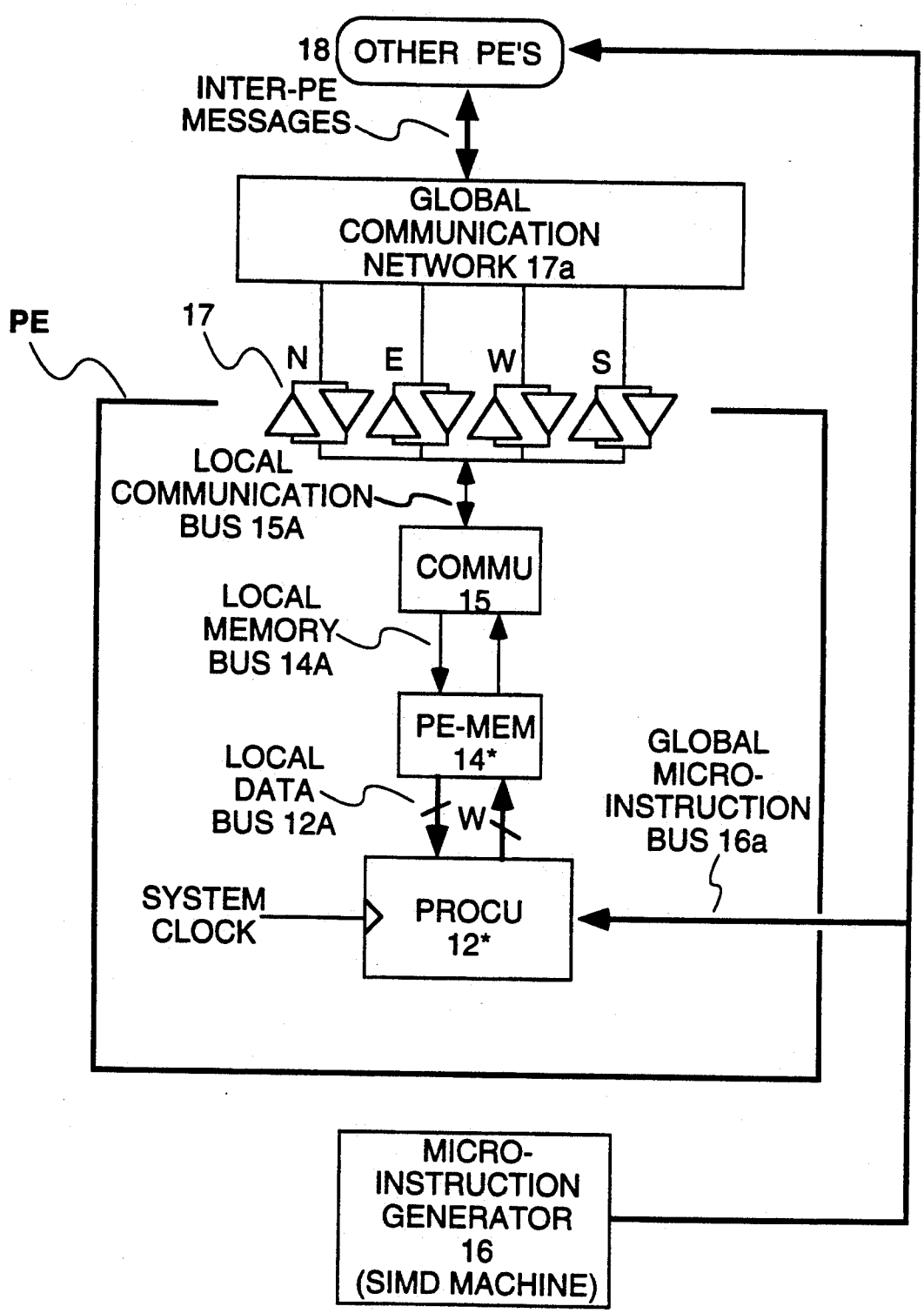
FIG. 2B is a block diagram of one of the PE's shown in FIG. 2A.

Referring to FIG. 2B, the combination of a data processing unit (PROCU) 12* and a localized processor-serving memory unit (PE-MEM) 14* will be referred to hereafter as a processor element, PE, when discussed in the context of parallel processing arrays such as the two-dimensional "NEWS" array 50 shown in FIG. 2A. FIG. 2B shows a PE further including a localized message transmitting and receiving means (communicator unit, COMMU) 15. The communicator (COMMU) 15 is coupled to the local PE memory unit PE-MEM 14* by way of a local memory bus 14a and it is used to control the exchange of messages (i.e., result data) over a local communication bus 15a which connects to a NEWS style 17 global messaging network 17a and through there to other similarly inter-connected processor elements (PE's) 18 such as shown in the array 50 of FIG. 2A (i.e., a NEWS array).

The data processing unit (PROCU) 12* of a processor element (PE) such as shown in FIG. 2B need not be a full fledged "central" type of CPU such as used in FIG. 1 but rather can be part of a distributed computing machine having a centralized micro-instruction generating and broadcasting unit 16 (i.e., array control unit) that is separate from the processor element (PE). In such a case, a SIMD (Single Instruction, Multiple Data) machine having a global instruction bus 16a connecting all processor units (PROCU) 12* of the PE's to a single micro-instruction generator (ACU) 16 may be formed. Alternatively, the processor units 12* can each be a full fledged CPU having a local microcode generator within. In such a case the external microinstruction generator 16 is not used, and a MIMD (Multiple Instruction, Multiple Data) machine may be formed.

Referring to FIG. 2A, an array $A_N$ of, for example, twelve processor elements, $PE_{11}$ through $PE_{34}$ (N=12), is shown connected in an X by Y (3×4) NEWS arrangement to form either a single-instruction, multiple-data (SIMD) machine or a multiple-instruction, multiple-data (MIMD) machine 50. The instruction-execution bandwidth of the entire machine 50 is N times (i.e., 12 times) the processing bandwidth (pubw) of each processor element $PE_{(x,y)}$ in the array, the value N being here the total number of processing elements within the array $A_N$ and the numbers x,y being arbitrary identifiers of an arbitrary processor element PE within the array $A_N$.

A simple problem solving example will be useful for understanding both the power of the parallel machine 50 and the messaging problems associated with parallel arrays. In the example we will assume that the addition of 24 numbers: a, b, c, ..., w, x, is desired and that the result of the addition is to be produced as quickly as possible.

In the earlier described von Neumann (scalar) machine 10 (FIG. 1), the solution would be carried out by serially adding each of the 24 numbers, one to the next over time, thereby requiring a minimum of 24 computation cycles for producing a solution ($t_{compute} \geq 24/f$). By contrast, the parallel array 50 ($PE_{11}$-$PE_{34}$) just described should be able to perform the addition with just five computation cycles using a "parallel compute and fold" method ($t_{compute} \approx 5/f$) as will now be described.

In the parallel compute and fold method, the 24 discrete pieces of problem data, a, b, c, ..., x are first partitioned into elemental pairs, (a, b), (c, d), (e, f), (w, x) and each of these elemental pairs is transferred to the memory unit PE-MEM 14* (FIG. 2B) of a respective one of the processor elements $PE_{11}$-$PE_{34}$ as indicated in FIG. 2A.

An instruction is then issued to all the processor elements (PE's) telling them to each add the discrete data pieces within their respective elemental data pairs, (a,b), (c,d), ... (w,x). Thus, a single number representing the subtotal result (a+b) is formed in processor element $PE_{11}$, a single number representing the subtotal result (c+d) is formed in processor element $PE_{12}$, and so forth, ..., until in the last processor element $PE_{34}$, the subtotal result (w+x) is formed as indicated in FIG. 2A. Each processor element in an odd numbered column of the illustrated matrix (i.e., column one, composed of $PE_{11}$, $PE_{21}$, $PE_{31}$) is then instructed to send its result number East to an adjacent processor element in an even numbered column (i.e., to column two, composed of $PE_{12}$, $PE_{22}$, $PE_{32}$) The processors of the evenly numbered columns are then ordered to simultaneously add the result numbers they received from their West neighbors to the result number stored in their own memory units. Thus, the result (a+b+c+d) is formed in processor element $PE_{12}$, the result (e+f+g+h) is formed in processor element $PE_{14}$, and so on. The next step is to order the result holding processors of odd numbered rows (i.e., $PE_{12}$ and $PE_{14}$ of row 1) to transmit their results to the result holding processors of evenly numbered rows (i.e., to $PE_{22}$ and $PE_{24}$ of row 2) directly below them. Processor elements $PE_{32}$ and $PE_{34}$ remain idle in this step because there is no lower row for them to transmit information to. The receiving processors then add their own results to the received results to thereby form the subtotal sum (a+b+c+d+i+j+k+l) in processor $PE_{22}$ and the subtotal sum (e+f+g+h+m+n+o+p) in processor $PE_{24}$. The next step is to have processor elements $PE_{22}$ and $PE_{24}$ transmit their results to processor elements $PE_{32}$ and $PE_{34}$ respectively. The receiving processors, $PE_{32}$ and $PE_{34}$, then add the received information to their own results to thereby respectively form the subtotals (a+b+...+s+t) and (e+f+...+w+x). These last two subtotals are then transmitted from processors $PE_{32}$ and $PE_{34}$ to processor element $PE_{33}$ wherein they are added in a final step to produce the sum of the 24 initial numbers: a, b, c, ..., x. The resultant sum is then extracted from $PE_{33}$ and sent to a solution receiving device such as a video display unit (not shown).

At least three types of messaging should be noted to have occurred in the above example: the transmission of elemental data sets (a,b), (c,d), ..., (w,x) from a data-producing device (i.e., an input/output [I/O] unit, not-shown) to corresponding PE's; the transmission of intermediate result data (subtotals) between adjacent and-/or non-adjacent PE's; and the extraction of a solution from a specific one PE (i.e., $PE_{33}$) or more (if the subtotal values had been required) within the array for transmission to a solution-receiving device (i.e., a video display unit, not shown).

If we ignore the time it takes for message transmission to, from or within the array $A_N$, it can be seen that the amount of "computation" time needed for solving a problem 20 in parallel can be significantly less (i.e., approximately 5 times less) than the amount of time needed for processing the same information serially (5/f<24/f).

In theory, the advantage of parallel processing over serial processing should grow exponentially as the size of the problem 20 and the number of processors N in the array $A_N$ are correspondingly increased. For example, if instead of 24 there were $2,048 = 2(2^{10})$ numbers to be added and the parallel processing machine 50 shown in FIG. 2 were expanded from a 3×4 array to an array of 32×32=1,024 processors, then the parallel compute and fold process can produce the sum of all 2,048 numbers in just ten steps. (The number of additions to be performed, which is initially 1,024, is halved with each compute and-fold step.)

But it can be seen in the above example, that as the solution progresses from one compute/fold step to the next, messages have to be exchanged between further and further spaced apart processing elements, $PE_{(x,y)}$ and $PE_{(x+i,y+j)}$. For the NEWS topology shown in FIG. 2A, messaging time tends to increase geometrically with each next step of the compute and fold method. At first, processors are communicating only with immediately neighboring processors in the next adjacent row or column, but as the solution progresses, messaging must take place between every other row, every other column, then every four columns, every four rows, and so forth. Accordingly, when the number of operands grows in a problem, and the number of processors N is increased (scaled upwardly) to match the size of the problem, messaging time increases and eventually begins to overshadow compute time. The price/performance advantage of a NEWS style machine then reaches a plateau or worse, begins to decline.

To overcome the messaging limitations of the two-dimensional NEWS structure, it has been proposed that massively parallel machines should be designed with an interprocessor communication system which is dimension-independent so that the time it takes to transmit a message from any one processor element ($PE_x$) to any other processor element ($PE_y$) will be generally independent of the physical or logical distance (x-y) between processing elements. Such dimension-independent communication systems are sometimes referred to as "global routers" because their messaging performance is uniform regardless of whether the messaging distance is long (global) or short (local). In contrast, communication systems which perform best for short so-called "local hops" but slow down when long distance messaging is required are referred to as "local routers."

Figure 3A:
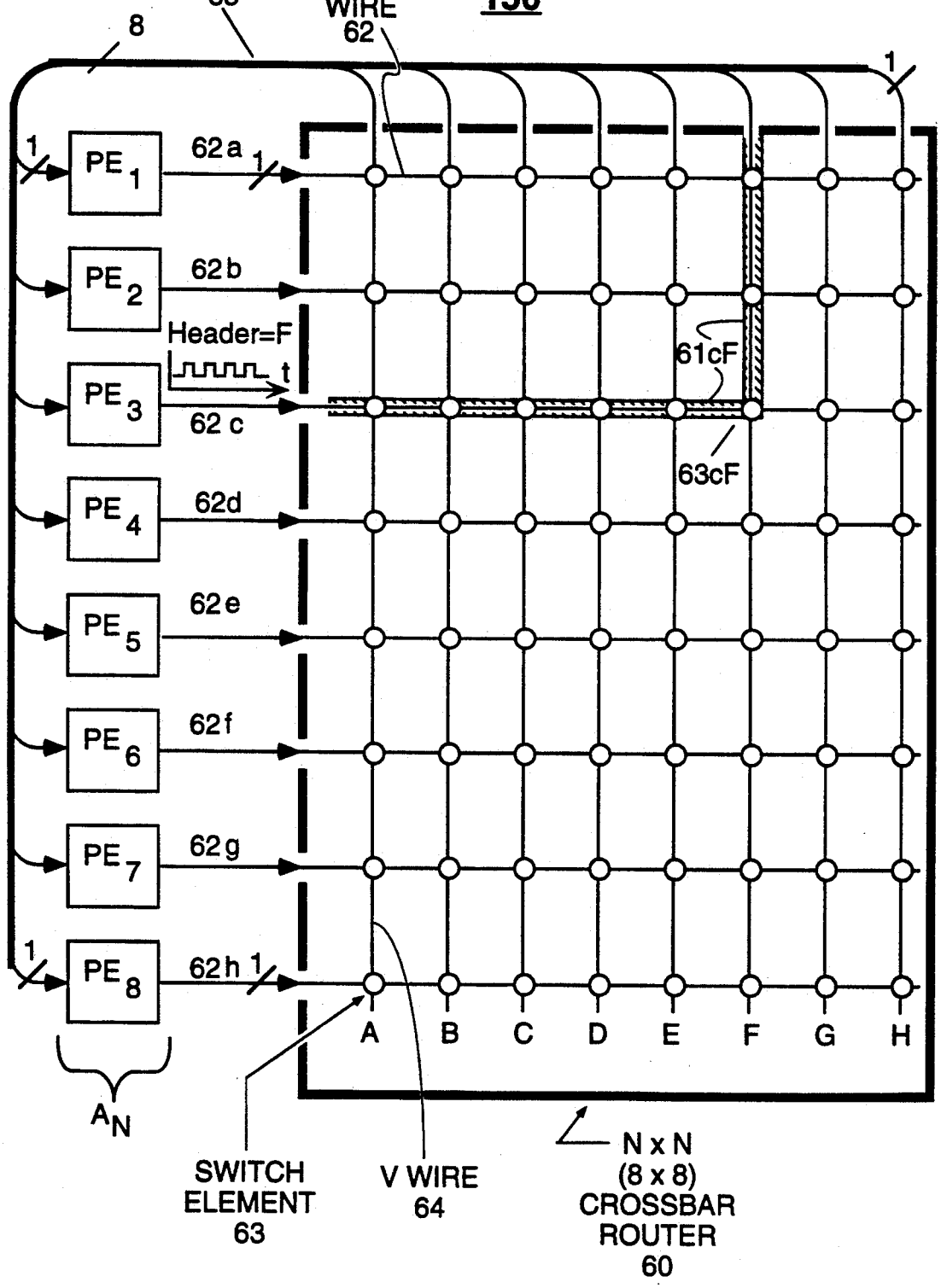
FIG. 3A is a block diagram of a single-stage crossbar type of message routing network.

FIG. 3A shows a computing machine 150 having a single-stage, N×N crossbar router 60 which can function as a "global" router for arrays of relatively small size. (An 8×8 structure is illustrated by way of example.) A message transmitting wire 62 extends horizontally into the single-stage router 60 from each of the N processor elements in the array $A_N$ (an array of 8 processor elements $PE_1$-$PE_8$ is shown) Lower cases suffixes: a, b, c, ..., h are used here to individually identify the horizontal wires as 62a, 62b, ..., 62h. A data receiving wire 64 extends vertically through the router 60 from each of the N processor elements to overlap each of the N data transmitting wires 62. Upper case suffixes A, B, C, ..., H are used to individually denote each of the vertical wires as 64A, 64B, ..., 64H. A discrete switch element 63 is formed at each intersection of a horizontal transmitting wire 62 and a vertical receiving wire 64 to selectively form a message routing path (i.e., 61cF) in which a desired transmitting wire (i.e., 62c) is connected by a single switch element 63 to a desired message receiving wire (i.e., 64F). Target bus 65 returns the vertical wires 64 to corresponding ones of the target PE's. Each switch element 63 may be individually identified by the suffix letters belonging to its intersecting horizontal and vertical wires, i.e., 63cF joins 62c to 64F and $PE_6$ is the corresponding target processor.

With proper actuation of the switching elements 63 shown in FIG. 3A, any processor $PE_x$ (x being an arbitrary identifier) can communicate directly with any other processor PE$_y$, including itself (y being an arbitrary identifier which can be equal to or different from x). Messaging time can become independent of the physical or logical placement of the processor elements. Physical or logical distance (x-y) between processor elements (PE$_x$ to PE$_y$) is no longer a factor in determining messaging time. If, for example, processor PE$_3$ wishes to send a message to processor PE$_6$, the message originating processor, PE$_3$, does not have to send the message through intermediately located processors (i.e. PE$_4$ and PE$_5$). Instead, the message originating processor, PE$_3$, simply issues a control signal to switch element 63cF causing that switch element 63cF to close. A message routing path 61cF is then formed in one step to route messages from PE$_3$ through horizontal wire 63c, switch element 63cF, vertical wire 64F and bus 65 to thus link processor PE$_3$ to processor PE$_6$.

For the sake of simplicity, terms such as "horizontal wire" and "vertical wire" will be used throughout the description to designate wires belonging to opposite ends of a router stage (i.e., input end and output end). It should be understood from the outset that such designations are not necessarily descriptive of the physical orientation of wires in a router stage although they could be. Also it will be noted that lower case suffix letters are used throughout to denote individual horizontal wires specifically as a, b, c, ... etc. and generically by the lower case suffix "x". (The latter is not to be confused with the underlined symbol "x" which denotes the word "by" or a cross product such as in "N×N") Upper case suffix letters are likewise used throughout to identify vertical wires within a router stage individually as A, B, C, ... etc. and generically by the upper case letter "Y". Switching elements at the intersections of horizontal and vertical wires are thus designated by combining the lower case and upper case suffix letters, as for example in "switch element 63xY". Routing paths are similarly identified by identifying with the lower and upper case suffix letters of the horizontal and vertical wires which form the paths, as for example, "routing path 61cF" which connects PE$_3$ to PE$_6$ in the above example.

Those skilled in the art will appreciate that if each switch element 63xY in the N×N array 60 received a multitude of control wires for closing and opening that switch 63xY, the circuitry 150 would require a relatively large number of wires. It is common practice to minimize the number of wires used in the system 50 by issuing a switching control signal from each PE directly on the horizontal line 62x which will carry the PE's message. In the example given here, processor PE$_3$ places a serial string of digital bits, referred to as a "route-requesting header" on its horizontal wire 62c. The route-requesting header is received by all of switching elements, 63cA, 63cB, ..., 63cH on the horizontal wire 62c. Each switching element 63 includes logic circuitry (not shown) which tests the information in the received route-requesting header to see if it matches the suffix identifier of its switching element. In this case, the header information, Header=F, will denote to switching element 63cF on vertical line "F" that it is the target of the route-requesting header and only switch 63cF will respond. Once switch element 63cF closes, other serial bits asserted by PE$_3$ on horizontal line 62c will be seen on vertical line 64F and transferred from there to the target processor, PE$_6$.

With the N×N crossbar router 60 of FIG. 3A, not only is it possible for any one processor PE$_x$ in the array A$_N$ to directly communicate with any other single processor PE$_y$, but it is possible to have all N of the processors each sending a message to another one of the N processors of the array A$_N$ simultaneously, so that messaging occurs in parallel (8 messages pass simultaneously) rather than one at a time. Such N-wide parallel messaging can occur as long as no two transmitting processors (PE's) request the same vertical wire 64Y. If two or more PE's request the same vertical wire 64Y, contention occurs and they must take turns.

While the N×N crossbar router 60 shown in FIG. 3A is appealing for its simplicity, it is not easily scaled to larger sizes. Major problems arise when massively parallel machines having thousands of processors are contemplated. As the number, N, of processor elements (PE's) in the array grows, the number of switch elements 63 in the crossbar router 60 grows as the square of N and the number of wires, 62 and 64, grows as 2N. For a processor array of 1,024 processor elements (PE's) more than two thousand wires would be needed and more than one million switching elements would be needed. This is just for building the router 60 without accounting for the circuitry of the processor elements PE$_1$-PE$_N$.

It might be possible with current technology (i.e., using line widths in the range 0.8-1.5 microns on each of plural IC's) to squeeze such a 1,024×1,024 crossbar router 60 and all its associated processor elements PE$_1$—PE$_{1,024}$ (not shown) on a single, practically-sized, printed circuit board (PCB), but what happens when a user wishes to up-scale the illustrated machine 150 further and to increase the size of the array to say 16,384 processor elements?. The cost of such a structure can become prohibitively high. Some $2.7 \times 10^8$ switching elements would be required on a circuit board, just for the router. Physical size would become a problem. More importantly, as the number of switching elements 63 is increased, there is a greater likelihood that one of them will randomly malfunction and the router 60 will become inoperative. Thus, a large single-stage crossbar router is impractical not only because of cost but also from the standpoint of system reliability and from consideration of how so many elements and/or wires can be squeezed onto a reasonably-sized integrated circuit chip (usually one centimeter by one centimeter in dimension) or for that matter, even if the circuitry can be partitioned among a plurality of integrated circuit chips, how so many devices can be squeezed onto an industry-standard sized board (i.e., a "blank" printed circuit board of dimensions equal to or less than 24 inches by 36 inches or 18 inches by 24 inches).

It will be noted that each of the horizontal transmitting wires 62x and vertical receiving wires 64Y within the crossbar router 60 grows in length as the number N of processors grows. This produces for each routing path, 61xY, an inherent increase in electron flight time, (the time it takes a signal traveling at up to the speed of light to travel through a length of wire, typically flight time is on the order of one nanosecond per foot or 0.1 nanosecond per inch). Growth of wire length further produces an inherent increase in inductance, resistance and capacitance on each message routing path. Such an increase lengthens the time needed for a single bit within each message to travel through the message routing path 61xY. Moreover, since there are N switch elements 63 attached to each horizontal transmitting wire 62x and N switch elements 63 also attached to each vertical receiving wire 64Y, when N is increased ($N=N+\Delta N$), the added capacitance of the $2\Delta N$ more switch elements on each routing path exacerbates the problem of excess capacitance and decreases bit transmitting speed.

Figure 3B:
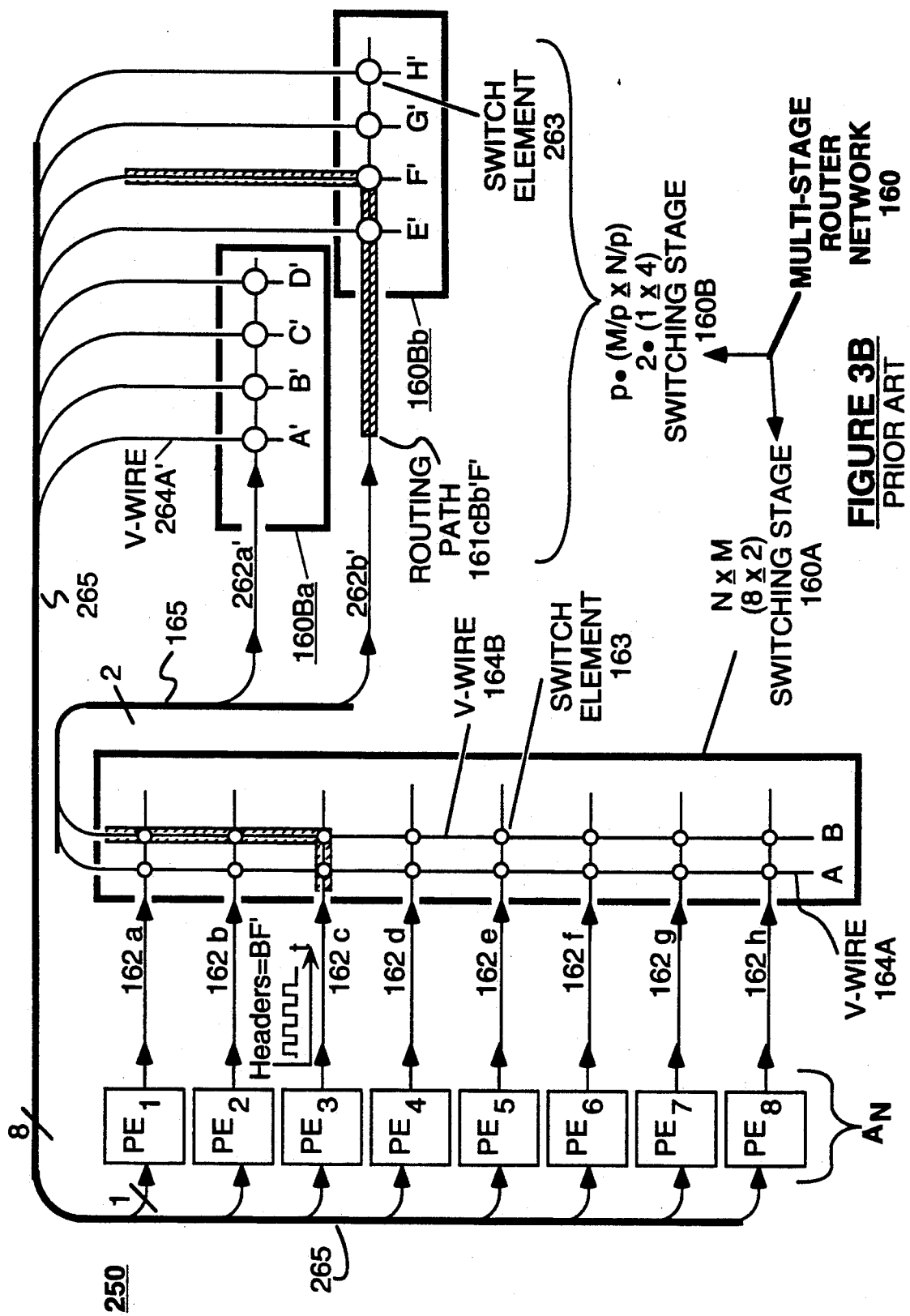
FIG. 3B is a block diagram of a multi-stage message routing network.

Referring to FIG. 3B, a so-called "multi-stage" router 160 has been proposed (i.e., by Grondalski) to overcome some of the drawbacks associated with the $N\times N$ single-stage crossbar router 60 of FIG. 3A. The multi-stage router 160 is comprised of a $N\times M$ first switching stage 160A (N horizontal wires in by M vertical wires out) and a $M\times N$ second switching stage 160B (M horizontal wires in by N vertical wires out) coupled one to the next as shown. The second stage 160B is further divided into a number $p=2$ of substages, 160Ba and 160Bb, each of dimensions $M/p\times N/p$, where p is a partitioning integer. For the sake of clarity, the symbol "x" is used here to indicate a cross product, where the number to the left of the "x" symbol represents the number of horizontal wires entering a stage and the number to the right of the "x" symbol represents the number of vertical wires emerging from the stage. The dot product symbol "·" is used here to represent scaler multiplication or replication as opposed to a cross product multiplication. The dimensions of the second stage 160B, in its entirety, may be represented by this notation as the formula: $p\cdot(M/p\times N/p)$. The "p·" portion of the formula indicates that there is a plurality of $p=2$ substages, 160Ba and 160Bb. The "$(M/p=N/p)$" portion indicates that each substage 160Ba and 160Bb has M/p horizontal wires and N/p vertical wires. As specifically shown in FIG. 3B, each of the substages, 160Ba and 160Bb, has only one horizontal wire 262 going in and four vertical wires 264 going out. This number of wires in and out is less than the eight wires in and eight wires out of the crossbar router 60 shown in FIG. 3A. Thus, when wiring density is measured in terms of wires per stage or substage, the second stage 160B of multi-stage system 250 in FIG. 3B has a lower per stage wiring density than the one-stage router system 60 of FIG. 3A. The first stage 160A of FIG. 3B also has fewer wires, eight in and only two out. Thus on a per stage or substage basis, the overall wiring density of the multistage router 160 is less than that of the single stage router 60.

Also, in contrast to the $N^2$ switch elements per stage of the single stage crossbar router 60 (FIG. 3A), the number of switch elements 163 in the first stage 160A of the multistage router (FIG. 3B) is $N\times M$ while the number of switch elements 263 in the second stage 160B is $p\cdot(M/p\times N/p)$ or more simply, $(M\times N)/p$. The total number of switch elements in the multi-stage network 160 is therefore N times 2M. The total number of vertical and horizontal wires is $2N+2M$. The dimension number, M, may be chosen such that multiplier 2M is less than N and so that, as a result, fewer than $N^2$ switch elements are used for defining the entire message routing network 160. In the instant case, an $8\times2$ first stage 160A is shown coupled to a $2\cdot(1\times4)$ second stage 160B.

In the multi-stage system 250 of FIG. 3B, a horizontal message transmitting wire 162x extends respectively from each processor PE-x of the N processor elements (PE's) in processor array $A_N$ into the first switching stage 160A. As before, lower case letters are used here to individually denote each of the horizontal wires as 162a, 162b, ..., 162h. A number $M=2$ of first-stage vertical wires 164 extend vertically to overlap the horizontally extending transmitting wires 162. Upper case suffixes denote each of the vertical wires individually as 164A and 164B. The first-stage vertical wires 164 connect to an inter-stage bus 165 (of bus width M) which couples the first-stage vertical wires 164A, 164B to correspondingly identified horizontally-extending second-stage wires 262a' and 262b' formed in the second switching stage 160B. The second stage horizontal wires 262 are overlapped in the second stage 160B by N vertically extending message receiving wires 264. Upper case apostrophed suffixes denote these second-stage vertical wires individually as 264A', 264B', ..., 264H'. Respective switching elements 163 and 263 are provided at the horizontal/vertical wire intersections of the first and second stages, 160A and 160B, as shown for selectively routing a message from a preselected first-stage horizontal wire 162x to a preselected intermediate routing wire 165, and from there, to a preselected second-stage vertical wire 264Y'. Target bus 265 joins the vertical wires 264 to corresponding target ones of the PE's in the processor array, $A_N$.

The formation of a message routing path takes place in accordance with what can be called a "crossbar wormholing" method. The transmitting processor (i.e., $PE_3$) asserts a first addressing or route-requesting portion of a header string (i.e., B of Header=BF') on its transmitting wire (i.e., 162c) to select a specific vertical line (i.e., 164B) in the first switching stage 160A. As soon as a first connection is made coupling horizontal wire 162c to vertical wire 164B, the transmitting processor $PE_3$ asserts a second route-requesting portion of the header string (i.e., F' of Header=BF') which designates a specific vertical wire, i.e., 264F', in the second stage 160B. Switch element 263b'F' then closes responsively within substage 160Bb of the second stage. Thus, a message routing path is formed in two steps and/or stages rather than in one step and/or stage as occurred in the single-stage crossbar router of FIG. 3A. The target process $PE_6$ does not receive the header information because the bits of Header=BF' are "retired" before the path to $PE_6$ is completed.

The time penalty paid in FIG. 3B for forming a route in two-steps rather than one step is minor compared to the advantages derived from the multi-stage structure. The number of switch elements 163 and 263 in the multi-stage router 160 is equal to $2\cdot(N\times M)$ rather than to the square of N, and thus, when 2NM is made less than N, substantial advantages may be derived both in terms of cost and size. The circuit can be partitioned into practically-sized portions (stages or substages) each of which portions can be implemented in a discrete set of one or more IC's. Fewer switching elements may be used in each stage and less wires are needed within each individual stage or substage ($N+M$ wires in stage 160A and $M/p+N/p$ wires in each of substages 160Ba and 160Bb.)

But there are drawbacks as well. When the wire width, M, of intermediate bus 165 is less than N only the fraction M/N of the N processing elements can simultaneously transmit messages to other processing elements in the processor array $A_N$. If more than M processors wish to send messages at the same time, the excess number of processors have to wait for turns. A first set of M processors must finish transmitting their messages in a first messaging turn (cycle) before a next set of M processors can be granted access through the M wires of the intermediate routing bus 165 in a subsequent messaging cycle. Accordingly, the parallel messaging bandwidth, Marmbw, of the parallel system 250 can constitute a critical bottleneck to solution speed. If the parallel bandwidth value, Marmbw, cannot be scaled upwardly and concommitantly with the computation bandwidth, Npubw, of the system 250, the system 250 lacks the desired feature of upward scalability.

In the computing machine 250 of FIG. 3B, the total length of the intermediate routing bus 165 plus vertical wires 164 and horizontal wires 262 grows as 2N when the number of processors N is increased, and as such, the problem of excessive bit transmission delay due to increased electron flight-time, inductance, resistance and/or capacitance not only remains as a problem like it did in FIG. 3A, but it is exacerbated by the presence of the intermediate bus 165.

Referring to FIG. 3C, there is shown an equivalent circuit of two message routing paths 61xY and 61x'Y' which could be formed within either of the respective routers 60 or 160 of FIGS. 3A or 3B (x, x', Y and Y' denote arbitrary suffix letters here). First path 61xY couples a message originating node $N_o$ at a first message originating processor $PE_O$ to a message target node $N_T$ at first target processor $PE_T$. Both processor elements, $PE_O$ and $PE_T$, are synchronized to a common system clock (of frequency, f) which defines bit times $T_1$, $T_2$, $T_3$, etc.

The first message originating processor $PE_O$ is shown to be producing a well-defined input voltage signal $V_{in}$ at the input node No of the first message routing path 61xY. A definitive logic high level (H) or a definitive logic low level (L) is formed at each of the respective bit times $T_1$, $T_2$, ..., $T_7$. However, at the output node $N_T$ of the first message routing path 61xY, a relatively corrupted and delayed output voltage signal $V_{out}$ is shown formed such that it is no longer clear whether a logic high (H) or a logic low (L) exists at each of the bit times $T_1$, $T_2$, ... $T_7$ designated by the system clock.

Such signal corruption can occur because of crosstalk between adjacent wires, aliasing between sequentially transmitted bits, signal reflections, and other message corrupting phenomenon. By way of example, second path 61x'Y' is shown to be carrying an arbitrary signal $V_x$ whose bits happen to oppose those of input signal $V_{in}$ so that corruption is worsened by cross-talk between paths 61xY and 61x'Y'. Corruption tends to occur most notably when the frequency, f, of the system clock is raised to exceed the capability of the message routing path 61xY to propagate a clearly defined logic level (H or L) from one end $N_o$ of the path to the other end $N_T$ within the bit period $(T_2-T_1)$ of the system. The frequency of the system clock $(f=1/[T_2-T_1])$ in combination with factors such as the signal propagating distance, D, between the message origin and target nodes (No and $N_T$) of the first path, and the values, L, R and C of the respective inductance, resistance and capacitance elements (discrete or distributed) within the equivalent circuit of first path 61xY determine when this corruption will happen. Further factors which could add to corruption are mutual inductance $L_m$ and parasitic capacitance $C_p$ which couple signals (i.e., $V_x$) in the second routing path 61x'Y' so that they interfere with signals ($V_{in}$) traveling through the first path 61xY. (The second path 61x'Y' links arbitrary processor elements, $PE_x$ to $PE_y$.)

Since the values D,L,R,C,$L_m$, and $C_p$ of each path all tend to grow as the array size N of either of the parallel processing systems 150 and 250 shown in FIGS. 3A and 3B grows; when the array size, N, is scaled upwardly, the system clock frequency, f, needs to be correspondingly reduced (at least during messaging) to prevent message corruption It appears from the competing interplay between router size, N, and corrupting factors, D, L, R, C, $L_m$, $C_p$ and system frequency, f, that there is an inherent limit to the speed at which messages may be transmitted through a single-stage crossbar or a multi-stage routing network (that there is an inherent limit to serial and parallel messaging bandwidths, armbw and Marmbw).

In the case of the previously mentioned Grondalski machine (as exemplified by FIG. 3B) it was found that during messaging through the multistage router, 160, the system clock had to be intentionally slowed below the peak speed of the processors (i.e. slowed from a bit period of $(T_2-T_1)=100$ nanoseconds to a bit period of 250 nS) so that bit corruption would not occur. This indicates that, within a Grondalski type machine, the message transmitting time of the routing network 160 (i.e., 250 nS per bit) rather than the compute time of the processor elements (i.e., 100 nS per bit) constitutes the major bottleneck to improved performance (to obtaining maximum Npubw together with maximum Marmbw).

Referring to FIG. 4A there is shown a first embodiment 400 of a parallel processing engine in accordance with the invention. The engine 400 comprises a relatively large number N>10 of processor elements $PE_1$, $PE_2$..., $PE_N$ wherein each processor element $PE_x$ is able to send a message through a "pipelined" multistage message routing network 460 to any other processor element $PE_y$ in the array in relatively short time (x and y are arbitrary identifiers here). In contrast to the 250 nS per bit random messaging speed of the Grondalski machine, a comparably sized machine in accordance with the invention can exhibit a random messaging speed of roughly 75 nS or less per bit per path (approximately three or more times faster).

The illustrated router network 460 is comprised of first and second routing stages 460A and 460B plus first stage and second stage pipelining latch sets 415 and 425, the individual registers of which latch sets, 415x and 425x', are clocked by the system clock (bit period, $1/f=70-75$ nanoseconds). Each processor element, $PE_x$, has a message originating wire 410x coupled to a first terminal of a bidirectional pipeline latch, i.e., 415x within the first stage latch set 415. The suffix x denotes here a corresponding one of the suffixes for identifying individual processor elements $PE_1$, $PE_2$, $PE_3$, etc. in an array $A_N$, individual wires 410a, 410b, 410c, etc. in an array-to-stage-1 connecting bus 410, individual latches 415a, 415b, 415c, etc. in the stage-1 latch set 415, and individual wires 426a, 462b, 426c, etc. in a latch-to-switch-matrix connecting bus 416. A second terminal of each bidirectional register 415x is coupled to a first-stage horizontally-extending wire 462x passing from the connecting bus 416 into first bidirectional switching stage 460A. Although arrowheads are shown on the wires 410x, 462x and others in FIG. 4A, it is to be understood that the message routing paths formed by these wires are bidirectional and that the arrows are included merely for the sake of simplifying the explanation of a left to right route-forming process which will soon be described. After a routing path is formed ("opened"), messaging can take place from the route originating processor $PE_x$ to the target processor $PE_y$ or the other way through the opened path, from $PE_y$ to $PE_x$.

Within the first N×M (i.e., 16×4) switching stage 460A, there is provided a number M (i.e., M=4) of first stage vertical wires 464 extending to overlap the N first-stage horizontal wires 462. Switching elements 463 are provided at the intersections of the first-stage horizontal and vertical wires, 462 and 464, for selectively routing a message (either unidirectionally or bidirectionally) through a predetermined one of the first stage horizontally extending wires 462 and from there, on to a header-selected one of the first stage vertically extending wires 464.

As in the crossbar "wormholing" technique of FIG. 3B, in FIG. 4A a route-requesting processor; $PE_3$ for example, sends a first route-requesting field of bits (B of full header BF') onto the first stage horizontal wire 462c. A corresponding switch element 463 in horizontal set 463cA, 463cB, 463cC and 463cD closes to thereby "retire" the first field, B of Header=BF', and replace the retired field with movement of the remaining request-bits (F' of Header=BF') onto a distinguishable one of vertical wires 464A, 464B, 464C and 464D.

In FIG. 4A, each first stage vertical wire 464Y (Y denotes here an arbitrary one of vertical wire identifiers A, B, C, D in the first stage 460A) is coupled by way intermediate bus 465 to a first terminal of a second-stage bidirectional latch 425x' (x' denotes here an arbitrary one of the horizontal wire identifiers a', b', c', d' in the second stage 460B). A corresponding second terminal of each second stage bidirectional latch 425x' is coupled to a second stage horizontally extending wire 472x' within the second, P·(M/P×N/P) switching stage 460B (here shown as a 4·(1×4) second stage). A number, N=16, of second stage vertically extending wires 474 cross over the M second horizontally extending wires 472. A number, P=4 for example, of M/P by N/P (here, 1×4) substages, 460Ba', 460Bb', 460Bc' and 460Bd', are provided within the second stage 460B as shown. A bidirectional switching element 473 is provided at the intersection within each second-stage substage 460Bx' of each of the horizontally and vertically extending second wires 472x' and 474Y' (where x' and Y' are arbitrary horizontal and vertical identifiers here). The second stage vertically extending wires 474Y' join into a message targeting bus 485 which couples the vertical wires 474Y' of the second switching stage 460B back to target ones ($PE_y$) of the N processor elements $PE_1$-$PE_N$ through a plurality of N target registers 445x. Each of the P substages 460Ba'-460Bd' of the second stage contributes N/P vertical wires into the N-wire wide target bus 485 (in the illustrated case, four vertical wires per substage 460Bx).

It should be noted that the multi-stage pipelined system 400 of FIG. 4A is easily partitioned by the integer P or one of its multiples into discrete circuit portions, each of which portions can be implemented on a separate IC and/or printed circuit board if desired. By way of example, a first partition box 486 is shown to enclose target latch 445a and processor element $PE_1$ to thereby indicate that these circuit parts are to be provided within a first integrated circuit chip (i.e., an $IC_{486}$) A second partition box 487 embraces the stage-1 latch set 415 and first routing stage 460A to indicate that these parts are to be incorporated in a second chip (i.e., $IC_{487}$) A third partition box 488 encloses second stage register 425a and substage 460Ba of the second router stage 460B to indicate that these parts are incorporated within yet a third discrete enclosure or support means (i.e., $IC_{488}$). The illustrated partitionings, 486-488, are of course merely exemplary. Box 486 could be expanded to enclose $PE_2$ and target latch 445b (not shown) or to enclose further components if desired. Partition box 488 could be similarly expanded to incorporate second-stage register 425b' and substage 460Bb. An important aspect to be considered in such partitioning is the pin count of each IC and/or of each printed circuit board PCB. Each pair of a stage-2 latch 425x' and a substage 460Bx calls for an addition of one horizontal wire pin (connecting to wire 465x of the intermediate bus) and four vertical wire pins (each connecting to a wire 485Y of the target bus). While it is preferable to keep component density high for the sake of cost minimization it is also preferable to keep pin count low. Thus, there is a certain tradeoff between obtaining a desirably higher component density on a per IC or per PCB basis and at the same time generating an undesirably higher pin count on a per IC or per PCB basis. Other aspects to be considered in the partitioning decision are wire density and wire length. When partitioned parts are separately placed on different printed circuit boards, interconnection wiring becomes relatively long. This is disadvantageous because signal propagation time increases. When partitioned parts are placed closely together on the same PCB or IC, the density of interconnection wires tends to disadvantageously increase. Wire length and density affect the messaging factors D, L, R, C, $L_m$ and $C_p$ of all the router paths.

An "expansion" bus 489 emerges from the target bus 485. The forked array of wires 489x emerging from the target bus 485 at the left side of FIG. 4A (left pointing arrows) indicate that, as well as being routed to the target stage pipeline latches 445, messages may be alternately or simultaneously routed from the target bus 485 to other devices (i.e., by each left pointing wire 489x to, for example, I/O devices such as external disk drives or graphics drives or to another "expansion" bank of PE's, not shown). This aspect of the invention will be described in more detail later. For now, it is sufficient to note that the hardware (i.e. wires) and messaging bandwidths of the target bus 485 and intermediate bus 465 are shared by the target PE's and by the other devices (i.e. the I/O devices or expansion PE's) to which messages may be simultaneously or alternately sent through the "expansion" bus 489. When the dimensional value M of the intermediate bus 465 is increased, the benefit of increased router bandwidth, Marmbw, is bestowed on both processor-to-processor messaging and processor-to-I/O messaging because of this expansion "tapping" into the router network 460 at a point located after the M-wire wide bottleneck that is defined by the intermediate bus 465. I/O messaging bandwidth can thus increase integrally and in an efficiently matched manner with the PE-to-PE messaging bandwidth, Marmbw. More specifically, I/O messaging bandwidth should be roughly equal to both computation-bandwidth and interprocessor messaging bandwidth. By tapping into the global router network 460 as indicated it becomes possible to make I/O messaging bandwidth equal to interprocessor messaging bandwidth and it becomes possible to scale I/O bandwidth concomitantly with both interprocessor messaging bandwidth and computation bandwidth. This is because the messaging bandwidth of the global router tends to increase in step with the number of processor elements within the array. Moreover, the same computer software which mediates interprocessor messaging can mediate PE to I/O messaging because substantially the same hardware is used for both types of messaging. Thus, from a software point of view, data contained within I/O devices may be shared among the processor elements of a parallel array in much the same way that data contained in the local memory (PE-MEM) of each PE is shared by movement through the global router to other PE's of the array. The address space of I/O data is essentially merged with the address space of the PE memory units (PE-MEM). As will be seen later (FIG. 5A), it is also within the contemplation of the invention to provide an expansion tap from the intermediate bus 465.

Figure 4B:
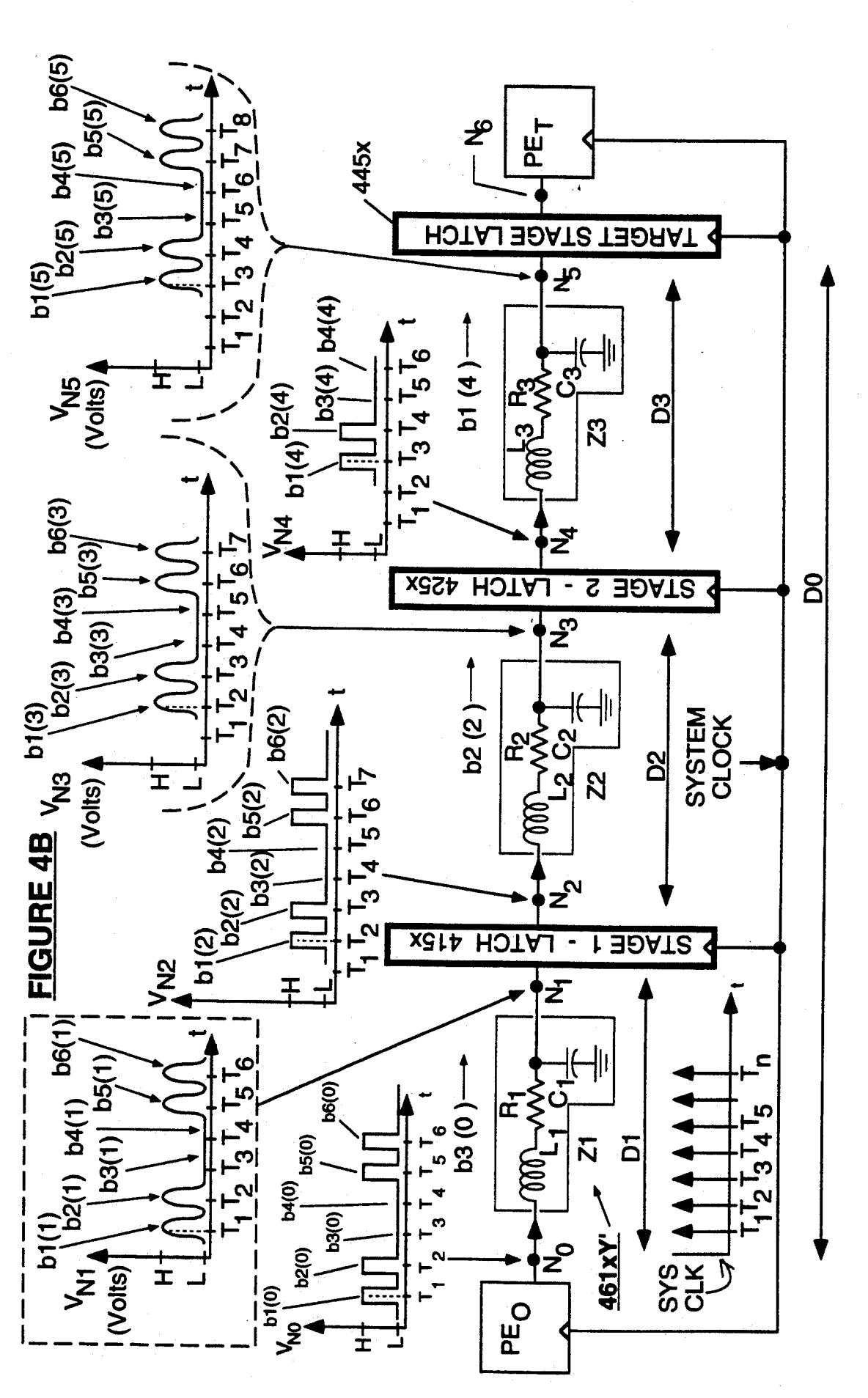

Once a message routing path (i.e., 461cBb'F') is established through the multi-stage router network 460 of FIG. 4A, as in this example by forming a connection between originating wire 410c, intermediate wires 462c, 464B, 465b, 472' and second-stage vertical wire 474F'; the message originating processor $PE_3$ serially transmits additional bits of its message, which follow the route requesting header BF'. Each of the message bits is stored and held for one bit time apiece in each of the respective pipeline registers 415, 425 and 445 of each created route. Although this adds a delay of three bit times to the transmission of messages between the originating processor $PE_3$ and the target processor $PE_6$, it will now be seen by referring to FIG. 4B that the rate at which messages travel through the established routing path 461cBb'F' (as measured in terms of bits per second per single-bit wide path) can be increased significantly in comparison to a comparable routing path of FIG. 3B (i.e., path 161cBb'F') because of the presence of these pipeline registers 415, 425 and 445.

FIG. 4B shows an equivalent circuit of a messaging network (i.e., of embodiment 400). The equivalent circuit comprises a message-originating processor element $PE_O$ which is coupled to a target processor element $PE_T$ by way of a "pipelined" message routing path 461xY' (x represents here an arbitrary horizontal wire from the set a, b, c, . . . , p and Y' represents here an arbitrary vertical wire from the set A', B', C', . . . , P'.) The latter path 461xY' is formed by routing segments $Z_1$, $Z_2$ and $Z_3$ and respective first, second and third pipeline registers 415x, 425x and 445x that are respectively provided at the juncture of segment $Z_1$ to $Z_2$, at the juncture of segment $Z_2$ to $Z_3$ and at the juncture of segment $Z_2$ to the target processor element $PE_T$.

The bit delaying and/or wave-shape corrupting characteristics of the first routing segment $Z_1$ are denoted by equivalent circuit factors $D_1$, $L_1$, $R_1$ and $C_1$, which respectively represent signal propagation distance, path inductance, path resistance and path-to-ground capacitance. These factors are determined in the embodiment 400 (FIG. 4A) primarily by the wire length of bus 410 which couples a message originating processor $PE_x$ to a first stage latch 415x.

The bit delaying characteristics of the second routing segment $Z_2$ are respectively denoted in FIG. 4B by circuit factors $D_2$, $L_2$, $R_2$ and $C_2$. These factors are determined in embodiment 400 (FIG. 4A) primarily by the capacitance of the switching elements 463 in the first switching stage 460A and the lengths of wires 462, 464 in the first router stage 460A as well as the wires in the inter-stage bus 465.

The bit delaying characteristics of the third routing segment $Z_3$ are likewise defined by equivalent circuit factors $D_3$, $L_3$, $R_3$ and $C_3$ which respectively represent distance, inductance, resistance and capacitance. These factors are primarily determined in FIG. 4A by the capacitances of switching elements 473 and the length of wires 472 and 474 in second stage 406B plus the wires in target bus 485. While the crosstalk factors, $L_m$ and $C_p$, that contribute to interference between separate paths are not noted in FIG. 4B, it is to be understood that such factors are segment-wise assignable to the segments $Z_1$, $Z_2$, $Z_3$ of each path 461xY'. Cross-talk coupling occurs mainly between segments of different paths when the segments parts are physically adjacent and run parallel to one another for relatively long distances.

If the first and second pipeline registers, 415 and 425, were not included in FIG. 4B, then the bit delaying and/or corrupting characteristics of the unified message routing path 461xY' would be roughly equal to the sum of the factors of each of the segments $D_0=D_1+D_2+D_3$, $L_0=L_1+L_2+L_3$, $R_0=R_1+R_2+R_3$ and $C_0=C_1+C_2+C_3$. Crosstalk effects, $L_m$ and $C_p$, between unified paths would likewise become functions of the sum of effects belonging to individual segments, $Z_1$, $Z_2$ and $Z_3$ However, because the pipeline registers 415x, 425x and 445x are present, at least three bits $b_1$, $b_2$, $b_3$ can be simultaneously traveling through the segmented routing path 461xY' instead of just one bit and each bit is subject to the bit delaying and/or corrupting effects of its local segment rather than to the effects of the path 461xY' taken as a whole. The number of bits per second which can be transferred through the entire path 461xY' is multiplied at least by a factor of approximately three due to the introduction of the first two pipeline registers (latches or flip flops), 415x and 425x.

Once the pipeline registers 415x and 425x are primed with initial data, a first generated bit $b_1$ of a serial message stream (i.e., bit stream $V_{N0}$) can be traveling from the output of the second stage pipeline latch 425x through the third path segment $Z_3$ to the target processor $PE_T$. During this same time, a second generated bit $b_2$ of the serial message stream can be traveling from the first stage pipeline latch 415x through the second segment $Z_2$ to the input of the stage-2 pipeline latch 425x. Simultaneously, a third generated bit $b_3$ of the serial message stream can be traveling from the message originating processor $PE_O$ to the input of the stage-1 pipeline latch 415x through the first path segment $Z_1$. (And of course, even though it is not shown, a fourth bit can be traveling from target latch 445x to the target processor $PE_T$).

FIG. 4B specifically shows in left-to-right order the voltage versus time waveforms of signals $V_{N0}$ through $V_{N5}$ appearing respectively at the output node $N_0$ of $PE_O$, output node $N_1$ of first segment $Z_1$, output node $N_2$ of first stage latch 415x, output node $N_3$ of second segment $Z_2$, output node $N_4$ of second pipeline latch 425x, and output node $N_5$ of third segment $Z_3$. The voltage versus time waveform of output node $N_6$ of the target stage pipeline latch 445x is not shown due to space limitations but will be readily understood from the sequence of the preceding voltage waveforms, $V_{N0}$–$V_{N5}$.

The signal waveform $V_{N0}$ of output node $N_0$ is shown to comprise substantially square-wave shaped pulses having peak or minimum levels centered at respective bit times $T_1$, $T_2$, . . . , $T_6$. These bit times, $T_1$–$T_6$, are defined by a system clock signal which is applied to clock input terminals of processors $PE_T$, $PE_O$ and registers (master-slave flip flops) 415x, 425x and 445x. At bit time $T_1$ a well-defined first bit b1(0) is shown to represent a definite logic high (H) level on output node $N_0$. Parenthetical identifiers, i.e., "(0)" of b1(0), are used here to denote the positioning of each bit both in time and space as the information represented by the bit progresses through the message routing path 461xY'.

As shown by waveform $V_{N1}$, when the first bit, b1, emerges at output node $N_1$ of first path segment $Z_1$, the bit has the slightly time delayed and/or slightly-corrupted characteristics of the non-square shaped pulse referenced at b1(1). The peak level of this pulse, b1(1), occurs slightly after bit time $T_1$ but the pulse b1(1) is still sufficiently well shaped and/or positioned in time to indicate that a logic high (H) was supposed to occur at bit time $T_1$.

The first stage pipeline register (flip flop) 415x captures the almost-high level of slightly-delayed and/or slightly-corrupted pulse b1(1) and outputs on node $N_2$, at the next bit time $T_2$, a corresponding substantially squarewave-shaped bit, b1(2), which is synchronized with the system clock as next shown within waveform $V_{N2}$. This output bit, b1(2), travels through the second path segment $Z_2$ to emerge at node $N_3$ in again, a slightly-delayed and/or slightly-corrupted form as indicated within waveform $V_{N3}$ at b1(3). Second stage pipeline register (flip flop) 425x captures the almost-high level of this emerging bit, b1(3), and at the next clock time $T_3$ of the system clock outputs a corresponding bit, b1(4), on its output node $N_4$. The output pulse, b1(4), which is substantially square-wave shaped and synchronized to the system clock, then travels through the third segment $Z_3$ of the routing path 461xY' to arrive at node $N_5$ in the slightly-delayed and/or corrupted form indicated within waveform $V_{N5}$ at b1(5). The target stage pipeline register (flip flop) 445x captures the almost-high level of the arriving pulse b1(5) at clock time $T_3$ and outputs onto node $N_6$ at the next clock time, $T_4$, a corresponding, but well-formed digital pulse b1(6) [not shown] which is then synchronously supplied to the target processor $PE_T$.

The progression of the second positioned bit, b2(0), within the original message stream, $V_{N0}'$ follows the same sequence through the routing path 461xY'. The second bit b2 appears as slightly-delayed and/or corrupted pulse b2(1) at node $N_1$ approximately at clock time $T_2$. The second bit next appears at node $N_3$ in slightly-delayed and/or corrupted form at approximately clock time $T_3$ as indicated at b2(3), and so forth. The remaining bits, b3, b4, b5, etc. follow through the pipelined path 461xY' in the same manner.

It can be seen that at clock time, $T_3$, after the first and second pipeline registers, 415x and 425x, have been primed, that third bit b3(0) will be traveling through first segment $Z_1$ while second bit b2(2) is simultaneously traveling through second segment $Z_2$ and while first bit b1(4) is simultaneously traveling through third segment $Z_3$. Thus, the pipelined routing path 461xY' is transferring at least three bits ($b_1$, $b_2$ and $b_3$) at one time, the delay of each segment is approximately one third the delay of the whole path 461xY' and the effective bit transfer rate (bits per second per serial-path) of the pipelined routing path 461xY' is thus essentially multiplied at least by a factor of approximately three.

Of course, the pipeline registers 415x, 425x and 445x impose a three bit-time penalty for transferring a message, so that the first bit b1 generated at clock time $T_1$ on node $N_0$ reappears as bit b1(6) at time $T_4$ on node $N_6$, the second bit appears as b2(6) on node $N_6$ at time $T_5$, the third bit appears as b3(6) on node $N_6$ at time $T_6$, and so forth. But this time penalty for priming the pipeline is usually a relatively minor portion (i.e., roughly one-tenth or less of the overall time for transferring a full message packet over the routing path 461xY', especially when compared to 3 bits, the full message packet contains a relatively larger number of bits such as 25 bits or more ($3 < <25$). If a message packet is 64 bits long then the transmission time will be ($3/f + 64/f$), where the term $3/f$ represents the penalty for priming the pipeline. The key point here though, is that the messaging frequency, f, can now be three times higher than previously possible ($1/f = 70$ nanoseconds or less per bit as opposed to a previous minimum of 250 nanoseconds per bit attainable by the Grondalski global router) and accordingly the time for sending relatively long message packets is substantially decreased.

Thus, as seen, each of the three simultaneously propagated bits $b_1$, $b_2$, $b_3$ that is respectively traveling through one of the path segments $Z_3$, $Z_2$ and $Z_1$ is essentially subject to the smaller bit delaying and/or waveshape corrupting characteristics of its one corresponding segment rather than to the larger delaying and/or corrupting characteristics of all three segments taken as a whole. And as further seen, the routing path 461xY' can be partitioned such that the bit delaying characteristics of each segment $Z_1$, $Z_2$ and $Z_3$ defines a relatively small fraction (i.e., $\frac{1}{3}$) of the overall bit delaying and/or corrupting characteristics of the entire routing path 461xY'. Therefore, when the bit delay times of segments $Z_1$, $Z_2$ and $Z_3$ are approximately equal (each approximately one-third of the overall delay time of path 461xY'), the number of bits which can be transmitted through the routing line per second is increased approximately by a factor of three.

Naturally, more pipeline registers can be added to the path in a spatially distributed manner if desired so as to further subdivide the delay time of the overall path 461xY' and to further increase the bit flow rate of the path. The benefits of this higher bit flow rate should, of course, be balanced against the time penalty paid for priming the lengthened pipeline. It should be apparent that the routing segments $Z_1$, $Z_2$ and $Z_3$ are optimally defined to have roughly equal bit delay times so that no one path segment has a substantially larger bit delay time that will essentially operate as the narrowest bottleneck to the flow rate of bits through the entire message routing path 461xY'. It should also be apparent that although three pipeline registers (415x, 425, 445x) are shown in FIG. 4B, improved performance (higher flow rates) begins to become possible with the insertion of just one pipeline register in the middle of a routing path. The use of three pipeline registers is a furtherance of this principle.

A so-called "hyperbar" embodiment 490 of the invention will now be described with reference to FIG. 4C. Like reference symbols are used in FIG. 4C to denote elements similar to those already described for FIG. 4A. The bandwidth of each of the vertical wires 464A, 464B, 464C and 464D that were shown in FIG. 4A can be expanded by using a so-called "hyperbar" switching technique. Each first stage vertical wire 464Y of FIG. 4A is replaced by a plurality of H steering-wise nondistinguishable vertical wires, $464Y_1$, $464Y_2$, $464Y_3$, $464Y_4$ (H=4 in this example), where Y represents here the suffix identifiers A, B, C and D for the vertical wires of FIG. 4A. Each crossbar switch 463xY in the first stage 460A of FIG. 4A is replaced in FIG. 4C by a "hyperbar" switch group 463xY*, there being a plurality of H hyperbar switch elements $463xY_1$, $463xY_2$, $463xY_3$, ..., $463xY_4$ in each hyperbar switch group 463xY* and the suffix identifiers xY* being representative here of the row and column identifiers a, b, c, ..., p and A*, B*, C*, and D* shown in FIG. 4C.

Figure 4C:
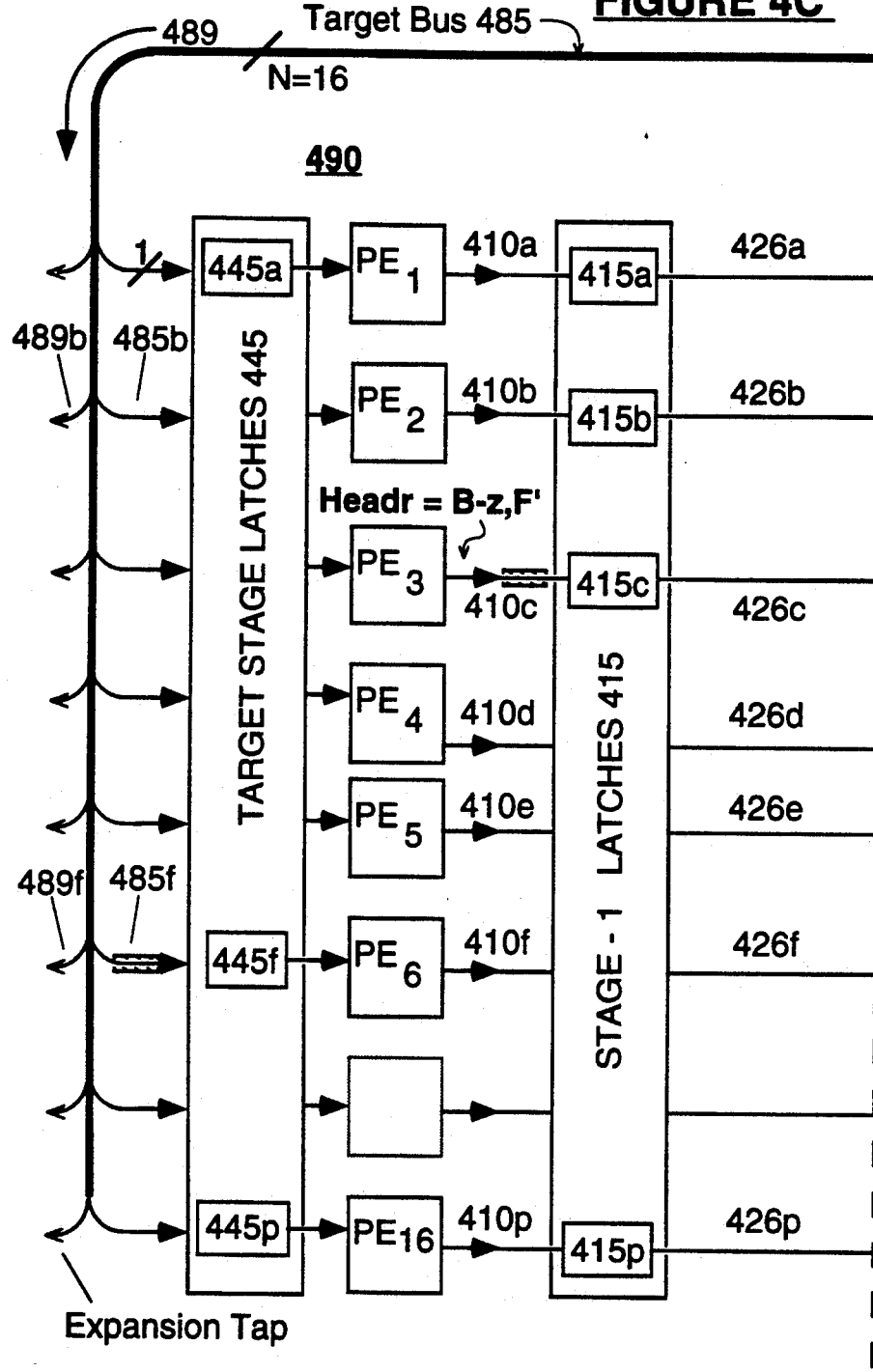
FIG. 4C is a block diagram of a second pipelined routing network including a "hyperbar" structure according to the invention.
Figure 4C:
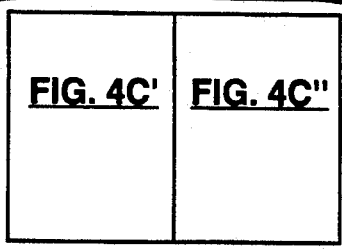

This substitution of elements defines in FIG. 4C a N×(M·H) hyperbar first stage 460A*, where N represents the number of horizontal wires, 462a, 462b, ..., 462p entering the hyperbar first stage 460A*, M represents the number of H-wire-wide busses or "wire groups" (hereafter also designated as WG) respectively emerging from a corresponding number M of plural hyperbar-substages, 460AA*, 460AB*, 460AC* and 460AD*. The plurality of hyperbar-substages 460AY* (Y represents A, B, C or D) are defined within the hyperbar first stage 460A* H defines here the number of vertical wires, $464Y_1$, $464Y_2$, ..., $464Y_4$, provided within each hyperbar-substage, 460AY* or "wire group" WG-Y*. And Y* represents here a specific one of the vertical-wire or wire-group identifying suffixes, A*, B*, C* and D*.

Given that each collection of H vertical wires emerging from each hyperbar-substage 460AY* defines a "wire group" (WG-Y*), it can be seen that a four wire wide first group of wires, WG-A*, emerges vertically from first substage 460AA*, a four wire wide second group of wires, WG-B*, emerges from second substage 460AB*, a third four wire wide group, WG-C*, emerges from third hyperbar-substage 460AC* and a fourth four wire wide group, WG-D*, emerges from fourth hyperbar-substage 460AD*. For the sake of illustrative brevity, only second substage 460AB* is shown in detail. It is to be understood that the other substages, 460AA*, 460AC* and 460AD* have the same internal structure.

For each route-request presented to it, the overall first hyperbar stage 460A* opportunistically grants a connection from the horizontal wire 462x on which the request arrives to one of the H vertical wires 464xY* in a desired one 460AY* of the substages 460AA*-460AD*, depending on the availability of a vertical wire within the desired wire group WG-Y*.

The above utilized terms, "opportunistically grants" and "hyperbar" may need further definition here. Unlike the "crossbar wormholing" technique used in FIG. 3B, a route-requesting header in FIG. 4C does not specify a single unique one of the first stage vertical wires 464xY* to which connection is to be made. Instead, the route-requesting header only specifies a desired wire group (WG-Y*) and access is granted on a first-come, first-served basis to a "free" vertical wire 464xY* within the requested wire group WG-Y* if such a free wire is available. If all wires within the specified wire group WG-Y* are "busy" (not "free"), then the request is not granted and has to be repeated in a subsequent messaging cycle.

By way of example, when $PE_3$ wishes to "open" a message routing path to $PE_6$, the route-opening processor, $PE_3$, will assert the requesting header, Header=$B_zF'$ on line 410c. The "z" of header field "$B_z$" represents a "don't care" part of full addressing field "$B_z,F'$". The first presented header field, "$B_z$", activates hyperbar-substage 460AB* and more specifically, hyperbar switch group 463cB* which is located within that substage along row 462c. The first header field "$B_z$" is presented to the activated hyperbar switch group 463cB* in a manner which says in essence to all the switch elements $463cB_1$, $463cB_2$, $463cB_3$ and $463cB_4$ of that activated switch group, 463cB*, "whichever one of you can first grant me access to your corresponding vertical wire ($464B_1$, $464B_2$, $464B_3$, $464B_4$), and I don't care which, please do so."

The first hyperbar switch element $463cB_z$ within switch group 463cB* which can grant this request, if at all, does so and a message routing path is partially formed on an opportunistic first-come, first-served basis to extend from the originating processor $PE_3$ through a wire within intermediate bus 465* (now M·H wires wide) to a corresponding horizontal wire 472b-z in the second stage 460B*. "Hyperbar" means here that the full route requesting header Hdr=$Y_z,Y'$ (i.e., $B_zF'$) of the request-generating processor (i.e., $PE_3$) does not fully dictate which wire in the addressed hyperbar substage (460AY*) or the intermediate bus 465* will service its request. Rather, the selection of a specific wire within the selected wire group WG-Y* is based on factors outside the immediate control of the route-requesting header.

The second stage 460B* has a "crossbar personality" rather than a "hyperbar personality". The route-requesting header (Header=$B_z,F'$) has to request a specific vertical wire, i.e., wire 474F' by the time it approaches its final target wires (i.e., target wire 485f). Comparing the second stage 460B* of FIG. 4C against the second stage 460B of FIG. 4A, it can be seen that each of the substages in the second stage 460B* of FIG. 4C is a crossbar switching matrix which has been expanded in the vertically extending dimension according to the hyperbar factor, H=4. Thus, the second stage 460B* of FIG. 4C is composed of a plural number, P, of crossbar substages, 460Bx*, where x* denotes identifying suffixes a*, b*, c*, d* and where each of the crossbar substages 460Bx* has dimensions MH/P×N/P (that is, each substage 460Bx* has MH/P horizontal wires going in and N/P vertical wires going out). In the illustrated case, each substage is a 4 by 4 crossbar matrix and there are four such substages, 460Ba*, 460Bb*, 460Bc* and 460Bd*. It should be noted that the number of horizontal wires entering each substage 460Bx* is equal to the number of vertical wires leaving. Thus, the input versus output bandwidth capabilities of each substage 460Bx* are balanced.

The number of pipeline registers 425 in the second stage 460B* is similarly increased in the vertically extending direction by a factor of H=four. Thus, in FIG. 4C, function box 425a* represents four pipeline registers (425a-1, 425a-2, 425a-3, 425a-4; not shown) respectively coupling one of the four wires of wire group WG-A* to a corresponding one of the four horizontal wires, 472a-1, 472a-2, 472a-3 and 472a-4 of substage 460Ba*. Similarly, each of function boxes 425b*, 425c* and 425d* represents a plurality of H bidirectional pipeline registers coupling the individual wires 465x* of their respective wire groups WG-Y* to the corresponding crossbar substage 460Bx*, where Y* and x* represent here respective ones of the suffix letters, B*, C*, D*, or b*, c* and d*.

Message routing takes place in the embodiment 490 of FIG. 4C as follows. When a first processor element, i.e., $PE_3$ wishes to send a message to a second processing element, i.e., $PE_6$, the first processor (hereafter also message originating processor) $PE_3$ begins to transmit a route requesting stream of header bits (Header=$B_zF'$) onto wire 410c. ("z" denotes here the "don't—care" aspect of a hyperbar type request $B_z$) The bits, $B_zF'$, of the serial header stream are each stored in the first pipeline latch 415c for one bit period apiece and then forwarded along first horizontally extending line 462c into the first (hyperbar) switching stage 460A*. Hyperbar stage 460A* opportunistically grants to the requesting processor, PE$_3$, whichever one of the H vertical output wires 464B* in wire-group WG-B*, that is next available. Here, we will assume that one of other processor elements PE$_1$ or PE$_2$ has already grabbed vertical wire 464B$_1$ and that vertical wire 464B$_2$ is the next wire available to be granted to PE$_3$ from among the wires in wire group WG-B*.

In the process of forming a routing path, the message routing request, Header=B$_z$F', first selects or "activates" that group of switching elements 463cY$_1$ to 463cY$_4$ which is positioned along the horizontal wire 462c and within the addressed wire group WG-Y* (Y*=B* here). If, contrary to our assumption, vertical wire 464B$_1$ of wire group WG-B* was not being used by another processor (as indicated by a "not busy" level in an associated flip flop, not shown), switching element 463cB$_1$ would have closed to establish a partial message routing path from the requesting wire 462c to vertical wire 464B$_1$. But since, as assumed here, vertical wire 464B$_1$ is "busy", the first set of bits, B$_1$, of the routing request header, Header=B$_z$F' is directed to switching element 463cB$_2$ and connection to vertical wire 464B$_2$ is granted because, as assumed here, the latter wire is not busy. The request would have been passed on to switch 463cB$_3$ if contrary to our assumption vertical wire 464B$_2$ were busy, and then to switch 463cB$_4$ if vertical wire 464cB$_3$ were busy. If all of switching elements 463cB$_1$, 463cB$_2$, 463cB$_3$ and 463cB$_4$ find that their respective vertical wires 464B$_1$, 464B$_2$, 464B$_3$ and 464B$_4$ are busy, then the requesting processor element PE$_3$ is not granted a connection to the next stage 460B* of the hyperbar routing network 460* and must wait for the beginning of a next messaging cycle before making its request anew. The requesting processor PE$_3$ would learn that its request had not been granted at the end of the first messaging cycle by the absence of an "acknowledge" signal from the target processor PE$_6$ as will be later explained. (See RCLOSE protocol 556 to FIG. 5H.)

Continuing with the assumption, once the requesting processor element PE$_3$ is granted access to the second vertical wire, 464B$_2$ of wire group WG-B*, address bits B$_z$ of its request are "retired" and not seen by further stages in the router network. The next generated bits (F' of B$_z$F') in the route requesting header are each temporarily stored for one bit period apiece in a corresponding second pipeline register 425b$_2$ (within function block 425b*) and then forwarded along horizontal wire 472b$_2$ (also identified as 472b-2) to the second stage 460B* for acceptance by a specific one of the crossbar switching elements, 473b$_2$E', 473b$_2$F', 473b$_2$G', 473b$_2$H' in the 4×4 switch matrix (substage) 460Bb* that are coupled to the second horizontally extending wire 472b$_2$. The specific switching element among set 473b$_2$E' through 473b$_2$H' to be activated is designated by the target processor designating field F' of Header=B$_1$,F'. If the designated second-stage vertical wire 474F' is not busy servicing another route-request, then a connection is granted; otherwise the requesting processor (PE$_3$) must wait for a new messaging cycle before submitting its request, B$_z$F', anew to the hyperbar router network 460*.

A number of advantages should be noted with respect to the hyperbar embodiment 490 of FIG. 4C. First, because pipeline register sets 415, 425* and 445 are distributed along the length of the hyperbar router 460*, messaging throughput is improved as explained by FIG. 4B.

Second, because the number of wires in intermediate bus 465* is now multiplied by the hyperbar factor, H=4, the parallel messaging bandwidth of the hyperbar network 460* can be as high as (M·H)armbw rather than being limited to Marmbw as it was in FIG. 4A.

Third, a certain degree of fault tolerance is provided to the router 460* by its hyperbar structure. The router network 460* will be able to form a connection between each requesting processor and target processor (or target I/O channel) despite the occurrence of a discontinuity in a wire within vertical wire groups WG-A*, WG-B*, WG-C*, WG-D*, despite the occurrence of a wire discontinuity to or within intermediate bus 465*, despite a discontinuity to or within one of the horizontal wires 472 of the second stage 460B* or despite defective operation of one pipeline register 425x-z among the second set 425* of pipeline registers. If a discontinuity or other fault is discovered along the path of one of the first stage vertical wires 464Y* (Y* is an arbitrary identifier here), that specific vertical wire, 464Y$_1$ for example, within the first stage 460A* is placed in a permanent "busy" state, and route-requests are automatically redirected for servicing by the remaining vertical wires 464Y$_z$ of the wire group WG-Y* to which the disabled vertical wire 464Y$_1$ belongs.

A fourth advantage of the hyperbar embodiment 490 shown in FIG. 4C, is that the second stage 460B* continues to be easily partitionable. By way of example, each of the pipeline register subsets 425a*, 425b*, 425c* and 425d* may be defined within a discrete physical unit (i.e. an integrated circuit chip) that incorporates its corresponding second-stage substage, 460Ba*, 460Bb*, 460Bc* and 460Bd*. Four wires would enter each such unit as a corresponding wire group WG-Y* and four wires would leave such a physically-discrete unit as a target subbus 485Y (i.e., 485C or 485D as shown in FIG. 4C) to join into the full target bus 485. The parallel messaging bandwidth potential of each wire group and corresponding subbus, WG-Y* and 485Y, is balanced (equal) in this case. For certain "permutations" of all possible route-requests, four requests will simultaneously enter each 4×4 substage 460Bx*, they will all be granted, and the full parallel-messaging bandwidth of each substage will be utilized by the message packet bits that follow the requests.

The parallel processing engines 400 and 490 of FIGS. 4A and 4C are merely illustrative of the type of massively parallel engines which can be practically built in view of density limitations for components and/or wires defined on separate IC's, PCB's or card cages. Referring to FIG. 5A, there is shown a larger scaled embodiment 500 of the invention including a three stage pipelined router, 560. In the embodiment 500 there is provided a parallel array A$_N$ of N=16,384 processor elements. The N processor elements are grouped into n=1,024 processor-element clusters (PEC 700) of 16 processors apiece. Each processor element (PE) is clocked by a system clock signal having a frequency of approximately 10 MHz to 14.3 MHz or higher (bit time 100 nS to 70 nS or less). A 16:1 multiplexer circuit scheme (to be later described with reference to PEC 700 of FIG. 7A) is provided within each PEC for outputting messages at a rate of one bit per bit time from a request "originating" processor element within each cluster and a 1:16 multiplexer counterpart of each PEC circuit 700 is further provided within each PEC for inputting messages at the same rate (i.e., 14.3 million bits per second) to a select target one of the processor elements in each cluster as indicated in FIG. 5A. Each cluster (PEC-x) has a message originating line OL-x coupling the cluster to a first stage pipeline register 515x of the router 560. A corresponding target line TL-x returns to the cluster PEC-x through a target pipeline latch 545x. (The suffix "x" denotes here a number in the set 0, 1, 2, 3, ..., 1023.) The parallel-messaging bandwidth of this system can be n·(armbw)=(1,024)·(14.3 Mega bits per second)=14.6 Gb/S or 1.8 Giga Bytes per second (for a bit time of 70 nS). The large scale embodiment 500 is structured for SIMD operations which allow up to n=1,024 message bits to be launched simultaneously into the router system from n=1,024 processor elements (PE's) and for a corresponding number of as many as n=1,024 message bits to arrive simultaneously and in synchronism at receiving devices such as target processor elements ($PE_T$) By synchronizing messaging in such a manner, a single, centralized SIMD instruction can be issued from the array control unit ("ACU") to control and/or process all n=1,024 (or less) of the message bits that are simultaneously launched into the router network from the n (or less) launching PE's and another SIMD instruction can control the processing of all message bits which are simultaneously received at receiving devices.

There are 1,024 bidirectional pipeline registers 515x in the stage-1 latch set 515 of FIG. 5A. A corresponding number, 1,024 of originating lines OL-x (defining cluster-to-stage-1 connecting bus 510) enter the stage-1 latch set 515 from the 1,024 PE clusters and 1,024 corresponding wires in intra-stage bus 516 join the stage-1 latch set 515 to a set of first stage router switches 560A.

The overall system 500 of FIG. 5A comprises three router stages and a fourth, clustering stage. The dimensions of each stage may be defined according to the following notation:

$$\text{Stage-1: } P_1 \cdot \left[ \frac{n}{P_1} \times \left( \frac{M}{P_1} \cdot H_1 \right) \right]$$

$$\text{Stage-2: } P_2 \cdot \left[ \frac{MH_1}{P_2} \times \left( \frac{K}{P_2} \cdot H_2 \right) \right]$$

$$\text{Stage-3: } P_3 \cdot \left[ \frac{KH_2}{P_3} \times \frac{n}{P_3} \right]$$

$$\text{Stage-C: } P_C \cdot \frac{n}{P_C} \cdot \left[ 1 \times \frac{N}{n} \times 1 \right]$$

In the above equations, the term $P_i$ represents a partitioning integer for each respective stage, stage-i. The term $H_i$ denotes a hyperbar factor for each stage-i. The total number of wires entering stage-1 is n and the total number of wires leaving stage-1 is $MH_1$. Stage-2 has $MH_1$ wires entering it and $KH_2$ wires leaving. Stage-3 has $KH_2$ wires entering and n wires leaving. The cluster stage, stage-C, has n wires entering, encloses N processor elements and has n wires leaving. There are n processor clusters in stage-C and each cluster contains $\frac{N}{n}$ processor elements.

In the illustrated case, each of messaging bandwidth determining factors, n, (M·$H_1$) and (K·$H_2$) is selected to equal 1,024. The lower case factor, n, represents the number of clusters. Since, each cluster (PEC-x) has one request originating line (OL-x) emerging from it into the router 560 and one target line (TL-x) returning to it from the router 560, the parallel messaging bandwidth of the router 560 is, at best, n times armbw, where armbw is the bandwidth of one pipelined path through the router 560. The number of processors, N, is equal to 16,384 and the ratio of theoretically available routing-paths to processors, n/N is therefore equal to 1/16. M represents the number of $H_1$-wire wide hyperbar wire-groups or channels emerging from the first stage switch set 560A. K represents the number of $H_2$-wire wide hyperbar channels emerging from the second state switch set 560B. The third switch stage, 560C, preferably operates as a plural number, $P_3$, of ($KH_2/P_3 \times n/P_3$) crossbar substages, where $KH_2/P_3$ is the number of horizontal wires entering each crossbar substage and $n/P_3$ is the number of vertical wires leaving each crossbar substage to join a target bus 585 that is n wires wide. Stage-C is partitioned into a number, $P_C$, of sections each having a further number, $n/P_C$, of 1:(N/n) and (N/n):1 multiplexors. (The colon symbol ":" means "to" here.)

Figure 5B:
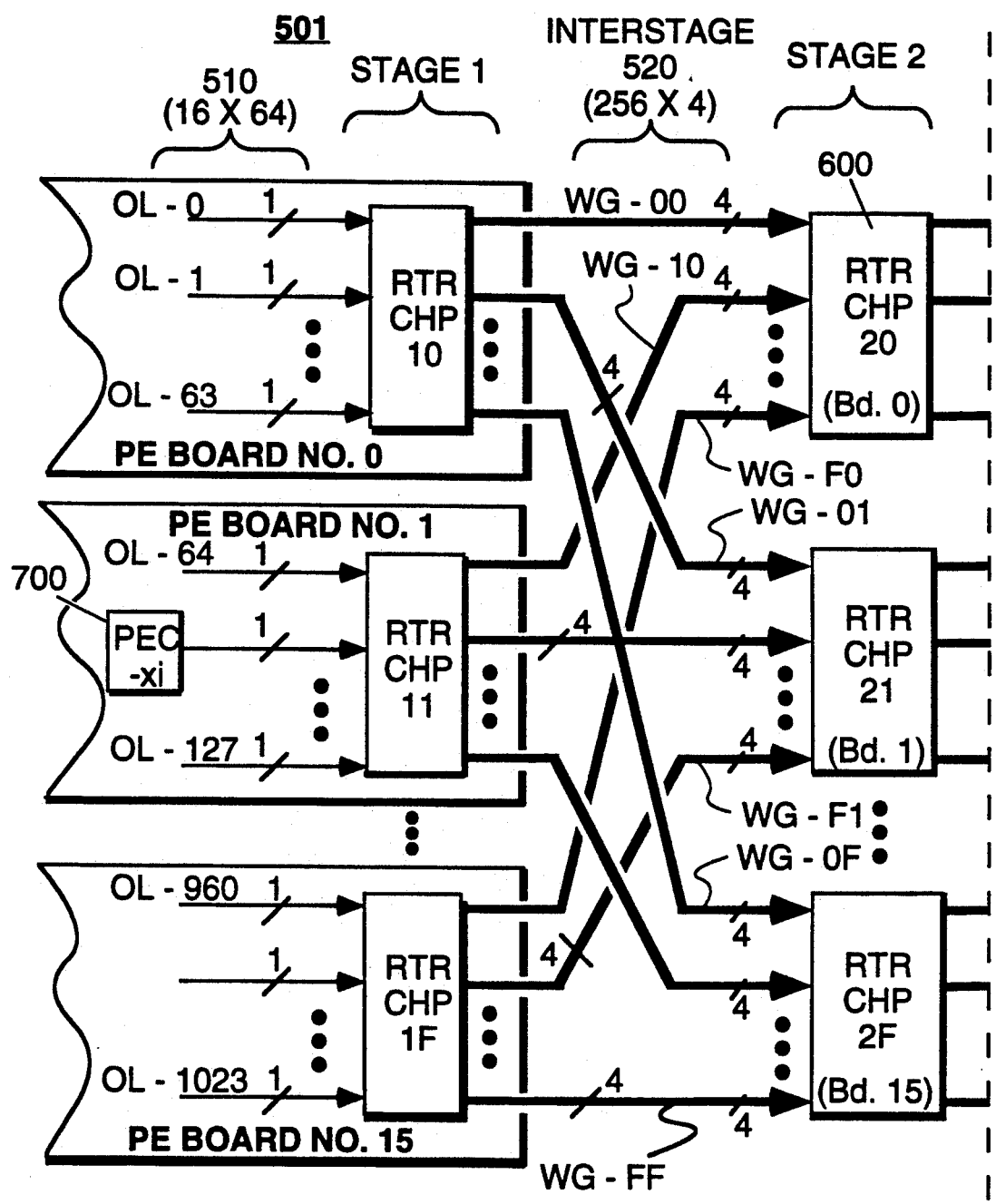
FIG. 5B shows a specific circuit-partitioning, chip placement and wiring layout which may be used for defining the network of FIG. 5A.
Figure 5B:
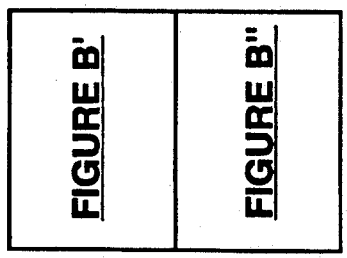

Referring momentarily to the layout shown in FIG. 5B, there is shown an embodiment 501 within which the above-described formula terms have the values: M=K=256, $H_1$=$H_2$=4, $P_1$=$P_2$=$P_C$=16, n=1024 and N=16,384. $P_1$ and $P_2$ represent the number of router chips (600) in respective stages 1 and 2. $P_C$ represents the number of PE boards (1701) in Stage-C. The value of the stage-3 partitioning integer $P_3$ may be taken either as 64 if considered on a hardware level or as 256 if considered in conjunction with a software-generated set of "redundant address bits" which will be later described in conjunction with FIG. 5C. FIG. 5B will be described in more detail later.

Returning back to the block diagram of FIG. 5A, routing requests are pipelined in the stage-1 latch set 515, passed to the first stage switch set 560A and opportunistically channeled to the second stage latch set 525 if there is a "not busy" wire available within a selected wire-group (WG-Y*) of the first stage switch set 560A. The same type of message pipelining and opportunistic channeling occurs in the second stage latch set 525 and second stage switch set 560B When the routing requests get to the third stage latch set 535 and from there to the third stage switch set 560C, they should be passed, if at all, to a specific one of 1,024 target lines, TL-x. Accordingly the third stage switch set 560C should operate in the traditional crossbar mode (crossbar personality) rather than in the opportunistic channeling mode (hyperbar personality) of the first and second stage switching units, 560A and 560B. More specifically, the third intra-stage bus 536 which joins third latch set 535 to third switch set 560C is divided into a number K of $H_2$-wire wide wire-groups. Each $H_2$-wide wire group of bus 536 should be effectively coupled to the horizontal wires of a corresponding ($H_2 \times n/P_3$) dimensioned crossbar substage within third switch unit 560C. This means that $P_3$ is preferably set equal to K so that ($KH_2/P_3 \times n/P_3$) is effectively the same as ($H_2 \times n/P_3$) The match between $H_2$ and $KH_2/P_3$ can be accomplished by hardware or software or a combination of hardware and software as will be seen when FIG. 5C is explained. Each ($KH_2/P_3 \times n/P_3$) crossbar substage of third switching stage 560C has its n/P₃ vertical wires connected to n/P₃ corresponding target-lines TL-x of the target line in target bus 585. Because it functions as a plurality of P₃ crossbar substages, the third switching unit 560C can be described as having a "multiple crossbars" personality.

For appropriate permutations of all possible messaging patterns (i.e., such as the permutation in which every $PE_x$ is sending to $PE_{x+c}$ where c is a constant), a maximum number of 1,024 messages can pass simultaneously through the three stage routing network 560 of FIG. 5A. Contention occurs when more than one message originating cluster designates the same target line TL-x, or when there are more route requests for a specific channel within a router stage than there are available ("not busy") vertical wires in that channel In such cases, not all of the messages will get through in a single messaging cycle and unsuccessful clusters (PEC's) must try again in a subsequent sequence of one or more messaging cycles. Time for at least 16 messaging cycles is preferably provided between compute cycles to guarantee that each of the 16 processor elements in each cluster (PEC) has an opportunity to transmit a message through the message routing network 560.

The circuitry of each set of pipeline registers and following set of routing switches (i.e., second latch set 525 and second switching set 560B) is preferably combined within a "stage" of integrated circuit "router" chips 600 which will be later described with reference to FIGS. 6A and 6B. There are three "stages" of router chips. The router chips 600 have selectable personality modes such that the same router chip 600 may be commanded by software instructions supplied to it from an array control unit (ACU) 591 or by logic levels supplied from elsewhere (i.e., logic levels which "key" the socket into which a router chip 600 is inserted) to operate either in the hyperbar personality or in a multiple-crossbars personality as will be later described. A further detailed description of the router chips 600 may be found in the above-cited and copending application of John Zapisek entitled "Router Chip With Hyperbar and Quad Crossbar Personalities" U.S. Ser. No. 07/461,551. The target latches 545 are preferably incorporated into and distributed among a plurality of "processor" chips 770 each of which PE chips 770 contains two processor element clusters (PEC) 700 (see FIG. 7A). A further detailed description of the PE chips 770 may be found in the above-cited and copending application of Won Kim et al. entitled, "Parallel Processor Memory System" U.S. Ser. No. 07/461,567.

As shown in FIG. 5A, an array control unit (ACU) 591 is coupled to the processor array $A_N$ by a computation control bus 592 and is further coupled to the router switching stages, 560A, 560B, and 560C and then corresponding latches 515, 525, 535 and 545 by a communications control bus 593. The communications control bus 593 extends to other message routing stages 1560C and 1700 of an "expansion" portion of the system 500 (illustrated in the bottom half of FIG. 5A) and to their corresponding "expansion" latch sets 1535 and 1545 Expansion router stage 1560C is identical in structure to router stage 560C. Expansion latch sets 1535 and 1545 are likewise respectively identical in structure to the third latch set 535 and target latch set 545. The expansion pipelining latches and router stages, 1535, 1560C, and 1545 are synchronized to receive or launch message bits at the same time that corresponding primary pipeline latches and routing switches 535, 560C, and 545 receive or launch message bits. From the viewpoint of a route-opening processor element $PE_O$ in the primary array $A_N$, it is indistinguishable whether message bits that are arriving on its target lines (bus 595) come from a target processor element $PE_T$ or a target expansion element ($IOE_T$). Since message bits arrive in synchronism across the entire width of cluster bus 595, these synchroniously arriving message bits can be easily manipulated at one time with a single SIMD instruction irrespective of whether they originated from a processor element or an input/output element (IOE).

The communications control bus 593 carries personality-selecting commands to the router switching stages 560A, 560B, (and optionally to 560C and 1560C) for individually selecting the "personality" of each router stage from among, for example, the "hyperbar" and "multiple crossbars" personalities. Alternatively, the personality of each router stage, i.e., router stages 560C and 1560C, is set by other digital commands supplied from jumper wires or socket-keying logic.

In the embodiment 500, each router stage has two personality selecting wires for selecting one of four possible personality options. The first possible personality option, referred to as "mode-00" is unused. The next possible personality option, mode-01, places the router chip 600 in the hyperbar mode with so-called "weak latches" (defined in FIG. 6A by elements 616, 617, 618a, 619a and further by elements 666, 667, 668a, 669a) activated at both the "front end" and "tail-end" of the chip 600. For the next possible personality option, mode-10, the router chip 600 is again given the hyperbar personality but only the "weak latches" of its tail-end circuitry are activated. The weak latch circuitry (616, 617, 618a, 619a) of its front end circuitry is left "open" and thus not activated. For the fourth selectable option, mode-11, the router chip is given a quad-crossbars personality and only the tail-end "weak latches" are activated.

The numbering of the above described personality options as mode-01, mode-10 and mode-11 corresponds to the binary numbering of respective router stages 1, 2 and 3. The ACU 591 is connected to the stage-1 and stage-2 router chips to select their operating modes respectively as mode-01 and mode-10. The chip receiving sockets of the stage-3 router chips 600 are "keyed" to provide high levels to the personality selecting terminals of the router chips 600 and to thereby select the operating mode of these stage-3 chips as mode-11. Thus, the stage-1 router chips are in the hyperbar personality with the weak latches activated at both their front end and tail-end circuits. The stage-2 router chips are in the hyperbar mode with only their tail-end weak latch circuitry activated. The stage-3 router chips are in the quad-crossbar personality with only their tail-end weak latch circuits activated.

The communications control bus 593 also carries clock signal gating commands which gate the system clock to latch sets 515, 525, 535, 545, 1535 and 1545 at appropriate times. The system clock is not gated to the router stages unless messaging is being performed. This saves power and avoids unnecessary line noise when computation rather than messaging is occurring within the system 500. Moreover, as a route is being "opened" (created) through the global router 560 in the left to right sequence indicated by the horizontal arrows of FIG. 5A, the system clock is first gated to stage-1 (latch set 515 and switches 560A) and not to the remaining router stages (525 plus 560B, 535 plus 560C) while the first stage routing bits are resolved. After stage-1 resolves its address bits, stage-2 (525 combined with 560B) also begins to receive gated clock signals for resolving the next set of address bits while stage-3 continues to not receive clock signals. After stage-2 has resolved its respective "address bits", clock signals are then gated to stage-3 (535 combined with 560C) for allowing it to resolve its respective address bits. The target stage latches 545 receive the gated clock signals throughout messaging. There is a so-called "pipeline freeze" mode (to be described shortly) during which clock pulses to the target stage latches 545 are halted in order to preserve data in these latches. It will be understood later (after FIGS. 6A and 6B are explained) that the clock signals which are gated to the router stages change according to whether the router stage is in a continuity test mode (diagnostic phase), in a request initialization mode during which so-called WG-requesting latches (630) are all preset, in a routing-bit resolving mode during which select ones of the WG-requesting latches are reset (metaphorically speaking, bowling pins are knocked down until only one remains standing), or whether the bits passing through the router stage are message bits following the routing bits. For now it is sufficient to understand that the ACU 591 sends commands over the communications control bus 593 to control the application of the system clock to the various router stages as needed. The bits of all messages which are launched in parallel into the global router network 560 from either the array of processor elements $A_N$ or the array of I/O elements 1700 are latched in synchronism across the entire breadth of the stage-one latch set 515 when they arrive there, are latched in synchronism across the entire breadth of the stage-2 latch set 525 when they arrive there, are latched in synchronism across the entire breath of both the primary stage-3 latch set 535 and the expansion latch set 1535 when they arrive at these latch sets, and finally, are latched in synchronism across the entire breath of the primary target stage latches 545 and the expansion latch set 1545 when they arrive there. All message bits moving through the global router network 560 are therefore easily manipulated by a single, synchronized SIMD instruction issued by the array control unit 591.

In addition to staging the application of the gated system clock signals to the router stages as a message-carrying path progressively opens through stage-1, stage-2, stage-3 and so forth, the ACU 591 is given the option to "freeze" the status of the global router network 560 at random times and service a timing critical function such as an interrupt request from an I/O device or a memory refresh request from DRAM memory. In such instances the ACU 591 issues a "pipeline freeze" signal over the communications control bus 593 to halt the router network 560 in its present state and to cause output pins of router chips (600) in the network 560 to go into a temporary high-impedance tristate mode When the "pipeline freeze" command is retracted, the router network 560 "unfreezes" and continues as if it had never been stopped The patterns of as many as 1,024 routes which may have been opened through the router network 560 and the data of as many as 1,024 messages moving through those routes (pipelined) are preserved and do not need to be recreated. Substantial time can be saved with this router freezing technique.

The communications control bus 593 furthermore carriers message direction commands which can place each router stage (560A, 560B, 560C and 1560C) individually in one of at least three bus modes: (1) forward messaging, (2) reverse messaging and (3) high-impedance (Hi-Z) tristate In the forward messaging mode, messages flow through the router network according to the direction indicated by the left to right arrows of FIG. 5A; from the originating lines, OL-x, through stages 560A, 560B, 560C (and/or 1560C) to emerge on the target lines TL-x (and/or expansion target lines ETL-x) In the reverse messaging mode, messages flow the other way; from a target device to the path originator. When a router stage is placed in the Hi-Z mode, output wires of the router stage are isolated by a high impedance and the router stage is effectively decoupled from the interstage busses connecting to it.

The array control unit 591 includes a micro-programmable section (not shown) which can be reprogrammed so that personality patterns other than the one illustrated in FIG. 5A (hyperbar, hyperbar, crossbar) can be assigned to the router stages 560A, 560B, 569C and 1560C. This ability to assign different personalities to the router switching stages by way of programming the ACU 591 gives the overall system 500 an ability to be easily expanded in size or scaled down in a modular fashion. By way of example, if it were desirable to add a "fourth" switching stage 560D (not shown) between the third switching stage 560C and the target bus (lines TL-1 to TL-n) because for example, the width of the target bus is to be expanded from say n=1,024 target wires to n=8,192 wires (upscaled by a factor of $2^3$), then a "hyperbar" personality would be assigned to the third switching stage 560C instead of the "multiple crossbars" personality shown in FIG. 5A. The modularly added "fourth" router switching stage 560D (not shown), or whatever additional router switching stage is last before the target lines (TL-1 to TL-n, where n now equals 8,192), would be assigned the "multiple crossbars" personality either by microcode software within the ACU 591 or by other hardware such as a socket-keying circuit provided on the circuit board which supports the router chips 600 in the additional stage 560D. Such an additional fourth or more router switching stage 560D (not shown) might be desirable for example when the number of paths in the system busses (i.e., 520, 540, 585 and 1585, to be soon described) are increased to a value where there are not enough switching elements within the first three router stages 560A, 560B, and 560C (or 1560C) to resolve all addressing bits and properly steer a message packet from a specific message-originating processor to a specific target processor or other target device (i.e. I/O channel) Each stage of router chips 600 illustrated in FIGS. 6A and 6B for example, can resolve only up to four address bits. Three stages can resolve up to twelve address bits. In the case of FIG. 5A there are 1,024 PE's and only ten address bits are actually resolved ($2^{10}=1,024$ and $2^{12}=4,096$). To resolve more than 12 addressing bits, a fourth stage would be added.

On the other hand, if the illustrated system 500 is to be scaled down to say $2^8=256$ target lines or less, it should be possible to steer messages with just two router stages. In such a case, the second router stage 560B would be assigned a multiple crossbars personality either by the ACU 591 or by some other personality-assigning logic circuit (i.e. socket-keying logic).

As shown in FIG. 5A, a first interstage bus 520 couples the stage-1 switching elements set 560A to the stage-2 pipelining latch set 525. An "intra-stage" bus 526 couples the stage-2 latch set 525 to the stage-2 switch set 560B. A bifurcated interstage bus 540 (composed of twin forks 540a and 540b) couples the stage-2 switching elements set 560B to the stage-3 pipelining latch set 535 and also to the expansion pipelining latch set 1535. The bifurcation of the interstage bus 540 into twin forks 540a and 540b allows all messages emerging from the stage-2 units (525 combined with 560B) to pass to either or both of the stage-3 units (535 combined with 560C) which feed target bus 585 or to the complementary stage-3 expansion units (latches 1535 combined with switches 1560C) which feed an "expansion" target bus 1585 (composed of expansion target lines ETL-0 to ETL-1023). This expansion target bus 1585 can be used to couple messages in parallel to a bank of expansion devices such as the illustrated block of I/O interface elements 1700. (See also FIG. 9.) The expansion target bus 1585 could alternatively couple messages from interstage bus 540 through expansion latch set 1535 and expansion switching stage 1560C to a bank of expansion PE clusters (not shown) whose structure is the same as the primary array $A_N$ of PE clusters shown in FIG. 5A.

The expansion portion (bottom portion) of FIG. 5A makes possible a number of expansion options. Referring momentarily to the three dimensional model shown in FIG. 9, one contemplated form of expansion is to add memory capacity to the system in the form of "I/O RAM" 1750 and/or a bank of disk drives 1900. Another contemplated expansion is to add a "frame buffer" memory unit 1800 whose data is updated in parallel through expansion target bus 1585 in order to drive a real-time display unit 1850. System users can define and add their own I/O peripherals to the system by interfacing with a high-speed 64-bit-wide I/O bus 1540 which is later described.

Returning to FIG. 5A, expansion latch set 1545 is a mirror complement of target latch set 545. When messages are to be steered only between the OL bus 510 of the primary processor bank $A_N$ and the expansion target bus 1585, the ACU 591 can send a command over the communications control bus 593 to place the third router stage 560C in the hi-impedance tristate mode. In such a case, the address space of target expansion elements (i.e., I/O-RAM 1750 or an expansion bank of PE's, not shown) and the primary PE clusters 700 might overlap, but the primary PE clusters 700 do not receive messages originated from others of the primary PE's and thus the primary-bank of PE's 700 do not function as "targets", only the expansion elements do. Alternatively, the ACU 591 can let the primary PE's 700 receive messages originated from others of the primary PE's 700 by leaving third switch stage 560C in a message forward or reverse mode while expansion stage 1560C is in a similar mode, but the ACU 591 can at the same time command the primary bank of PE's 700 over the computation control bus 591 to ignore messages even though they have been received through the target bus 585. The router expansion stage 1560C can be similarly placed in the Hi-Z mode to block message transfer between the expansion target bus 1585 and the route originating bus 510 when desired or the expansion elements 1700 (i.e., I/O interface elements) can be commanded by the ACU 591 to ignore received data packets.

Intra-stage bus 536 (1,024 wires wide) couples the stage-3 latch set 535 to the stage-3 router switches 560C. Target bus 585 (1,024 wires wide) couples the stage-3 router switches 560C to a set of 1024 target stage latches 545 which then couple messages to the primary array $A_N$ of 1,024 processor clusters. The processors (PE's) of the primary array $A_N$ are responsible for generating route-request headers which "open" a path through the router network 560. Once a path is opened, communications can flow from a target device (PE or I/O element) to a path originating PE as well as from the originator to the target. The ACU 591 controls messaging direction by issuing "forward" (Fwd) and "reverse" (Rev) command signals over the communications control bus 593.

Referring next to FIG. 5B, a chip and board layout 501 which may be used for forming the router network 560 of FIG. 5A is shown. There are 64 PE clusters 700 on each of 16 PE boards. The boards are numbered as PEB-0 to PEB-15 in decimal notation or PEB-0 to PEB-F in hexadecimal notation Each of the illustrated router chips, CHP 10, 11, . . . , 1F, 20, 21, . . . , 2F, 30, 31, . . . , 3F is identical in structure and includes within its circuitry a set of 64 pipeline latches integrally formed on its monolithic semiconductor substrate together with a 64×64 array of message routing switches. Each processor board, PEB-x (x represents here a number from hexadecimal set 0, 1, 2, . . . 9, A, B, C . . . F), has attached to it at least one stage-2 router chip, CHP-2x, and optionally one stage-1 router chip CHP-1x if the board holds a route-originating PE, and one stage-3 router chip, CHP-3x, if the board supports a PE that is a potential target (can be the same PE as the route originator). The second stage router chips 20-2F are responsible for steering messages between boards. The personality of the 64×64 switching array within each router chip may be switched by ACU commands or chip socket keying logic from a "hyperbar" 64 horizontal-wires by 16 vertical wire-groups mode to a quad 16×16 crossbars mode as will be briefly explained later herein and as is explained in detail within the above cited application of Zapisek entitled "Router Chip With Hyperbar and Quad Crossbar Personalities".

In router STAGE-1 of FIG. 5B, a group of sixty-four message originating lines, OL-(64x) to OL-(64x+63), which group is conceptually part of the 1,024 wire wide bus 510 composed of OL-0 to OL-1023 but is physically isolated on processor board PEB-x, enters one side of each router chip CHP-1x in the first stage. This grouping of a fixed number of OL wires onto each PE board essentially partitions the n=1,024 wires of bus 510 into a plural number, $P_4=16$, of groups of 64 OL wires apiece. A corresponding number of sixteen channels "wire groups" denoted as WG-x0 through WG-xF (each of which wire-groups is four wires wide), emerge from the other side of each first stage router chip CHP-1x to join a "mother-board based" or "inter-board" bus (see FIGS. 8A-8C) of 1,024 wires that is also referred to as first interstage bus 520 ("x" represents here a number in the hexadecimal set 0,1,2,3, . . . 9, A, B, C, D, E, F). The sixteen wire groups, WG-x0 to WG-xF, spread from each router chip CHP-1x in the first stage such that each wire group WG-xy is distributed via the motherboard bus 520 from the stage-1 chip CHP-1x to a corresponding one chip CHP-2y among the sixteen router chips, 20 to 2F, in the second stage (STAGE-2). The suffix letters, x and y, each represent here an arbitrary digit from the hexadecimal set 0-9, A-F. This wiring pattern within interstage bus 520 allows a route request entering the router network 560 from a first processor element cluster PEC-xi located on a first board, PEB-x, an opportunity to find a "not busy" path through the second stage (RTR CHP's 20-2F) which will steer the request to a specific second board, PEB-z which is supporting a target cluster, PEC-zj and also a specific third stage router chip CHP-3z which couples the message to the target cluster PEC-zj (suffixes x, z, each representing here a digit from the hexadecimal set 0-F and suffixes i, j each representing here a further addressing number from the hexadecimal set 0-3F). Each message routing request should be ultimately steered to a specific crossbar substage (i.e., SXS-30-0 of FIG. 5C) within a third stage router chip CHP-3z (z represents 0-F here) so that the message can emerge from that substage to a specific target line TL-zj connected to that substage (zj representing here a target number in the set 0, 1, 2, 3, ..., 1023) and from there to the target cluster, PEC-zj (see FIG. 5C).

As indicated in FIG. 5B, there are as many as sixty-four clusters on each of the sixteen processor boards (PEB-0 to PEB-F) and each cluster (of PEC's 0 to 1023) has one originating-line (OL-0 through OL-1,023) feeding a route-requesting message to a respective one of the 16 router chips (RTR CHP 10 to RTR CHP 1F) in the first router stage (STAGE 1). Router chip 10 is located on correspondingly numbered first processor board (PE board No. 0), router chip 11 is located on a correspondingly numbered second board (PE board No. 1), and so forth, so that the last router chip 1F in stage-1 is located on processor board PE board No. 15 (abbreviated as PEB-15 or PEB-F in hexadecimal notation).

As already explained, each wire group WG-xy emerging from a stage-1 router chip CHP-1x is coupled by interstage bus 520 to a correspondingly numbered router chip CHP-2y in stage-2. The suffix x identifies here a respective first stage router chip CHP-1x of chips 10-1F and the respective board PEB-x of boards PEB-0 to PEB-15 from which the wire group WG-xy originates. The suffix y identifies here the second stage router chip CHP-2y of chips 20-2F to which wire group WG-xy is connected and the number of the board PEB-y on which it is located. Thus, each wire group connecting through bus 520 to router chip 20 of stage-2 is a WG-x0 channel emerging from each chip CHP-1x of the stage-1 router chips (10-1F). Each wire group routed through bus 520 to router chip 21 in stage 2 is a WG-x1 channel emerging from each chip CHP-1x of stage-1. And finishing with the sequence, each wire group coupled through bus 520 to router chip 2F of stage-2 is a WG-xF channel emerging from each chip CHP-1x of stage-1. This relationship is more readily seen in FIG. 5C where it is shown that second stage router chip CHP-20 receives WG-00 from the first stage chip CHP-10, router chip CHP-21 receives WG-01 from the same chip CHP-10, router chip CHP-22 receives WG-02 from CHP-10 and router chip CHP-23 receives WG-03 from chip CHP-10. The relevance of this connecting pattern, as viewed from stage-2 looking back to stage-1, will become apparent when a "redundant addressing bits" aspect of the invention is later described with reference to FIG. 5C. Nor now it should be understood that first set of 64 wires emerges from each stage-1 router chip CHP-1x to join the interstage bus 520 and a second different set of 64 wires connect from the interstage bus 520 to the similarly numbered stage-2 router chip, CHP-2x. The wires of bus 520 are relatively "long" because they interconnect spaced apart PE boards, their signal flight times are therefore also relatively "long" and the stage-1 or stage-2 terminating ends of interstage bus 520 accordingly provide locations where pipeline registers may be ideally placed. As will be seen later (FIG. 6A), each router chip 600 includes pipeline registers (612) at its "front end" (610).

Referring still to FIG. 5B, the connection pattern is repeated for the next interstage bus 540 whose wire groups are now referenced as WG-100 through WG-1FF. Wire group WG-1yz couples each router chip CHP-2y of stage-2 to a router chip CHP-3z of stage 3. The suffix y identifies here a specific one of chips 20-2F in stage 2 while the suffix z identifies here a specific one of chips 30-3F in stage 3. Each wire of interstage bus 540 is "Y" shaped (bifurcated) so as to have a first fork WG-1yz(a) connecting stage-2 to the stage-3 router chips 30 to 3F and so as to have a second fork WG-1yz(b) connecting stage-2 to a set of "expansion" boards such as the I/O element boards 15 to 12 shown at the bottom right side of FIG. 5B. For the sake of simplicity, the wire groups WG-1yz(b) of interstage expansion bus 540b are not all shown in FIG. 5B. Only the last sixty-four wires in wire groups of the series WG-10F(b), WG-11F(b), WG-12F(b), ..., WG-1FF(b) are illustrated. As seen, all wires of each stage-2 to stage-3 wire group, i.e., WG-1FF are coupled both to a PE board (i.e., PEB-15) and to a corresponding one or more I/O boards (i.e., IOB-15 to IOB-12) As will be explained later, expansion wire groups WG-10F(b), WG-11F(b), ..., WG-1FF(b) not only go to I/O board No. 15 but also passes into I/O boards 14, 13, and 12 Each I/O board receives four 64-wire wide busses from four associated PE boards and thus has a 256-wire wide bus that can support an I/O messaging bandwidth equal to four times that of a single PE board. (See FIG. 8B.)

It is to be noted with respect to FIG. 5B that the third stage router chips 30 to 3F are shown to be each respectively located on PE board Nos. 0 to 15 as are chips 10 to 1F of the first router stage. The sixty-four target wires TL-(64z+0) to TL-(64z+63) of each third stage router chip CHP-3z (z equals 0-F here) are grouped so as to be physically isolated on target board PEB-z although conceptually the target wires (TL) belong to the 1,024 wire wide target bus, 585. Thus, the n=1,024 wires of the target bus 585 are partitioned into $P_4=16$ groups of $n/P_4=64$ target wires per group. Like the first stage router chips, the second stage router chips 20-2F are similarly located on correspondingly numbered PE boards, but such placement of the second stage router chips onto specific PE boards is optional since all 128 of the message-input and message-output wires of each stage-2 router chip CHP-2y go "off-board" (from its supporting PE board to motherboard bus 540 or motherboard bus 520) and thus any of the router chips 20-2F can have their PE board placements exchanged with any of the other second stage router chips 20-2F, or these stage-2 router chips 20-2F can be moved off their designated PE boards onto the motherboard or some other board that is plugged into the motherboard without drastically altering the wire lengths of interstage busses 520 and 540. The placement of the second stage router chips CHP-2y on the respective PE boards, PEB-y, is advantageous in that it relieves the motherboard of the job of supporting these stage-2 chips, distributes power dissipation, spreads the wires of busses 520 and 540 uniformly across the PE boards, PEB-0 to PEB-F, and makes repair easier since a defective stage-2 chip can be replaced by replacing its PE board.

Figure 6A:
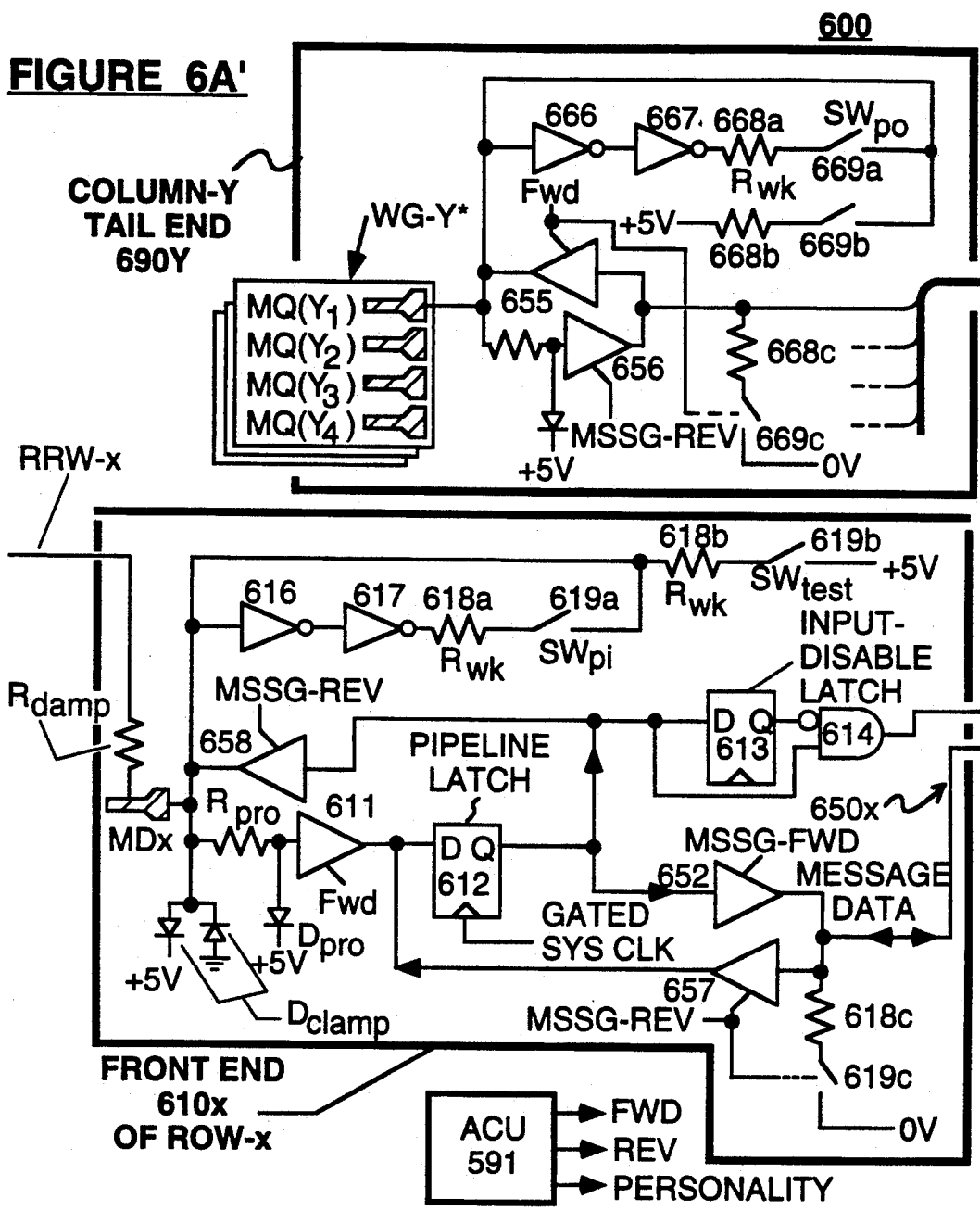
FIG. 6A shows the architecture of a router chip which may be used in the network of FIG. 5A.
Figure 6A:
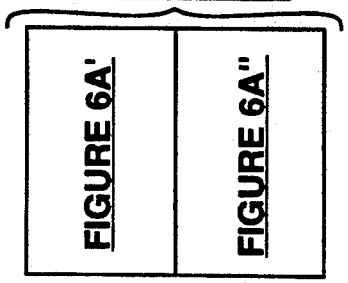
Figure 6B:
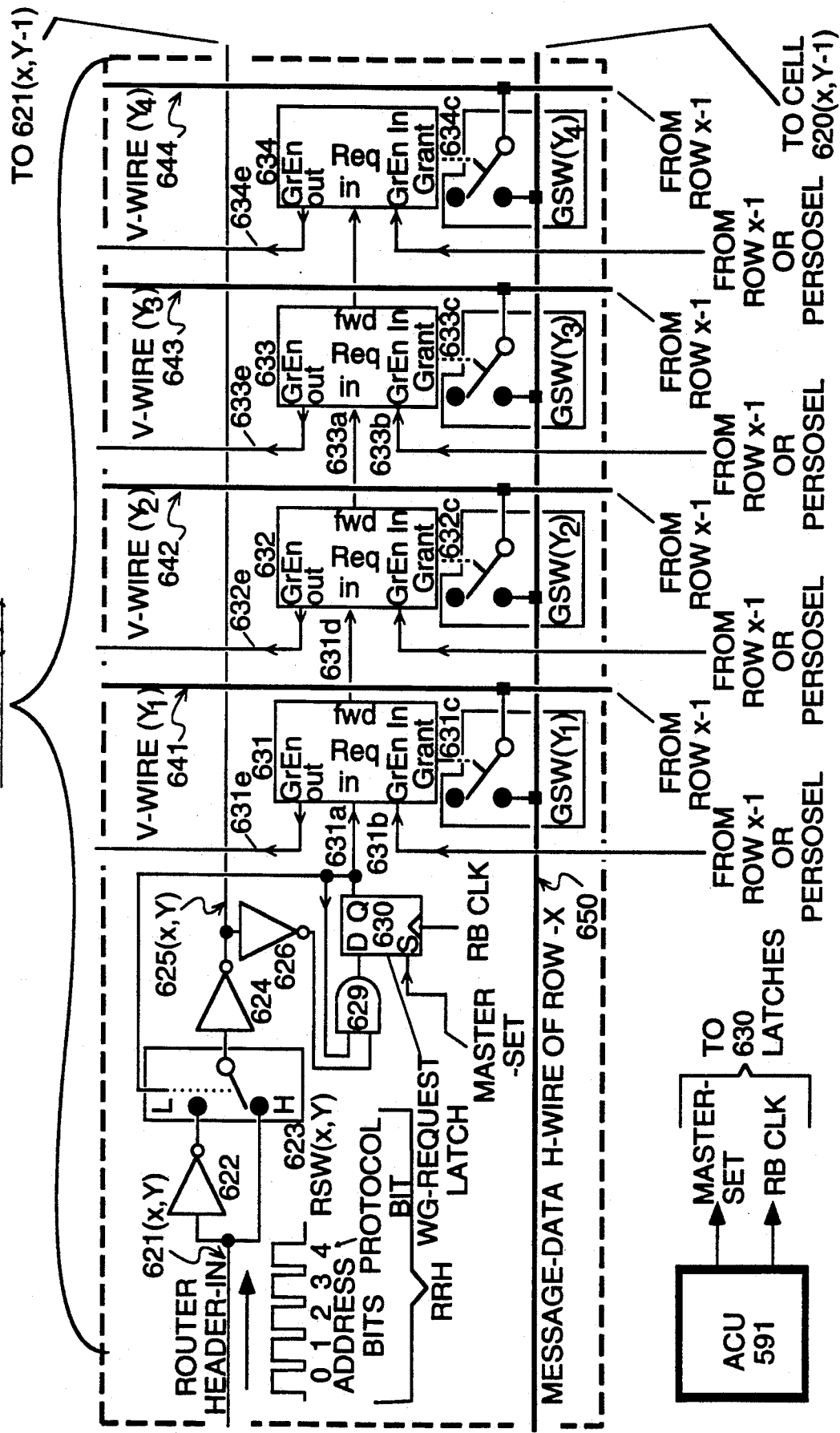
FIG. 6B is a schematic diagram of a cell within the switching matrix of the router chip shown in FIG. 6A.

Referring to FIGS. 6A and 6B the internal structure of a single router chip 600 will now be described. Router chips 10-1F, 20-2F and 30-3F of FIG. 5B all have the same structure 600, but as previously mentioned, the last set 30-3F is programmed to have a "multiple crossbars" personality while sets 10-1F and 20-2F are programmed to have "hyperbar" personalities.

Each router chip 600 has a central core section 615 defining a 64×64 switching matrix and a plurality of sixty-four front end circuits 610 and sixteen tail end circuits 690 located around the chip periphery to surround the core 615. A route-requesting header, RRH, (see FIG. 6B) consisting of 5 routing bits (RRH bits 0–4, routing bit 4 being a so-called "protocol" bit, each of which bits can be a logic low (L) or logic high (H)), comes to a request receiving pin MDx (FIG. 6A) of the router chip 600 on a route-request carrying wire RRW-x. The route requesting wire RRW-x is a wire belonging to one of the router chip input busses (i.e., request-originating bus 510 or interstage bus 520 or interstage bus 540). Each input pin MDx of the chip 600 is coupled via a correspondingly numbered front end circuit 610x to a row number x of the 64 horizontal rows provided in the core switching matrix 615. Each row-x includes a message-carrying horizontal wire 650x (FIG. 6B). The rows are numbered from bottom to top in FIG. 6A as rows 0 to 63. Row-0 is located first within a first-come, first-served vertical daisy chain (to be described shortly) and thus gets highest priority when attempting to service a route-request presented to it. Row-63 is positioned last in the vertical daisy chain and thus gets lowest priority. Switching matrix 615 is further divided into sixteen "columns" each containing four vertical wires The four vertical wires represent a wire group and the "columns" are thus referenced as WG-0 to WG-F (in right to left order).

A reflection damping resistor $R_{damp}$ is optionally interposed between the route-request input wire RRW-x and the chip input pin MDx to dampen out reflections on relatively long routing lines such as those for example which may be formed in the bifurcated interstage bus 540. A value of zero to 10 ohms has been found to work well for damping reflections. A voltage clamping circuit composed of a pair of reverse biased diodes, $D_{clamp}$, is further coupled to input terminal MDx to minimize signal bounce above or below the power rails (0 V and +5 V). Preferably, the circuitry of chip 600 is implemented primarily in CMOS and these clamping diodes $D_{clamp}$ are inherently incorporated within a CMOS tristate output driver 658 (to be described later) such that the $D_{clamp}$ pair are formed inherently by a drain to substrate-well junction within the CMOS (complementary metal-oxide-semiconductor) structure of the driver buffer 658.

Each front-end circuit 610x, such as the one shown in FIG. 6A, couples its input pin MDx to the corresponding one row (row-x) of the sixty-four rows in the 64×64 switching matrix 615. The front end circuit 610x comprises a static protection circuit including resistor $R_{pro}$ and diode $D_{pro}$ which are integrally defined by a 100 ohm P-type resistive diffusion positioned in a N-type well connected to +5 V. The static protection circuit couples the input pin MDx to the input terminal of a first message forwarding tri-state driver 611 within the front end circuit 610x. The tristatable output terminal of driver 611 connects to the D input terminal of a front-end pipeline flip flop (or latch) 612. Pipeline latch 612 is clocked by a gated system clock signal (Gated-Sys Clk) whose gating is controlled by the ACU 591. The Q output terminal of the pipeline latch 612 connects to a input-disable AND gate 614 and to a second message-forwarding tri-statable driver 652.

When the router chip 600 is in a "forward" messaging mode, route-requesting header bits RRH (address bits 0–3 and the protocol bit) pass from the input terminal MDx, through the first driver 611, through the pipeline latch 612 (after a one clock pause) and through the input-disabling AND gate 614 onto a router-header-input line 621x which enters a first switching cell, cell 620 (x,F) located at column number WG-F of row-x of the switching matrix 615. Message data bits which follow the route-requesting bits (RRH), pass from the Q output terminal of the pipeline latch 612, through the second message forwarding driver 652 and onto a message-carrying horizontal wire 650x of row-x in the "forward" mode. The ACU 591 designates incoming bits as RRH bits by clocking a set of WG-requesting latches 630 (to be described with reference to FIG. 6B) with RB-Clk pulses. When RB-Clk pulses are not provided, incoming bits are treated as "message" bits rather than "routing" bits.

After a complete routing path has been formed, the router chip 600 may be placed in a "reverse" mode and message data can then stream backwards from horizontal wire 650x, through reverse-messaging (tristate) driver 657, into the D input terminal of the pipeline latch 612, out of the Q terminal of the pipeline latch 612, through reverse-messaging (tristate) driver 658 and from there, onto terminal MDx.

When neither of the "forward" nor "reverse" modes are selected (by ACU 591 which is illustrated in FIG. 6A), the output terminals of tristate drivers 611, 652, 657 and 658 are placed in a high impedance state. Input wire RRW-x might then undesirably float to a meta-stable or "threshold" voltage level midway between the +5 V and 0 V levels that are assigned for logic high (H) and logic low (L). Such a condition is undesirable for CMOS circuits because both P and N FET's (field effect transistors) at the input side of first driver 611 might be turned ON simultaneously and they will then consume an excessive amount of power current. A meta-stable voltage level avoiding circuit, composed of elements 616, 617, 618a and 619a is therefore connected to input terminal MDx. The meta-stable avoiding circuit 616-619a has first and second inverters, 616 and 617, coupled in series as shown. A drive weakening resistor $R_{wk}$ 618a of approximately 10,000 ohms is placed at the output terminal of inverter 617 to limit the drive power of inverter 617. A programmable input personality switch $SW_{pi}$ 619a (closed in personality selecting mode-01) couples weakening resistor 618a back to the input terminal of inverter 616. When this switch 619a is closed (ACU 591 controls this switch), a "weak" bistable latch is formed which pulls the voltage level of input pin MDx away from the meta-stable voltage level and towards one or the other of the +5 V or 0 V rail voltages. The weakened drive of inverter 617 can be easily overpowered by other, normal power drivers (not shown) which wish to charge input wire RRW-x to a different voltage level. In actual practice, resistor 618a and switch 619a may be defined by one or more relatively narrow FET's (field-effect-transistors) which are incorporated into inverter 617. By way of example, the N and P output transistors of inverter 617 may be each made a narrow-FET. As further shown, another weak resistor and switch pair, 618b and 619b, (formed by a narrow-FET also incorporated into inverter 617) couples input pin MD$_x$ to the +5 V rail (logic H) when "test" switch 619b is closed. For the example given above where the N and P output transistors are weak FET's, the P channel FET may simultaneously serve the function of the weak pull-up transistor. This pull-up circuit 618b, 619b is used for testing the continuity of the input wire RRW-x. A third weak FET (switch 619c and resistor 618c) pulls the horizontal message line 650x weakly to logic low when the chip 600 is not in the "forward" messaging mode. This inhibits line 650x from undesirably floating to a level midway between +5 V and 0 V. It further assures that a logic low ("0") will be output from the input pin MDx during reverse messaging if the corresponding horizontal row wire 650x is not coupled by way of a closed routing switch GSW(Y$_z$) to a driving vertical wire, V-wire(Y$_z$).

The front end pipeline latch 612 is clocked by the gated system clock (Gated Sys Clk) and performs the router path segmentation and flow rate enhancement function earlier described. Another flip flop 613 (referred to as an input disable latch) is included in the front end circuit 610x for optionally driving an inverting input terminal of disabling AND gate 614 to a logic low (L). During an initialization mode of the router chip 600 (controlled by ACU 591), a logic low (L) is loaded into the pipeline latch 612 (via a scan-test chain, not shown, of which pipeline latch 612 is a part). This logic low (L) is transmitted through reverse driver 658 onto route requesting wire RRW-x whose second end (not shown) is connected to a test signal reflecting circuit (not shown) which temporarily stores the logic low (L). Test switch 619b is closed during this operation. The "weak latch" switch 619a is open to deactivate the weak latch. If the route requesting wire RRW-x and its connections are intact, the reflecting circuit (not shown) will send the stored logic low (L) back onto route requesting wire RRW-x through its second end. This logic low (L) then passes from the second end of wire RRW-x through the first end of wire RRW-x, through damping resistor R$_{damp}$, to chip input terminal MDx. If all is well, the reflected logic low (L) overpowers the weak pull up resistor 618b and passes through driver 611 into pipeline latch 612. The reflected logic low (L) is then loaded into input-disabling latch 613 to set the Q output terminal of that flip flop 613 low. However, if there is a break in the circuitry of the route requesting wire RRW-x, then the weak pull-up resistor 618b will hold input pin MDx at logic high (H) and this logic high (H) will instead be loaded into the input disable latch 613. (ACU 591 clocks the latch 613 at the appropriate time.) In such a case, the Q output terminal of input-disable latch 613 will drive the inverting input terminal of AND gate 614 high (H) and noise signals from the broken RRW-x wire will not be able to pass through disabling AND gate 614 onto route request line 621x. Instead, the route request line 621x of broken wire RRW-x will be held permanently low. As a result, the protocol bit (request bit 4) will always be low, and as will be seen, this state deselects all switching elements on the affected horizontal row.

Referring to FIG. 6B, each row-x of rows 0 to 63 in the switching matrix 615 comprises 16 identical cells 620(x,0) through 620(x,F) [in right to left order]coupled in horizontal series one to the next. These cells are numbered F-A and 9-0 in left to right order within FIG. 6A. As detailed in FIG. 6B, each cell 620(x,Y) has a horizontal message-carrying wire 650x passing horizontally through it to the next cell 620(x,Y-1) on its right, a wire-group-requesting latch 630(x,Y) and a set of four vertical wires, 641, 642, 643 and 644 (also labeled as V-wires Y$_1$, Y$_2$, Y$_3$, Y$_4$) passing vertically through it to the cells above and/or below, 620(x+1,Y) and 620(x-1,Y). The four vertical wires 641-644 define a "wire group" or an output channel. Each cell 620(x,Y) further includes a request input wire 621(x,Y) and a request forwarding (output) wire 625(x,Y).

To gain connection to one of the four vertical wires, 641-644, in a desired switching cell 620(x,Y), the route-requesting header RRH-x which is presented on the input line 621(x,F) of the first column cell 620(x,F) must eventually leave ON one wire-group-requesting latch 630(x,Y) within its row (row-x). Initially, all sixteen WG-requesting latches 630 of each row-x are set to the ON state (logic high) by a master-set signal (generated by the ACU 591). The master-set signal is applied to the set terminal (S) of each WG-request latch 630 before request bits 0-4 are fed onto the first header-input line 621(x,F). Metaphorically speaking, the WG-request latches 630 may be viewed as bowling pins which are set to stand up at the beginning of a route-selecting operation. The five bits of the route request header RRH may be viewed as bowling balls which are thrown to knock down successive sets of the up-standing bowling pins until only one or none of the bowling pins remain standing.

When it is set to logic high (H), the Q output terminal of each WG-requesting latch 630(x,Y) drives a route-requesting switch RSW 623(x,Y) in its corresponding cell 620(x,Y) to the H position (as shown) so that request bits entering on input wire 621(x,Y) of its cell bypass inverter 622(x,Y) and become inverted by an inverter 624(x,Y). The inverted bits are passed on in their complementary form along request output wire 625(x,Y) to the request input line 621(x,Y-1) of the next cell 620(x,Y-1) of the row-x.

When inverter 624(x,Y) outputs a logic high (H), the output signal is complemented by a further inverter 626(x,Y) within the cell 620(x,Y) to produce a logic low (L). This logic low passes through a high-blocking AND gate 629(x,Y) into the D input terminal of the WG-request latch 630(x,Y) thereby resetting the latch 630(x,Y) on the occurrence of a next routing bit clock pulse (RB Clk) which is generated by the ACU 591 for each bit of the route requesting header (RRH). The bowling pin metaphorically represented by the logic state of latch 630(x,Y) is thus knocked down. The Q output terminal of latch 630(x,Y) then drives routing switch 623(x,Y) to the "L" position so that inverter 624(x,Y) is now in series with inverter 622(x,Y). (Routing switch 623 may be formed by a pair of tristate drivers or other suitable circuit elements.) The same logic level (H or L) presented on cell input line 621(x,Y) is now output on cell output line 625(x,Y) and passes on to the next input line 621(x,Y-1) of the next cell 620(x,Y-1) on the right side. The Q output terminal of latch 630(x,Y) also drives an input terminal of the high-blocking AND gate 629 low thereby blocking further highs (H) on the output terminal of inverter 626(x,Y) from setting the associated latch 630(x,Y) back to the logic high (H) state. ACU 591 continues to clock the request latches 630 with route-bit clock pulses (RB Clk) while route-request bits are present on input line 621(x,F).

The first address bit (bit 0) of the route requesting header RRH which is applied to input line 621(x,F) of cell 620(x,F) resets either the even-numbered or odd-numbered half of the initially set sixteen WG-requesting latches 630(x,0) through 630(x,F) to the OFF state (logic low) depending on the logic level of this first bit (RRH bit 0). The second presented bit (RRH bit 1) of the route requesting header then resets an odd or even numbered half of the eight remaining, still-ON wire group requesting latches 630. The third presented address bit (RRH bit 2) resets half of the next remaining four WG-requesting latches 630. When the fourth presented address bit (RRH bit 3) arrives, only two of the sixteen cells 620 in each row x should have their WG-requesting latches still turned ON. This fourth bit (RRH bit 3) resets one of the two remaining WG-requesting latches 630 to leave only one cell 620(x,Y) within the row as having its WG-requesting latch 630(x,Y) still ON. A fifth presented protocol bit (RRH bit 4) needs to be set high (H) in order to leave the last remaining WG-requesting latch 630(x,Y) in the ON state. If the protocol bit (RRH bit 4) is a logic low (L), then the last remaining request latch 630(x,Y) will be reset and none of the sixteen wire groups WG-0 through WG-F will be requested by row-x. This leaves the vertical wires available for servicing some other horizontal row (i.e., row-(x+1)).

It should be noted that no special circuitry is included within the router chip 600 for processing the last presented protocol bit (RRH bit 4). The same circuitry which "resolves" address bits 0 to 3 in each cell 620(x,Y); namely request input wire 621(x,Y), inverter 622(x,Y), switch 623(x,Y), inverter 624(x,Y), request output wire 625(x,Y), inverter 626(x,Y), blocking AND gate 629(x,Y) and request latch 630(x,Y); also handles the protocol bit (RRH bit 4). Thus the protocol bit is treated homogeneously with the preceding address bits. Substrate area is saved in the router chip 600 because there is no additional circuitry for processing the protocol bit (RRH bit 4) differently and the router chip 600 may thus be made smaller, denser and/or produced at a higher yield rate during manufacture. As will be understood later, the protocol bit is set low by message originating processors which have successfully gotten their message through the router network 560 in a previous messaging cycle and do not need to request a path during the next messaging cycle. A low protocol bit on high priority row-0 for example deselects that row and thereby gives lower priority rows, i.e., row-63, a chance to connect to one of the limited number of vertical wires in switch matrix 615.

Incidentally, it should be observed that the first presented address bit (RRH bit 0) is the least significant address bit because it selects between odd or even numbered ones of the sixteen WG-request latches 630. The fourth presented address bit (RRH bit 3) is the most significant address bit of the route requesting header RRH.

Continuing with the explanation of FIG. 6B, let it now be assumed that a specific one WG-request latch, 630(x,Y) has been selected by the five RRH bits (address bits 0-3 plus protocol bit 4) and left in the ON state within row-x. The logic high on the Q output terminal of this WG-request latch 630(x,Y) is then fed to a two-way (vertical and horizontal) daisy-chaining circuit, which in each cell 620(x,Y) is composed of request-granting units 631, 632, 633 and 634. The logic high (H) of the still-ON request latch 630(x,Y) is applied to a first grant requesting input terminal 631a (Req In) of a first request-granting circuit 631. If the first request-granting circuit 631 is receiving a logic high (H) on its vertically-extending, grant-enable input terminal 631b (GrEnIn), the first grant circuit 631 will place a logic high (H) on its grant-output terminal 631c (also labeled "Grant"), place a logic low (L) on its horizontally-extending request forwarding terminal 631d (labeled "fwd") and a logic low (L) on its vertically-extending grant-enable output terminal 631e (labeled "GrEn out"). The logic high (H) on the grant output terminal 631c will close a corresponding and initially open, first request-granting switch GSW(Y₁), thereby coupling the horizontal wire 650x of row-x to the first vertical wire 641 of the selected wire group WG-Y. Each request-granting switch of switches GSW(Y₁), GWS(Y₂), GSW(Y₃) and GSW(Y₄) comprises a CMOS transmission gate which supports bidirectional transmissions.

If on the other hand, a logic low (L) rather than high is presented at the grant enable input terminal 631b (GrEnIn) of the first request-granting circuit 631, indicating that vertical wire Y₁ is "busy", the logic high (H) level of the WG-requesting latch 630(x,Y) is passed along on the request forwarding terminal 631d (fwd) to the next grant-requesting circuit 632, where the request and grant/not-grant process is repeated. If the vertical wire Y₂ of second granting circuit 632 is indicated to be "busy" then the request is forwarded horizontally to third granting circuit 633 If wire Y₃ is also indicated to be busy, the request is forwarded to granting circuit 634. Thus grant requests propagate horizontally through the still ON cell 620(x,Y) of each row-x. If wire Y₄ is also indicated to be busy, none of grant switches GSW(Y₁) to GSW(Y₄) closes, no connection is made from horizontal wire 650x to a vertical wire Y$_Z$, and the entire request RRH needs to be repeated in a subsequent messaging cycle if it is to be serviced.

A logic high (H) on the grant enable input terminal 631b (GrEnIn) of any of the request-granting circuits 631–634 indicates that the corresponding vertical wire, i.e., 641, is "free". If the GrEnIn terminal 631b is high (indicating a "free" vertical wire) and a logic low (no request) is presented on the request input terminal 631a (Req In) of the request-granting circuit, the request-granting circuit i.e., 631 will daisy-chain the logic high (H) of its grant enable input terminal i.e., 631b vertically upward to its grant enable output terminal i.e., 631e (GrEn out) which is coupled to the GrEnIn terminal of the cell 620(x+1,Y) in the next higher row, so that the higher-placed row (row x+1) can attempt to gain access to the "not-busy" vertical wire. Thus, grant-enables propagate upwardly through switch matrix 615 after the requests of lowered numbered (higher priority) rows are serviced.

The router chip 600 of FIG. 6A has additional features which are described in detail within the copending application of Zapisek, entitled "Router Chip with Quad Crossbar and Hyperbar Personalities" which is cited above U.S. Ser. No. 07/461,531. Briefly, sixty-four grant disable latches 635 are provided at the bottom of the switching matrix 615 to selectively force a desired one of the 64 vertical wires into the "busy" state when a wiring discontinuity is detected. The sixty-four rows of switching cells 620 are broken up into four groups of 16 rows apiece, and personality select circuits, 636, 637, 638 and 639 are provided between these groups. In the hyperbar personality mode, the grant enable output signals from each row (row-x) are fed out along the enable-output lines i.e., 631e (through the personality select circuits when they are present) to the next higher-placed row (row-x+1) throughout the matrix 615. In the crossbar personality mode, the personality select circuit 636 of the lowest group of 16 rows frees only the $Y_1$ vertical wires to service its respective rows while forcing "busy", as far as its rows can see, the status of the other vertical wires $Y_2$, $Y_3$ and $Y_4$. Simultaneously, the personality select circuit 637 of the next higher group frees the $Y_2$ vertical wires for its rows while indicating a busy status to its rows for the other vertical wires, $Y_1$, $Y_3$ and $Y_4$. Personality select circuit 638 frees only the $Y_3$ vertical wires to its group and personality select circuit 639 frees only the $Y_4$ vertical wires to its group. This causes the switching matrix 615 to have a quad-16×16 crossbar personality where the $Y_1$ vertical wires define the sixteen vertical wires of a first 16×16 crossbar switch, the $Y_2$ vertical wires define the vertical wires of a second 16×16 crossbar switch, the $Y_3$ vertical wires define the vertical wires of a third 16×16 crossbar switch and the $Y_4$ vertical wires define the vertical wires of a fourth 16×16 crossbar switch.

After a specific request-granting switch, GSW($Y_z$) has closed in each of the rows where a request has been asserted (where the protocol bit, 4, is high) and granted, the bits of a message body follow the route-requesting header RRH. The message bits pass through message forwarding tristatable driver 652 (FIG. 6A) onto the horizontal message data bus 650x, move from there through the selected message routing switch GSW($Y_z$), through the selected vertical wire 641, 642, 643 or 644, and through a four-bit wide bus 654Y which couples the vertical wires of each column to a corresponding set of four message outputting terminals, MQ($Y_1$), MQ($Y_2$), MQ($Y_3$), MQ($Y_4$); the output terminals MQ($Y_z$) defining the tail end of column-Y in the switching matrix 615. As seen in FIG. 6A, the tail end circuit 690Y of each vertical wire includes a static-protected transceiver pair comprised of tristatable drivers 655 and 656 as well as a threshold avoiding circuit 666, 667, 668a, 669a and a continuity test circuit 668b, 669b whose output switches (669a and 669b) are controlled by personality commands sent from the ACU 591. These elements are of the same structure as like referenced elements in the front end circuit 610x and thus will not be described again. Additionally, a weak pull down FET (resistor 668c and switch 669c) is provided on each wire of vertical bus 654Y to weakly pull low during forward messaging any vertical wire that is not being actively driven by a message forwarding driver 652 in the forward mode. Succeeding stages of a low-pulled vertical wire receive a protocol bit which is off (logic low). While there is no pipeline latch in the tail end circuit 690Y, it is within the contemplation of the invention to include such a pipeline latch for cases where bit propagation time through the switching matrix 615 begins to take a substantial fraction of the system bit period (i.e., a good part of the 70 nanosecond bit period). That is, it is within the scope of the invention to include pipeline registers both at the front end and tail end of each router stage in cases where it will be advantageous to further subdivide each router path and define each router stage (560A, 560B, 560C, 1560C) as a path segment sans its attached interstage or originating or target bus wires.

Referring now to FIG. 5D, a messaging protocol in accordance with the invention will be explained. Each processor element (PE-x) in a parallel array $A_N$ is assigned a row number and a column number so that it can be referenced according to two dimensional coordinates (i.e., as $PE_{xy}$). While previously it has been mentioned that there are several disadvantages to two-dimensional or other types of local routers, it should now be understood that there are some advantages as well. For relatively short messaging distances (i.e., a distance between originator and target on the order of 1 or 2 rows or columns), local routers tend to be faster than global routers. It is within the contemplation of the invention to couple each PE both to the pipelined global router 560 previously described and also to a two dimensional local router such as the NEWS network shown in FIG. 2A. More preferably, a so-called "XNET" type of two dimensional router is used such as the one developed at Duke University under the BLITZEN project. A description of the BLITZEN architecture may be found, for example, in an article written by R. A. Heaton and D. W. Blevins, "BLITZEN: A VLSI Array Processing Chip", Proceedings of the IEEE 1989 Custom Integrated Circuits Conference, San Diego, May 15-18, 1989. Briefly, as shown in FIG. 8C, a "X" shaped wire is placed at each of the four corners of every processor element (PE) within a two dimensional array. A transceiver pair is incorporated in each corner of each PE and this allows the PE's to communicate through the "X" shaped wires directly with not only their north, east, south and west neighbors but also with their northeast, southeast, southwest and northwest neighbors.

For certain computational algorithms, it has been found advantageous to send messages from an originating PE to a target PE by way of a series of short hops through the local router (XNET) intermixed with one or more long hops through the pipelined global router 560. In these circumstances, it is advantageous to be able to quickly convert from the two dimensional coordinates of the local router (NEWS or XNET) to the three-stage routing coordinates of the global router 560. Accordingly, as shown in FIG. 5D, the bits of a two dimensional addressing format 502 are mapped to a three stage router format 503.

In the two dimensional format 502, bits R0, R1, R2, . . . , R7, define respectively the least to most significant bits in the row number of a processor element. Bits C0, C1, C2, . . . , C7, define respectively the least to most significant bits in the column number of a processor element. The most significant row and column bits, R7 and C7 are unused in the 1,024×16 processor embodiment 500 of FIG. 5A.

As indicated by the three stage routing format 503 of FIG. 5D, steering to a selected PE board is controlled by bits R6, C6, R5 and C5 (in most significant to least significant order). A specific one of the sixty-four clusters on each PE board is selected by address bits R4, C4, R3, C3, R2 and C2. Addressing bits C4 and R2 are redundantly used by both stage-1 of the router and stage-3, as will be shortly explained. The most significant and least significant address bits, R4 and C2, within the PE cluster selecting field are not resolved by stage-1 of the global router 560. It was found through experimentation that messaging time improves for many types of messaging permutations (i.e., $PE_x$ sending to $PE_{x+c}$, for all x where c is a constant) when the most significant and least significant ends of the PE cluster-selecting field are avoided by router stage-1. Accordingly these ends of the PE cluster-selecting field are indicated in FIG. 5D as a stage-1 avoided zone 504. A specific one of the sixteen processor elements within each cluster is addressed by bits R1, C1, R0 and C0. These last four bits are resolved by a stage-C multiplexing circuit soon to be described (FIG. 7A).

Address bits R0-R6 and C0-C6 of FIG. 5D are distributed through an ROPEN message packet 550 according to the manner shown within FIG. 5E. As seen in FIG. 5E, column and row bits R2, C4, C3, R3 define the first four addressing bits in least significant to most significant order as they are presented to stage-1 of the router. These bits are followed by a protocol bit PB and two "don't care" bits (XX, XX). The XX bits are generated while the array control unit (ACU 591) is not clocking the WG-request latches 630. Since there are no route-bit clock pulses (RB Clk) for bit nos. 5 and 6 of the message packet 504, these two bits XX, XX do not act as routing bits but instead they function as time delay bits that provide time for grant enable signals to propagate upwardly through the rows 0-63 of the first stage router chips 600 and for the granting switches GSW(Y) to settle. After a granting switch GSW($Y_z$) closes in a stage-1 router chip, the remaining bits 7-25 of the ROPEN packet 550 pass through this granting switch as message bits that are to be presented to the next router chip 600 in stage-2.

Column and row bits C5, R5, C6, R6 (FIG. 5E) define the addressing bits for the second router stage. Again, these bits are followed by a protocol bit, PB, and two don't care bits (XX, XX) which leave room for propagating grant enable signals upwardly through the rows 0-63 of each second stage router chip (CHP 20-2F).

The third stage routing chips (CHP 30-3F) are in the crossbar personality, rather than the hyperbar personality, and thus, grant enable signals do not need to propagate upwardly through the full number of rows 0-63 in each chip. The personality select circuits 636-639 (FIG. 6A) effectively reduce the propagation distance of the grant enable signals to just 16 rows apiece and thereby reduce the grant enable propagation time to a level where the rest bits (XX, XX) are not needed in stage-3.

Column and row bits C2, R2, C4, R4 (FIG. 5E) define the four addressing bits for stage-3 and these are followed by a protocol PB bit. The last row and column bits C0, C1, R0, R1 as well as protocol bit 23 of the ROPEN packet 550 are resolved by a multiplexer circuit scheme 700 which will be described later with reference to FIGS. 7A and 7B.

Bit 24 of the ROPEN packet stream 550 defines a parity bit (PY) indicating whether the parity of address bits in the preceding ROPEN bits 0-23 (excluding the XX and PB bits) is odd or even. Although target processors $PE_T$ do not receive the first twelve router address bits (or for that matter any of bits 0-18 of packet 550) which were "retired" in the preceding three router stages, each target PE nonetheless knows its own address and whether that address is of odd or even parity. If a PY bit of an opposite parity is detected by the receiving-PE (designated here as "$PE_R$", where $PE_R$ is not necessarily the intended "target" $PE_T$) that $PE_R$ can conclude that a one bit error or other odd bit numbered error was introduced during the route opening process. The receiving $PE_R$ then signals the error condition to the ACU 591 over an OR-Tree line 595 (FIG. 7A) and disables itself from later transmitting an acknowledge signal (ACK) 556 shown in FIG. 5H back to the route originator $PE_O$.

Bit 25 of the ROPEN packet 550 is a so called "test bit" or "toggle bit" (TB) which is used to make sure that the router path is not stuck high. Typically, TB is set low (L or "0"). If the router path is stuck high, its protocol bits will be high, thereby allowing an all high message (111 . . . 1) to get through to a receiving device (i.e., $PE_R$ or in the case of I/O messaging to a receiving I/O element, $IOE_R$), but the toggle bit TB will be received as high and that will be interpreted by the receiving device ($PE_R$ or $IOE_R$) as an error. The receiving device detects this error and informs the ACU 591 over the OR-Tree line 595. Error handling is then left to the discretion of software running the ACU 591. Typically, a limited number of "retries" are allowed before the toggle bit error is deemed "fatal" and the system 500 is shut down.

A different type of test is used for detecting router paths that are stuck low (L). Since all bits including the protocol bit PB will be at logic low on such stuck low paths, the intended recipient of the message ($PE_T$ or $IOE_T$) interprets the constantly low logic level of its input line as being a "non-message" and does not know there was supposed to be an incoming message. However, as will be seen shortly, immediately after the ROPEN packet 550 is to have been received by the intended recipient processor $PE_T$, a receipt-acknowledgement flag held in a so-called R-Register (element 746 of FIG. 7A) of $PE_T$ is supposed to be set. Also, for the ROPEN packet 550 to have been launched into the router network 560 there has to be at least one transmit-requesting flag set high in a so-called T-Register of the originating processor $PE_O$. The ACU 591 tests over its OR-Tree line 595 for the presence of at least one T-Register which is set to logic high (H) and also for the presence of at least one R-Register that is set to logic high (H). If, at the end of the ROPEN operation, there is a high T-Register but no R-Register which is correspondingly set high, the ACU 591 can conclude that a stuck low or some other error has occurred. At least one ROPEN packet 550 should have been able to get through the router network 560 during each messaging cycle, even in the worst case scenario where all originators designate the same target device ($PE_T$ or $IOE_T$). When an error occurs, the ACU 591 will attempt a fixed number of "retries" (i.e., one retry) and if the retries are unsuccessful, the ACU 591 concludes that a fatal error has occurred requiring the shutdown of the entire parallel processing array.

After the ROPEN packet 550 is launched from each originating processor $PE_O$ of the array $A_N$ into the router network 560, the ACU 591 can command each originating processor $PE_O$ to further launch a so-called RSEND packet 550 as shown in FIG. 5F. The first bit of the RSEND packet 552 can immediately follow bit 25 of the ROPEN packet 550, and accordingly, the first bit of the RSEND packet 552 is numbered as bit 26 in FIG. 5F. The RSEND packet 552 is launched "blindly" into the router network 560. The launching $PE_O$ does not know whether or not its ROPEN packet 550 successfully got through to the intended target device ($PE_T$ or $IOE_T$). In the worst case scenario at least one RSEND packet should get through. In the best case scenario, 1,024 RSEND packets will be passed from 1,024 originating devices ($PE_O$) to 1,024 target devices ($PE_T$ or $IO_{ET}$).

Bits 26 onward to bit n of the RSEND packet 552 define a message body having bits M0, M1, . . . , Mx. The tail end (i.e., bit n) of the forwarded message body may include appropriate parity or error detection and correction code (ECC) covering the message bits M0-Mx if desired. After the last forward bit, n, of the message body, three so-called stage-C check bits are sent by the transmitting processor $PE_O$. The three stage-C check bits of the RSEND packet 552 are similar to the check bits of ROPEN packet 550, namely, a protocol bit PB=1, a parity bit PY covering the message body bits M0 to Mx and a toggle bit TB=0, which last bit is shown as bit n+3 of the RSEND packet 552.

Referring to FIG. 5G, the ACU 591 may further broadcast a SIMD command referred to as a RFETCH which will reverse the direction of the router network and cause all processor elements $PE_R$ which have their R-Registers set high to send a reverse message packet 554 back through the opened router path to the originating processor $PE_O$. A certain amount of time must be allocated to allowing the forward message packet RSEND 552 to flush through the pipelined router path and into the memory of the receiving processors $PE_R$ before the ACU 591 reverses the router path direction. Accordingly, as shown in FIG. 5G, the first message bit M0 of the reverse message body within the RFETCH packet 554 begins at a time n+9 or a later time following the time n+3 of the last bit (TB) in the RSEND packet 552. The last message bit of the reverse message body is denoted as bit m in FIG. 5G. This is followed by three stage-C check bits, a protocol bit PB=1, a parity bit PY covering the bits of the reverse message body M0-Mx and a toggle bit TB=0 as bit m+3 of the RFETCH packet 554. The originating processors $PE_O$ which receive such a RFETCH packet 554 process the stage-C check bits in a manner similar to that used by receiving processors $PE_R$ during the RSEND operation except that instead of setting their R-register, the receiving $PE_O$'s set an F-register when the check bits are correct. The F-register is distinct from the T-register and the R-register so that the array control unit (ACU) 591 can distinguish among elements which are designated as the requestor of each of the plural routes passing through the router network 560 (T-flag set high), elements which have received a message packet at the target side of the router network 560 (R-flag set high) and originators which have received a reverse message packet at the originating side of the router network 560 (F-flag set high).

The ACU 591 can command any number of RSEND operations and RFETCH operations following the ROPEN 550 operation. During this time, the route-originating processors $PE_O$ do not know for sure whether their messages ever got through the router network 560 to the intended target device ($PE_T$ or $IOE_T$) or whether the route-requests were blocked out by a contention condition. If the route-request of an originating processor $PE_O$ did not get through, the originating processor $PE_O$ needs to find out and repeat the transmission of its route-requesting packet ROPEN 550 one or more times until its request does get through. The method by which the ACU 591 lets each originating processor $PE_O$ know whether its route-request got through, is to command all recipient processors $PE_R$ which did actually receive the tail end (bits 19-25) of the ROPEN packet 550 in the correct manner to send back an acknowledge signal (ACK). This is done with the RCLOSE protocol 556 shown in FIG. 5H. The ACU 591 switches the direction of the router chips from the "forward" mode to the "reverse" mode so that the acknowledge signal (ACK) may be sent back through the bidirectional router network from each recipient device (i.e., $PE_R$ or $IOE_R$) whose R-register had been set high (by receipt of an ROPEN packet 550) to the route-opening processor $PE_O$. The ACK signal preferably includes a toggled bit stream such as "01" to prove that no line is stuck high or low in reverse mode. The low bit ("0") is treated as a toggle bit TB and the high bit ("1") is treated as a protocol bit PB. For simplicity it will be assumed that the RCLOSE packet 556 follows the RSEND packet 553 and that an RFETCH 554 had not occurred. Since the last bit, n+3, of the forward RSEND packet 552 cannot reach the intended target ($PE_T$ or $IOE_T$) until 4 bit times after being launched into the router 560 (because of the time penalty imposed by the pipeline registers), and it takes time for the recipient devices ($PE_R$ or $IOE_R$) to process the ROPEN and RSEND information; the acknowledge signal stream ACK is not launched backwards into the router network 560 until a bit time of approximately n+9 or thereafter. The receiving devices ($PE_R$ or $IOE_R$) normally need a number of bit times to evaluate the received address bits C0, C1, R0, R1 and the received parity bit (PY) and/or toggle bit (TB) and/or error code (ECC) and/or other parts of the received packets (bits 19-25 of the ROPEN packet 550 and/or bits 26 to n+3 of the RSEND packet 552). The ACK signal is therefore often transmitted back to the originator $PE_O$ after a computation delay of several clock cycles i.e., after bit time n+9.

Referring to FIG. 6A, the acknowledge signal ACK that is produced by the message receiving device, $PE_R$ or $IOE_R$, (assuming of course that ROPEN got through and that there was no PY or ECC or other error) enters one of the tail-end terminals $MQ(Y_z)$ of the stage-3 router chip 600, passes through reverse driver 656, moves down the corresponding vertical wire 641-644, through the closed route-granting switch $GSW(Y_z)$ of the originating row x, through the horizontal message-data carrying wire 650x, and from there, into the front end circuitry 610x, wherein the acknowledge signal passes through tri-statable driver 657, into the D input terminal of the pipeline latch 612, out of the Q terminal of the pipeline latch 612, into tri-statable output driver 658 and from there out through chip terminal MDx. The acknowledge signal then propagates back through the interstage bus 540 and repeats the same reverse path through the stage-2 and stage-1 router chips 600. When the message-originating $PE_o$ processor receives the acknowledge signal (i.e. the TB, PB=01 stream), the message originating processor $PE_o$ finally knows that its message got through the router network 560 to the target processor $PE_T$ (or I/O device $IOE_T$). At that point, the originating device $PE_o$ shuts off a transmit-request flag set in its local T-register 728 (see FIG. 7A). If no acknowledge signal (ACK) is sent back to the message-originating processor $PE_o$, then the message-originating processor sees all lows (000 . . . 0) indicating either that the ROPEN and/or RSEND forward messages were blocked within the router network 560 or that the receiving device ($PE_R$ or $IOE_R$) has detected an error in the received packets and wants the originator $PE_O$ to "retry". The originator $PE_O$ leaves its T-register 728 high in this case and this condition allows the unsuccessful originator $PE_O$ to be instructed by the ACU 591 to try again in a subsequent messaging cycle. It should be noted in FIG. 6A that weak FET 618c/619c pulls the input terminal of reverse driver 657x weakly to low in cases where no granting switch $GSW(x,Y_z)$ has closed in row-x and thus the originating PE will receive a constant 00 as a nonacknowledge signal during the RCLOSE operation instead of the flip flopping bits, 01, of the ACK signal.

Referring to FIGS. 5I and 5J, alternate forms of the RSEND and RFETCH will be briefly explained. When a message packet has an even number of bits and an odd parity is used for error checking, stuck high and/or stuck low errors can be easily detected because there will always be at least one logic low level ("0") and one logic high level ("1") within the message packet. Odd parity means that there should be an odd number of logic ones ("1") within the message packet taken as a whole, including the parity bit PY. A stuck high or stuck low condition will generate a parity error because the packet is all "1"'s or all "0"'s.

Referring to the alternate RSEND' packet 553 of FIG. 5I, the forward message body (bits 27-n usually has an even number of bits). A parity bit PY is added as bit n+1 at the end of the message body. A so-called "filler" bit "FB=0" is inserted before the message body, at bit 26 of the RSEND' packet 553, so that the packet continues to have an even number of bits. No protocol bit PB is needed within this alternate RSEND' packet 553 because the receiving device ($PE_R$ or $IOE_R$) would already have its R-register set high by the protocol bit of the preceding ROPEN packet 550.

Referring to FIG. 5J, a similar structure is used for the alternate RFETCH' packet 555. Instead of a filler bit however, a protocol bit PB="1" is placed at the front of the reverse message body. This protocol bit PB will be used to set high the F-register of the originating processor $PE_O$ error. The alternate RFETCH' packet 555 contains an even number of bits and the odd parity format is used in order to detect stuck high conditions. Accordingly, the toggle bit TB is not used.

Referring to FIG. 5C, the reason for the redundant use of address bits R2 and C4 by routing stages 1 and 3 (as indicated in FIGS. 5D and 5E) will now be explained. There are only $2^{10}=1,024$ target lines in the target bus 585 of embodiment 501. In theory, only ten addressing bits should be used for selecting a specific one of the target lines TL-0 to TL-1,023 and each address bit should be resolved or "retired" only once. However, the sixteen column structure of each router chip 600 calls for four address bits, and thus, three stages of such router chips 600 call for twelve address bits. One way to satisfy the requirements of the router chips 600 would be to set two of the twelve address bits within the ROPEN message packet 550 (FIG. 5E) to a constant value such as 00. But such a solution is undesirable for parallel messaging because it tends to concentrate requests into a small fraction of the available number of wires in the router 560, increases the probability of contention, and thus decreases the average messaging bandwidth of the router system 560.

By way of example, let it be assumed that in FIG. 5C, sixty-four route requests are simultaneously entering router chip CHP-10 on originating lines OL-0 to OL-63 and that each of these requests is directed to a correspondingly numbered target line TL-0 to TL-63 of the target bus 585. Let it further be assumed that router stage-1 resolves only its two most significant address bits (only ROPEN bits 2 and 3) instead of four because the other two (least significant) address bits of its header RRH have been forced to a constant value of 00. In such a case, the router chip CHP-10 would be able to steer each of its 64 incoming requests only to wire groups WG-00, WG-04, WG-08 and WG-0C. These four wire groups can only carry sixteen message streams simultaneously. The other wire groups WG-01 to WG-03, WG-05 to WG-07, WG-09 to WG-0B AND WG-0D to WG-0F would be unavailable for carrying messages. And accordingly, forty-eight of the original sixty-four requests entering router chip CHP-10 will be blocked from passing through interstage bus 520.

It is apparent from this analysis that router stage-1 should not be limited to resolving only two bits but rather should be allowed to resolve four address bits so that incoming requests can be "spread" across all sixteen of its outgoing wire groups WG-00 to WG-0F. Messages destinated for a specific target line TL-0 to TL-15 of a specific substage (i.e., SXS 30-0) in stage-3 can be distributed among wire groups WG-00, WG-01, WG-02 and WG-03 instead of being all bottlenecked through WG-00. The router chips of stage-2 need to resolve four address bits in order to steer messages to an appropriate one of the available sixteen processor boards, PEB-0 to PEB-F. Therefore, by the time a message packet reaches stage-3, eight of its theoretically needed ten address bits have already been resolved or "retired" And only two additional address bits should need to be resolved in stage-3 according to theory.

Referring to the bottom right inset 505 of FIG. 5C, the stage-3 router chips, CHP 30-3F should each ideally function as a plurality of four-by-four cross bar substages to resolve the last two bits in each route request entering on each wire of each four-wire-wide wire group WG-lyz so as to steer each of the four messages of each wire group WG-lyz to a specific target wire within a corresponding four-wire-wide target wire group TG-j (illustrated in FIG. 5C as target groups TG0, TG1, TG2, and TG3, where each target group TG-j represents four target lines i.e., of TL-0 to TL-15). But each router chip 600 of stage-3 is not structured as a plurality of sixteen 4×4 cross bar substages but rather as four 16×16 cross bar stages. In FIG. 5C these stages are denoted for router chip CHP-30 as respective sixteen-by-sixteen stages SXS 30-0, SXS 30-1, SXS 30-2, SXS 30-3.

Referring again to inset 505 at the bottom right of FIG. 5C, it would be preferable to make each 16×16 cross bar stage SXS 30-j function as if it were a set of four 4×4 substages, where each 4×4 substage receives the four wires of a unique wire group WG-lyz and connects these wires to a corresponding unique set of four wires in a specific target group TG-j.

Referring specifically to the top most 16×16 cross bar stage (SXS 30-0) of router chip 30 in FIG. 5C, it should be noted that the four wire groups entering this cross bar unit SXS 30-0 are numbered as WG-100, WG-110, WG-120 and WG-130 We have already shown that every message entering stage-3 along a wire within a wire group numbered WG-lyz must have come from a router chip CHP-2y in stage-2. Thus, all messages entering stage-3 by way of wire group WG-100 must have come from router chip CHP-20. All messages entering by way of wire group WG-110 must have come from router chip CHP-21. All messages being carried on wire group WG-120 must have come from router chip CHP-22. And, all messages coming on wire group WG-130 must have come from router chip CHP-23 The "group" of four wire groups WG-100, WG-110, WG-120 and WG-130 which carries messages into 16×16 crossbar stage SXS 30-0 does so from a corresponding "group" of four stage-2 router chips, namely, CHP-20, CHP-21, CHP-22 and CHP-23. This analysis does not tell us specifically which stage-1 router chip CHP-1x originated these messages, but it does tell us what the least two significant addressing bits should have been within the stage-1 router requesting header RRH. If we divide the stage-2 router chips 20–2F into groups of four, 20–23, 24–27, 28–2B and 2C–2F, it can be shown that the two least significant bits (i.e., ROPEN bits 0 and 1 of FIG. 5E) resolved by router stage-1 determine which specific router chip of each group of four chips in stage-2, the message packet will be steered to by router stage-1. The lesser significant addressing bits resolved by stage-1 thus distinguish among the individual router chips of each "group" of router chips in stage-2 and these lesser significant bits may be redundantly used to further select a unique one of a corresponding set of 4×4 substages found in each 16×16 cross bar stage of stage-3 For the ROPEN message packet format 550 shown in FIG. 5E and the wiring pattern 501 of FIG. 5B, these lesser significant bits are address bits R2 and C4. As seen in FIG. 5E, the values of ROPEN bits 0 and 1 (R2, C4) are repeated within the stage-3 route requesting header (RRH) as ROPEN bits 15 and 16. This makes each 16×16 cross bar of each stage-3 router chip CHP-3z behave as if it were a plurality of four distinct 4×4 cross bar substages. The remaining twelve other potential 4×4 cross bar substages (indicated as dashed boxes within inset 505 of FIG. 5C) are in effect deactivated.

It should be appreciated that the step of selecting which two address bits of stage-1 are to be repeated in stage-3 is dependent on the specific wiring patterns of interstage buses 520 and 540. The top 16×16 crossbar, SXS 30-0, of stage-3 does not need to be connected as shown specifically to WG-100, WG-110, WG-120 and WG-130. This is just an example. Crossbar stage SXS 30-0 could have received four other wire groups, i.e. WG-140, WG-160, WG-180 and WG-1A0. For each specific wiring pattern, one needs to define the "group" of stage-2 router chips that feed a 16×16 crossbar in stage-3. Then one needs to determine what bit or bits within stage-1 routing distinguish among the individual members of each stage-2 "group". These bit or bits will be the redundant bits that repeated in the stage-3 address field.

One advantage of the redundant addressing bit technique is a uniform balancing of the messaging load. The least significant bits (R2 and C4) of router stage-1 are likely to vary in a uniform manner from one message originating line OL-x to another message originating line OL-x'. For certain "popular" messaging permutations such as when each originating processor $PE_x$ designates another processor $PE_{x+c}$ as the target and "c" is a fixed constant for all x. For such permutations, messaging requests will tend to become distributed in an evenly spread manner across the four router chips of each "group" of stage-2 router chips. The probability of message concentration or contention for a specific wire in interstage bus 540 is reduced by such a spreading of messaging requests. Thus there is an improved probability that the parallel messaging bandwidth of the overall router network 560 will approach the theoretical maximum of 1,024 messages being simultaneously transmitted every messaging cycle. When this ideal rate is reached, it takes only $$\frac{N}{n} = 16 \text{ messaging cycles}$$

for all N=16,384 processor elements (PE-0 to PE-16,383) to send messages to one another For random messaging patterns (permutations), it has been found that approximately 50 messaging cycles are required on average to pass the messages of 16,384 originating processors to 16,384 target processors. When a special wiring technique is used such as disclosed in the above-cited and copending application of Stuart Taylor "Network And Method For Interconnectin Router Elements Within Parallel Computer System" U.S. Ser. No. 07/461,567, further enhancements in load distribution may be realized and the number of messaging cycles required on average for intercommunication between the 16,384 processor elements may be further reduced.

Figure 8B:
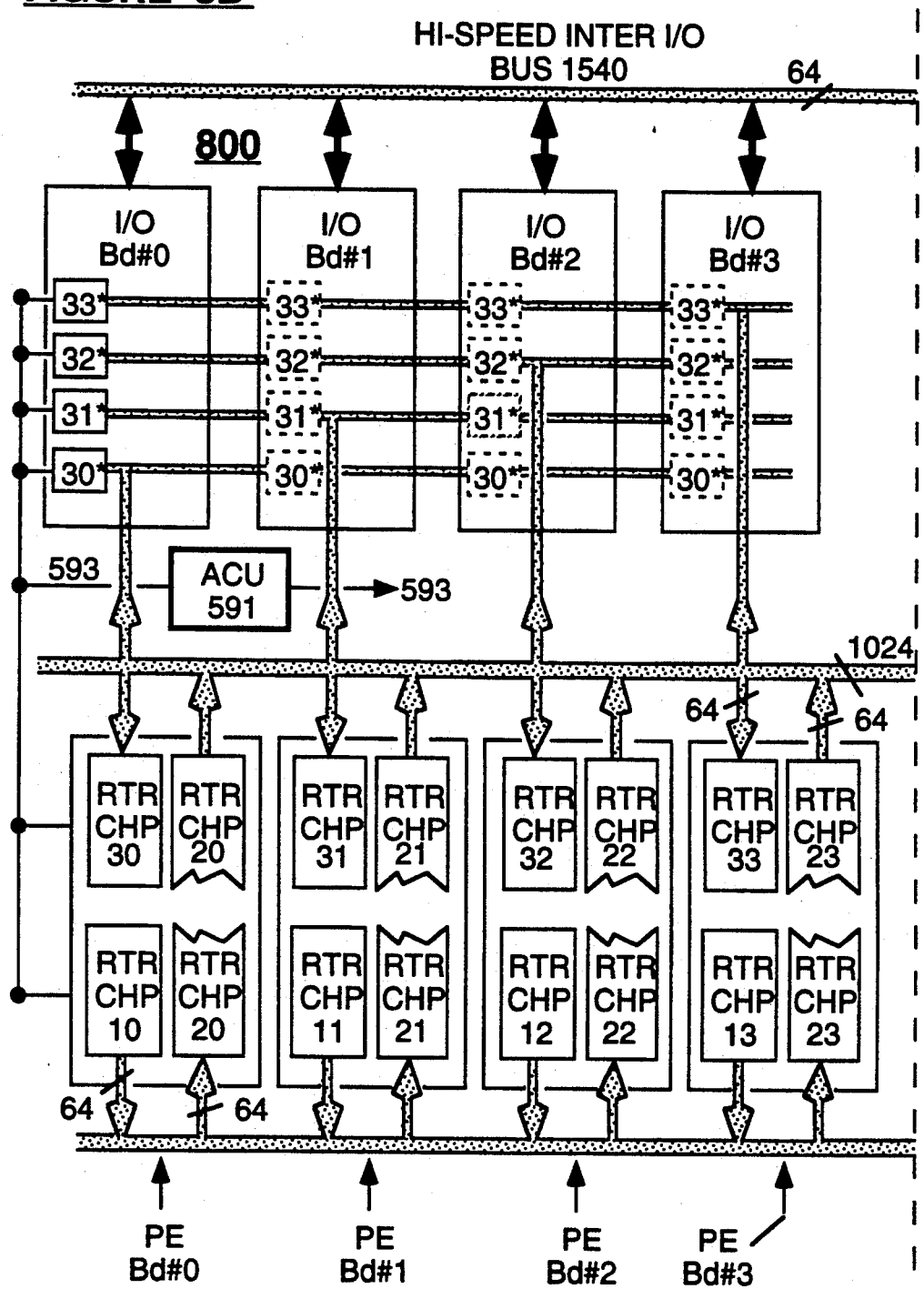
FIG. 8B is a block diagram of a PE array to I/O array interconnection scheme.
Figure 8B:
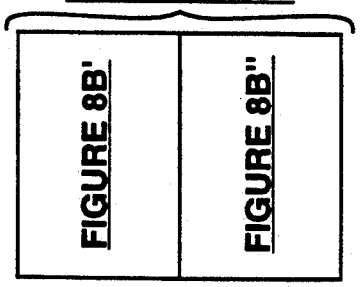

Referring briefly to FIG. 8A, there is shown a perspective view of a multi-board, parallel computing machine 800 in accordance with the invention. The multi-board embodiment 800 comprises a split backplane or "motherboard" 810 having a first (bottom) portion 810a which supports sixteen processor element boards (PEB-0 to PEB-F) each of which is referenced as 701 (only one shown) and each of which is plugged into a respective one of sixteen PE board connectors 801a distributed across bottom portion 810a of the motherboard. Each PE board 701 supports up to three router chips 600 that are assigned respectively to the three router stages and a set of up to 1,024 processor elements. These processor elements are defined within a plurality of 32 processor element chips attached to the PE board 701. Each processor element chip 770 (FIG. 8C) contains two clusters (PEC 700) of sixteen processor elements each. Each PE board 701 further supports 192 DRAM chips (Dynamic Random Access Memory, there being three DRAM chips for each of the 64 PE clusters on the PE board). The three DRAM chips each preferably have a structure of 1,024K×4 bits or 256K×4 bits. While each PE chip includes a local memory unit (PE-MEM) for each PE, the size of this PE-MEM (now also referred to as a register bank PREG 755 see FIG. 7B) is relatively small and the DRAM chips provide a relatively larger memory space for each cluster of PE's. The PREG bank 755 is preferably structured as 48 registers each 32 bits long thereby giving a total PREG capacity of 192 bytes per processor element (PE). The DRAM chips of each cluster are each represented in the corresponding schematic of FIG. 8C as a processor-cluster memory unit PMEM 780. It is worthwhile to note that there is one PMEM unit 780 for each target line TL-z. Each PE in FIG. 8B is coupled by way of a 4-wire wide nibble bus to an 8-bit wide "stage register" (Stg Reg) 771 and all 16 stage registers of each PE cluster 700 are coupled by way of a byte-wide (8 bit wide) data bus to the cluster's DRAM chips (PMEM 780). The significance of this will be explained after the internal structure of the PE clusters 700 is discussed.

Referring to FIG. 7A, the interaction of each processor element cluster 700 with the global routing network 560 will now be explained. The sixteen PE's of each cluster 700 will be numbered here as 0–15 in decimal notation or 0–F in hexadecimal notation; that is, as PE(0)-PE(F) in the latter notation. Additionally, each processor element PE(x) is also referred to in FIG. 7A by corresponding reference number $720_x$.

Each processor element $720_x$ of the sixteen processor elements $720_0$ through $720_F$ in each of the clusters (PEC's) 700 is generally identical in structure (individual PE's are distinguished by a unique identification number $PEIDN_x$ assigned to each $PE_x$ of a cluster). Each PE(x) includes a 64-bit-wide accumulator $721_x$. The accumulator 721 functions as a general purpose register that is capable of performing serial shift left and serial shift right operations as well as parallel load and store operations. A high nibble bus 722H (four wires wide) is coupled to the four most significant bit stages 60–63 of the accumulator 721. A low nibble bus 722L (four wires wide) is similarly coupled to the four least significant bit stages 00–03 of the accumulator 721. The first and last register stages (flip flops), 00 and 63, of the accumulator 721 each includes a one bit wide serial shift-in port and a one bit wide serial shift-out port. MSB stage 63 and LSB stage 00 of the accumulator are each bidirectionally connectable to a one-bit wide "Bit bus" 723 of the PE(x). Other connections to this Bit bus 723 are shown in more detail within FIG. 7B. The serial shift-out (shift right) port of accumulator stage 00 is coupled by way of a parity generating and inserting module 724 and by way of a tristate driver 725 to a request originating line 714 extending through the cluster 700. This originating line 714 may be driven by any one tristatable driver $725_x$ of the sixteen PE's in the cluster 700. The serial shift-in (shift left) port of accumulator MSB stage 63 is coupled to a request-receiving target line 734. Target line 734 spans across all sixteen PE's of the cluster 700.

A route requesting ROPEN packet 550 (such as shown in FIG. 5E) is first formed one bit at a time within the LSB stage 00 of each accumulator $721_x$ belonging to each originating processor PE(x) that is to send out an ROPEN request. The contents of the ROPEN packet 550 are determined according to SIMD microinstructions provided by the ACU 591 to the originating processor PE(x). The contents of the accumulator LSB stage 00 are of course controllable by software and it should be understood that data packets other than the route opening packet 550 of FIG. 5E can be generated by way of software control. Accordingly, routing bits other than the R0–R6 and C0–C6 format of FIGS. 5D and 5E could be used. The inclusion of a RSEND packet containing forward message body M0, M1, . . . $M_x$ directly after the route opening bits is preferred but optional.

The formation of the ROPEN packet 550 is as follows. The address of the target processor element $PE_T$ is stored in two dimensional format within the target address register of the originating processor $PE_O$. (See FIG. 7B.) Address bits R2, C4, C3, and R3 are individually picked off from the target address register (within PREG bank 755), placed on the Bit bus 723, loaded into the LSB stage (00) of the accumulator 721 for one bit period (pipelined), and then output from the accumulator LSB stage to the multiplexer (MUX) of the originating-side parity generating and inserting module 724. The select signal (Sel) to the multiplexer (MUX) is set during bits 0–23 of the ROPEN packet 550 to pass bits from its A input terminal directly to its C output terminal so that these bits are fed into line driver 725 and transmitted out along originating line 714. Bit number 4 (PB) of the ROPEN packet 550 is picked off from the "1" generator (FIG. 7B), placed on the Bit bus 723, pipelined through the LSB stage of the accumulator 721 and then transmitted out through the multiplexer (MUX) of the originating-side parity module 724 for output onto the originating line 714. Bits 5 and 6 are don't care bits which may be generated by picking them off from the "0" generator shown in FIG. 7B. As bits 0–3 of the ROPEN packet are output from the LSB stage of accumulator 721, the parity generating portion of the originating-side module 724, which comprises an exclusive-OR (XOR) gate feeding a flip-flop (FF) the XOR gate being couple to receive a feedback signal from the Q output of the flip-flop (FF), is accumulating the parity value for these address bits in its flip flop (FF). The parity accumulation process is disabled when bits 4–6 of the ROPEN packet (PB,XX,XX) come out from the LSB of the accumulator 721.

The same procedure is repeated for generating bits 7–23 of the ROPEN packet 550. For the PY bit 24, the MUX select line (Sel) of originating module 724 is flipped to select input B and the parity value which had been accumulated in the flip-flop (FF) of module 724 is output onto originating line 714. The MUX select line (Sel) is then flipped again to choose input A and the toggle bit TB which had been loaded into the LSB stage of the accumulator 721 from the "0" generator is then output onto the originating line 714.

After a route is "opened" RSEND and RFETCH message packets can be sent back and forth through the route without the route-opening header bits. Bits 0 to 23 of the route-opening message packet ROPEN 550 are serially shifted out from the least significant side (stage 00) of the accumulator $721_x$ to its corresponding tristatable line driver $725_x$. At the same time, parity generator 724 accumulates these bits and forms a parity bit Py which is inserted into the ROPEN packet as bit 24. The toggle bit TB=0 is provided from the accumulator LSB stage 00 as the last bit of the ROPEN packet 550.

For reverse messaging, the target-side parity generating and inserting module 759 is used. Outgoing messages are passed through the MSB stage (63) of accumulator 721 and then through the multiplexer (MUX) of the target parity module 759. During forward messaging, this same target-side parity generator module 759 is used to accumulate the parity value of incoming message packets. It is not used, however, for accumulating the parity of an incoming ROPEN packet 550 because only bits 19–25 of the ROPEN packet are received by each receiving device ($PE_R$ or $IOE_R$), the preceding bits 0–18 are "eaten up" or "retired" by the router network 560.

When forward messaging is desired, the output terminal of the line driver $725_x$ is enabled by a transmit-request granting signal 726b that is output from a transmit-request granting circuit $726_x$. The array-control-unit (ACU 591) sets high a "transmit-requesting" flag in a transmit request register (T-Reg) 728 of each processor element $720_x$ that is to initiate a route-opening process (ROPEN). For the sake of example, we will assume that the first processor element PE(0) within cluster 700 has been instructed by the ACU 591 to send out a route-requesting ROPEN packet 550 which targets the second processor PE(1) of that or another cluster as the recipient. The transmit-request flag of the T-Reg $728_0$ is applied to a request input terminal 726a (Req I) of the request-granting circuit $726_0$. Granting circuits $726_0$ to $726_F$ are vertically daisy chained as shown. When a logic high ("1") is presented on the grant enable input terminal 726c (GEnI) of each transmit-request granting circuit $726_x$ (there are sixteen in each cluster), the request-granting circuit 726 will be able to output a logic high on its grant output terminal 726b (GrO) if a transmit request is submitted to it (on the Req I terminal) from its T-register $728_x$. A logic low will be simultaneously generated at the grant enable output terminal 726d (GEnO) to disable, in a daisy-chaining manner, the granting of similar transmit requests on lower priority processor elements i.e., PE(x+1). If no transmit request is applied from the T Reg $728_x$ to the request input terminal 726a (Req I) of granting circuit $726_x$ and a logic high is presented at its grant enable input terminal 726c (GEnI), then a logic high will be output on its grant enable output terminal 726d (GEnO) to enable the granting of a transmit request within a next numbered processor PE(x+1). Only one line driver $725_x$ should be driving the cluster's originating line 714 at one time.

The serial bit stream 550 of the one line driver $725_x$ whose output terminal is enabled by its corresponding transmit-request granting circuit $726_x$, is output on the cluster's message originating line 714 and forwarded from there through a tristatable "message-forwarding" pin driver 716 to a router output pad 718 of the PE chip 700. (Because there are two clusters within each PE chip 700, there are two such pads 718 on each PE chip 700.) Router output pad 718 is coupled by way of an originating line OL-xi to the message originating bus 510 which drives router stage-1. The first nineteen request bits (0-18) of the route-opening message stream 550 shown in FIG. 5E are resolved respectively by router stages 1, 2 and 3. If the request bits produce a complete path through the router network 560, the remaining bits of ROPEN packet 550 (bits 19, 20, 21, . . . , 25), emerge on the designated target line TL-zj for input into router input pad 731 of the target PE chip 770.

Here we assume that PE(1) of the same PE chip 770 is the target. In the forward-messaging mode, the incoming bits (19-25) are passed from the router input pad 731 through forward pipeline latch 732 (clocked by a gated system clock signal), through forward tristatable driver 733 onto the receiving cluster's target line 734. The components of the PE chip are, incidentally, implemented in CMOS just like those of the router chips. Tristatable output driver 763 therefore inherently includes clamping diodes $D_{clamp}$ for keeping input voltage levels substantially between the +5 V and 0 V power rails. The target line 734 feeds the serial bit stream (bits 19-25 of the ROPEN packet 550) into the most significant bit terminal, bit-63, of all the accumulators $721_0$ to $721_F$, each of which respectively belongs to the processor elements PE(0) through PE(F) in the target cluster, PEC-zj. In essence, all the processor elements of the target cluster 700 receive the serial message stream (bits 19-25 of packet 550) into their accumulators 721 regardless of whether or not the message is addressed specifically to them by the stage-C resolving bits (19-23). The accumulator 721 of each receiving PE converts the first four received bits of the serial message stream (bits 19-25 of packet 550) into parallel form and presents the four address bits (C0, R0, C1, R1 of FIG. 5E) to a four-bit-wide comparator $744_x$ within each processor PE(x). Comparator $744_x$ receives a processor element identification number, $PEIDN_x$, at its other side for comparison against the four addressing bits produced by accumulator $721_x$. The value of the identification number, $PEIDN_x$, is equal to 0, 1, 2, . . . , 14, or 15 in accordance with a processor number preassigned to its respective processor element (PE-x). If the numbers match, a "receive" flag is initially set high (H) in a R register $746_x$ of the matching processor PE(x). The R registers 746 of the other non-matching processors within the cluster are loaded with a logic low (L). Thus the C-stage resolving bits 19-22 (FIG. 5E) are used to initially select and "activate" one of the sixteen PE's in the receiving cluster as the "target" PE. The protocol bit (PB) next presented on the target line 734 is applied to a target selecting AND function (provided by a Boolean Logic Unit (BLU) 751 within PE logic module 750, see FIG. 7B) together with the PEIDN-matched level previously stored in the R register 746 of the matching PE (i.e., $720_1$). The logical AND of these signals is produced at a processor element control logic 750 which is then instructed by the ACU 591 to return the high level to the R register 746 of the target PE. Non-target PE's will have logic lows (L) sent back to their respective R registers 728.

This returned level is transmitted during either an RCLOSE or RFETCH operation from the R register 728 to a reverse-request-granting circuit 756. If a high level had been returned from the PE control logic 750 to the R register 746, the ACU 591 next causes a "high" receive-grant request signal to be applied to a request input terminal 756a (ReqI) of circuit 756. A receive-request grant output signal is output on grant output terminal 756b (GrO) of circuit 756 when a logic high is presented at the grant enable input terminal 756c (GEnI) of the same circuit. Grant enables are daisy-chained out of the grant enable output terminal 756d (GEnO) to the next lower processor element, PE(x+1), if a logic high is not output from the grant output terminal 756b (GrO) of processor PE(x).

The purpose of the above-described reverse-requesting operation at the receiving end is to select one PE as the one which will analyze the received ROPEN packet, determine whether a parity error has occurred during routing (indicated when the PY bit, 24, of the ROPEN packet does not match a precomputed parity value for the address of the selected target PE), determine whether there is an error within the message body of an RSEND packet (i.e., by using the ECC bits), determine if there is a toggle bit (TB) error, and if all is well, send logic high "acknowledge" signal (ACK=0,1) back to the message originating PE when the RCLOSE command is issued by the ACU 591.

Tristatable target-line driver 760 is enabled by a grant signal output from the grant-output terminal 756b (GrO) of the reverse-granting circuit 756 so that a message-received acknowledge signal can be sent from the thus selected, receiving processor back through target line 734, out through reverse pipeline latch 762 (clocked by a gated system clock signal), through reverse tristatable pin driver 763 to the router input pad 731. From there, the acknowledge signal is routed back through router stages 3, 2 and 1 to the router output pad 718 of the message-originating processor. Tristatable reverse driver 773 then forwards the acknowledge signal on to the originating line 714 where it passes into originator-designating AND gate 774 for shifting into the accumulator 721 of whichever processor element (PE) has its transmit-request-granting output line 726b at a logic high level (H). A logic low (L) is present at the GrO input terminals of all other originator-designating AND gates 774 within the cluster and their PE's do not therefore receive the 01 bits of the ACK signal. After the message-originating processor element receives the acknowledge signal, the ACU 591 commands its PE control logic 750 to test the levels in the accumulator 721, and if they are 01, to switch off the transmit request in the corresponding T-register 728, thus allowing a next processor element in the cluster to originate a message.

If contrary to the above scenario, something had gone wrong and the "selected" receiving PE found that the PY parity bit was incorrect or that the TB toggle bit was stuck in the wrong position or that the ECC code at the end of the message body indicated an error (even if correctable), the receiving PE would not send back the logic low, logic high ACK=0,1 signal but rather a continuous logic low to the originating PE. The T flag (728) of the originating PE would not be reset. Additionally the erroneously selected receiving PE would place an error signal on an OR-Tree line 595 (which ties all PE's together) to notify the ACU 591 of the error.

Referring to FIG. 7B, the process by which the PE control logic module 750 processes incoming data will be further explained. Module 750 includes a so-called Boolean Logic Unit (BLU) 751 which has three 1-bit-wide input terminals and which can perform a variety of Boolean logic operations on any one, two, or three of the logic levels presented to its three input terminals. A first input terminal of the BLU 751 is coupled to a so-called "flag" bus 753. The flag bus 753 is driven by a selected one of a plurality of status registers including the E-register 752, the M-register 747, a Z-register 748 and a V-register. The ACU 591 sends microinstructions which select one of the flag registers for driving the flag bus 753. The second input terminal of the BLU 751 receives the Bit bus 723. The Bit bus 723 is selectively driven by the R-register 746, the LSB and MSB stages of the accumulator 721, a binary "0" generator, a binary "1" generator, the T-register 728, a so-called logic accumulator register (L-register) 754, and the P-register bank 755. The P-register bank 755 includes a plurality of variable width data registers including a target address register which stores bits R7-R0 and C7-C0 that designate a target address, a local address register which holds a precalculated parity bit for the local PE and a so-called F-register which holds a fetch acknowledge signal which the local PE generates when it properly receives a RFETCH message packet 554. Additionally, when the appropriate SIMD instruction is received from the ACU 591, the Bit bus 723 may selectively load its value into the R-register 746, the LSB and MSB stages of the accumulator 721, the T-register 728, any bit of any register within the P-register bank 755, an OR latch 757 which drives the OR-tree line 595 and XOR and MUX input terminals of parity generating and inserting modules 724 and 759. The third input terminal of the BLU 751 receives signals from the logical accumulator (L-register) 754.

The steps by which the bits of a ROPEN packet 550 are handled are as follows:

| Microinstruction | Comments |
| --- | --- |
| PYCAL → Z | load precalculated local address parity into Z-register before ROPEN packet arrives |
| MATCH → R | load match signal into R-register after four ROPEN bits 19-22 arrive |
| R → L | get the match level |
| L AND ACCUM(63) → L | check for high PB as ROPEN bit 23 |
| L → R | reload R-register with the AND product |
| Z XOR ACCUM(63) → L | get PY bit and compare against the precalculated PY bit (0 = match) |
| L OR ACCUM(63) → L | check for low toggle bit (TB) |
| L → OR-TREE | send error result to ACU |

Similar microinstruction sequences may be used for processing the receive bits of a forwarded RSEND packet 552 or a returned RFETCH packet 554 or a returned RCLOSE packet 556.

As seen with respect to message processing within the processor clusters 700, intelligence provided by the accumulator 721 and other circuitry within each processor element (PE) is used to determine whether a message is intended for that one processor element or another element within the processor element cluster (PEC) and whether the message contents appear "correct". Even though messages are accepted and stored by all the accumulators of all processor elements within a cluster, the processor elements themselves later determine whether the message was intended for them or not. Referring back to FIG. 5A, it can be seen that messages routed through the interstage bus 540 between the stage-2 router chips and the stage-3 router chips, can be ignored by all the processor elements, if desired (by having the array control unit ACU set the enable E-registers 752 low) and thus, messages on this forked interstage bus 540 can be simultaneously directed to I/O devices such as disk drives or graphics drives instead of to target processors.

Referring again to FIGS. 8A to 8C, the multi-board embodiment 800 of the invention will be further explained. It is difficult with today's technology to pack 16,384 processors all on a single printed circuit board. It is also difficult to pack the 2,048 originating and target lines which eminate from each of the 1,024 clusters on a single printed circuit board. Accordingly, the processor elements and their associated wires are distributed among a plurality of printed circuit boards, and each printed circuit board (PEB 701) is modularly inserted into a connector on the split "motherboard" 810. The multi-board system 800 is structured such that users may add boards to the system 800 as desired to form a parallel engine having for example, only 1,024 processors (single PE board), only 2,048 processors (two PE boards), only 4,096 processor elements (four PE boards) and so forth. Each PE board 701 can support up to 32 processor chips and each processor chip contains therein two clusters of processor elements, each cluster being sixteen processors. FIG. 8C provides a block diagram of the system 800.

On each PE board (PEB-x) there is preferably provided a stage one router chip CHP-1x, a stage two router chip CHP-2x, and a stage three router chip CHP-3x. In a "minimum" system set up, a PE board having at least a stage-2 router chip CHP-2y should be inserted in each PEB connector 801a even if the PE board (PEB-y) has no processor elements. Referring briefly to FIG. 5B, even in the hypothetical case where there is only one stage-3 router chip, i.e. CHP30, in the entire system that stage-3 chip receives wires from sixteen stage-2 router chips 20-2F. As seen in the schematic of FIG. 8C, the stage one router chip CHP-1x of a first board PEB-x has 64 message originating terminals each coupled to one of the 64 clusters provided on that PE board (PEB-x). Sixty-four wires emerge from each stage one router chip CHP-1x and leave its board PEB-x to join the first inter-board router bus 520 of 1,024 wires (the backplane 810 can support up to sixteen PE boards each having 64 wires originating from its respective stage one router chip CHP-1x, thereby giving the result 16×64=1,024 wires for interstage bus 520). The 64 routing wires emerging from the first board PEB-x are distributed onto the first inter-board routing bus 520 in accordance with the pattern shown in FIGS. 5B and 5C so that a routing path may be established from the first stage routing chip CHP-1x of any first PE board (PEB-x) to the second stage routing chip CHP-2y of any other PE board (PEB-y) including that of the message originating processor. Sixty-four wires emerge from the stage two router chip CHP-2y of each board PEB-y and leave that board PEB-y to join into the second inter-board routing bus 540 having 1,024 wires. From the second inter-board routing bus 540 there emerge 64 wires which enter each board PEB-z to connect to the third stage routing chip CHP-3z of that board PEB-z. Sixty-four individual "target" wires then emanate from the third stage router chip CHP-3z to a respective one of the 64 PE clusters on its board PEB-z. A routed message always passes through the first stage routing chip (1x) on the board of the message originating processor $PE_O$ and always passes through the third stage routing chip (3z) on the board of the target processor $PE_T$, but in between, the message can pass through any second stage routing chip CHP-2y located on any board PEB-y including that of the message originating processor or message target processor.

To this point, the problem of inter-processor messaging has been discussed mainly. The problem of how to transfer data in a parallel-wise manner from external I/O devices to the memory units PMEM 780 of each processor element PE has not been discussed. It is important from the perspective of system modularity to have an I/O messaging system which can be scaled upwardly and incrementally together with the size of the parallel array. That is, as more processor elements are added to the parallel array, it should be possible at the same time to add more I/O channels for transferring data in a parallel manner between the processor elements and the external world. If separate wires are used for I/O messaging and for inter-processor messaging, then the number of wires in the overall system can become oppressively large. However, in accordance with the present invention, the I/O messaging system shares the hardware of the interprocessor global messaging network.

Substantially the same logic circuitry which opens a route from an originating processor $PE_O$ to a target processor $PE_T$ is used for opening a route from an originating processor $PE_O$ to a target input/output element $IOE_T$. Accordingly, when input/output devices are added, no separate hardware has to be added to the PE's for opening routes to I/O devices. The route-opening hardware of the processor array $A_N$ serves the double function of opening routes to target processors $PE_T$ and to target I/O elements $IOE_T$. And because the same hardware is used for opening routes to input/output devices, some of the software that is used for opening routes to target processor elements $PE_T$ may also be used for opening routes to target input/output devices $IOE_T$. In a sense, data contained within external input/output devices (i.e., a bank of disk drives) may be made to appear to the software as being homogeneous with data which is held in the local memory PMEM or PREG of neighboring processor elements. This greatly expands the memory capability of the processor elements. Problem data may be partitioned among not only the local memories PMEM or PREG of the processor elements but also throughout a large array of input/output devices such as a plurality of disk drives. The route-opening process automatically associates the data of specific input/output elements with the data contained in the local memory of the route originating processors $PE_O$.

As shown in FIGS. 8A and 8B, the second inter-board messaging bus 540 of 1,024 wires is extended along the back plane 810 from the bottom portion 810a which supports PE boards to a top portion 810b which supports I/O boards 1701. Up to four stage-3 router chips CHP-3z* (FIG. 8B) which function substantially in the same way as the stage-3 router chips CHP-3z of the PE boards 701 can be provided on each of the I/O boards 1701. An ACU communications control line in control bus 593 is used for enabling either one or the other or both of the stage-3 router chips CHP-3z or CHP-3z* on the PE boards or the I/O boards thereby allowing both to share the second inter-board routing bus 540.

The I/O boards 1701 "span" across the split backplane 810 so as to couple messages on the interstage bus 540 of the lower mother board 810a to wires on a so-called "fast" 64-bit-wide inter-I/O bus 1540 that is provided on the upper portion 810b of the split backplane 810. The I/O boards 1701 are optionally plugged into the I/O insertion connectors 801b. Users may add I/O boards to the system 800 as needed. Each I/O board provides up to 256 channels for exchanging messages between external I/O devices and the processor array. The inter-I/O 1540 may be used to couple an external I/O device to, for example, I/O boards 0, 4, 8, and C so that the external I/O device has access to the full 1,024 wires of the expansion bus 1540.

In addition to the I/O connectors 801b, an array control unit connector 801c is provided spanning across the split backplane 810 so that array control board (ACUB) 1591 is coupled by way of control busses (not shown) to both the PE array of boards and the I/O array of boards.

Figure 9:
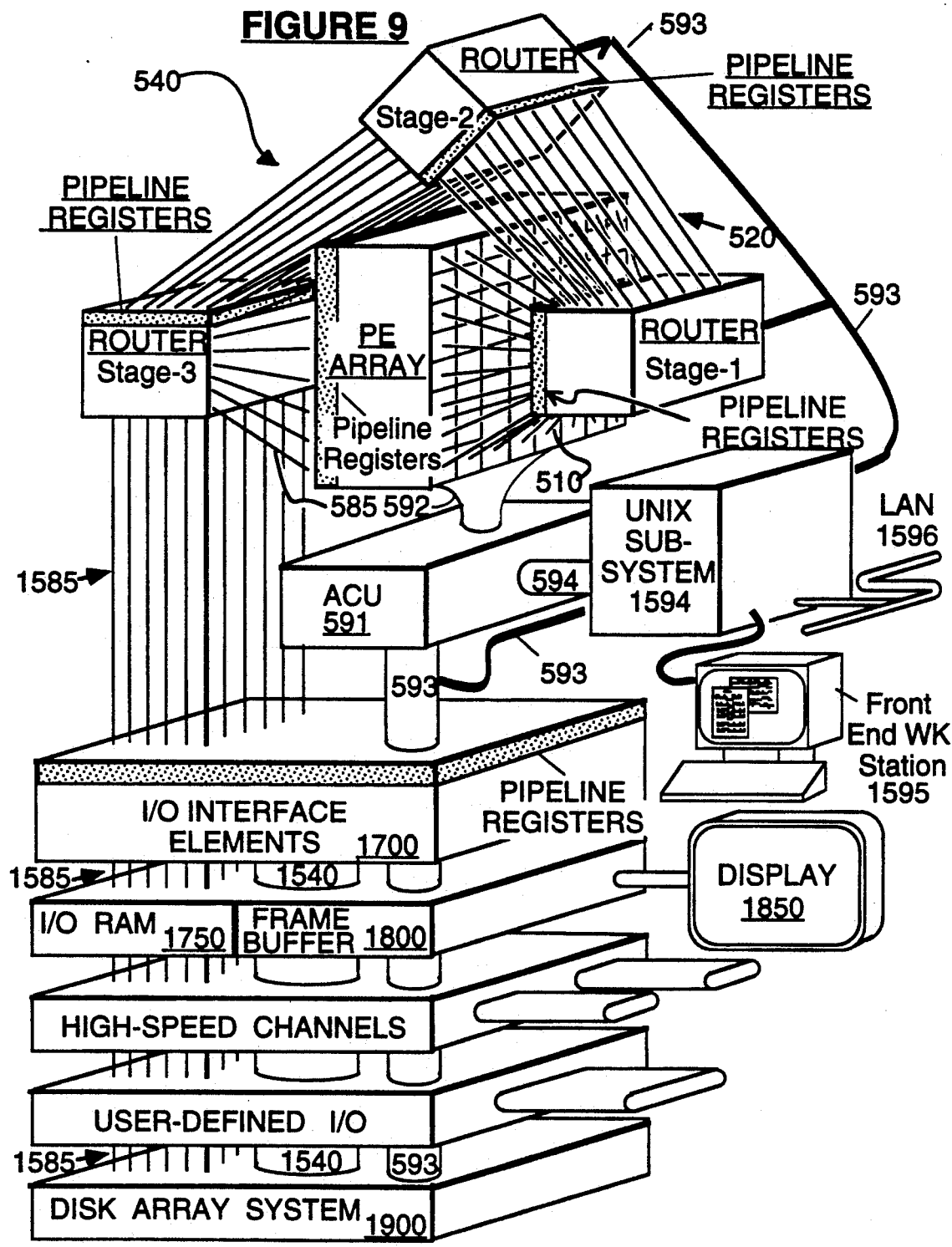
FIG. 9 is a perspective diagram showing conceptually how the global router of the invention fits into an expandable parallel processing system according to the invention.

Referring to FIGS. 8B and 9, the array control unit (ACU) 591 is centrally located so as to send microinstruction control words to the PE array along computation control bus 592. The ACU 591 further transmits communications control instructions along communications control bus 593 to the three stages of the global router 560 and to the I/O interface elements 1700 which are located on the I/O boards 1701. Additionally, (refer to FIG. 9) the ACU 591 connects by way of a front-end bus 594 to a UNIX subsystem 1594 which supports communication along the industry-standard VME bus. The UNIX subsystem 1594 drives a front-end workstation 1595. Additionally, the UNIX subsystem 1594 may be coupled to a so-called "local area network" (LAN) 1596 so as to share resources with other computing devices connected to the LAN.

Referring to FIG. 8C, a front-end adaptor board 1597 is inserted into the front end workstation 1595 and sends "macroinstructions" to the array control unit 591 through a front-end interface circuit. The ACU 591 converts these macroinstructions into a series of "microinstructions" and transmits these microinstructions along a global SIMD instruction broadcasting bus 592 (of approximately 100 wires) to all the PE's of the array. Among the broadcast microinstructions, is the so-called "ROPEN" command which instructs each PE that is enabled by its E-bit to open a messaging path through the global routing network 560. A series of one or more 64-bit long "RSEND" message packets may be sent through an opened router path by way of a RSEND microinstruction. The RCLOSE microinstruction commands the recipient PE's to acknowledge receipt of an ROPEN or other packets. In addition to sending a serial message stream to a target processor element $PE_T$, the ACU 591 can command the PE's to open a routing path to one or more of the 256 I/O channels of a specific I/O board (I/O Bd-z*). Serial messages received by the stage-3 router chip 3z* of the target I/O board 1701 are passed from the expansion target line (ETL-zj*) of that router chip CHP-3z* to a "corner-turning" shift register 1771 provided within an I/O chip 1770. Each corner-turning shift register (SR) 1771 is 64 bits wide and converts the serial format of the received message packet into a parallel format that is 64 bits wide. A pipeline register (not shown but corresponding to latch set 1545) is interposed between the corner-turning shift register (SR) 1771 and the stage-3 router chip 3z' so as to synchronize data arriving at shift register 1771 with data arriving at the LSB stage (63) of the accumulator 721 of each of the processor elements (PE) in the massively parallel array $A_N$. Sixty-four corner-turning shift registers (SR) 1771 are provided for each sixty-four expansion target lines (ETL). The corner-turning shift registers 1771 may be loaded together simultaneously by parallel messages passing through the global router 560. After being loaded, the corner-turning shift registers 1771 serially unload their contents into a plurality of RAM pages 1780 of memory chips on the I/O board through a 64-bit-wide bus. The router 560 may, of course, be reversed so that data from the RAM pages 1780 are unloaded into the sixty-four shift registers 1771 of each stage-3 router chip CHP-3z* for transmittal back to a route-originating processor element $PE_O$.

When data is to be transmitted over the global routing network 560 from the cluster memory PMEM 780 of a first processor element $PE_O$ to the cluster memory PMEM of a target processor $PE_T$, a bank of "stage registers" 771 may be used for temporarily holding received data before transferring it in a parallel manner from or to the corresponding PE's. In this regard, when a target PE is selected by the addressing bits of a route-request (ROPEN packet), and the Receive flag (R register) of that selected PE is set to a logic high, the ACU 591 can instruct a solitary load/store operation which can transfer the received data to the corresponding stage register 771 over the 4-bit wide nibble bus and can then transfer the high Receive bit to a so-called Memory bit in an M-register to indicate that the corresponding stage register 771 contains information which is to be transferred to the cluster memory chip PMEM 780.

Numerous modifications and variations to the above described invention, will of course, be apparent to those skilled in the art after studying the above description. By way of example, each router path can have a plural number of wires rather than one so that messages can be transmitted in parallel form as well as serial form. Pipeline registers may be distributed at various other parts of the global router network to enhance its bit flow rate, the particular points being dependent on the length of various wires and bit propagation delays of various components. Logic technologies other than CMOS may be used for implementing the structure, including TTL, ECL and furthermore, high-speed GaAs may be used in place of standard silicon chips. The above described embodiments are therefore not to be taken in a limiting sense and reference to the accompanying claims should be made in order to determine the scope of the claimed invention.

Figure 10:
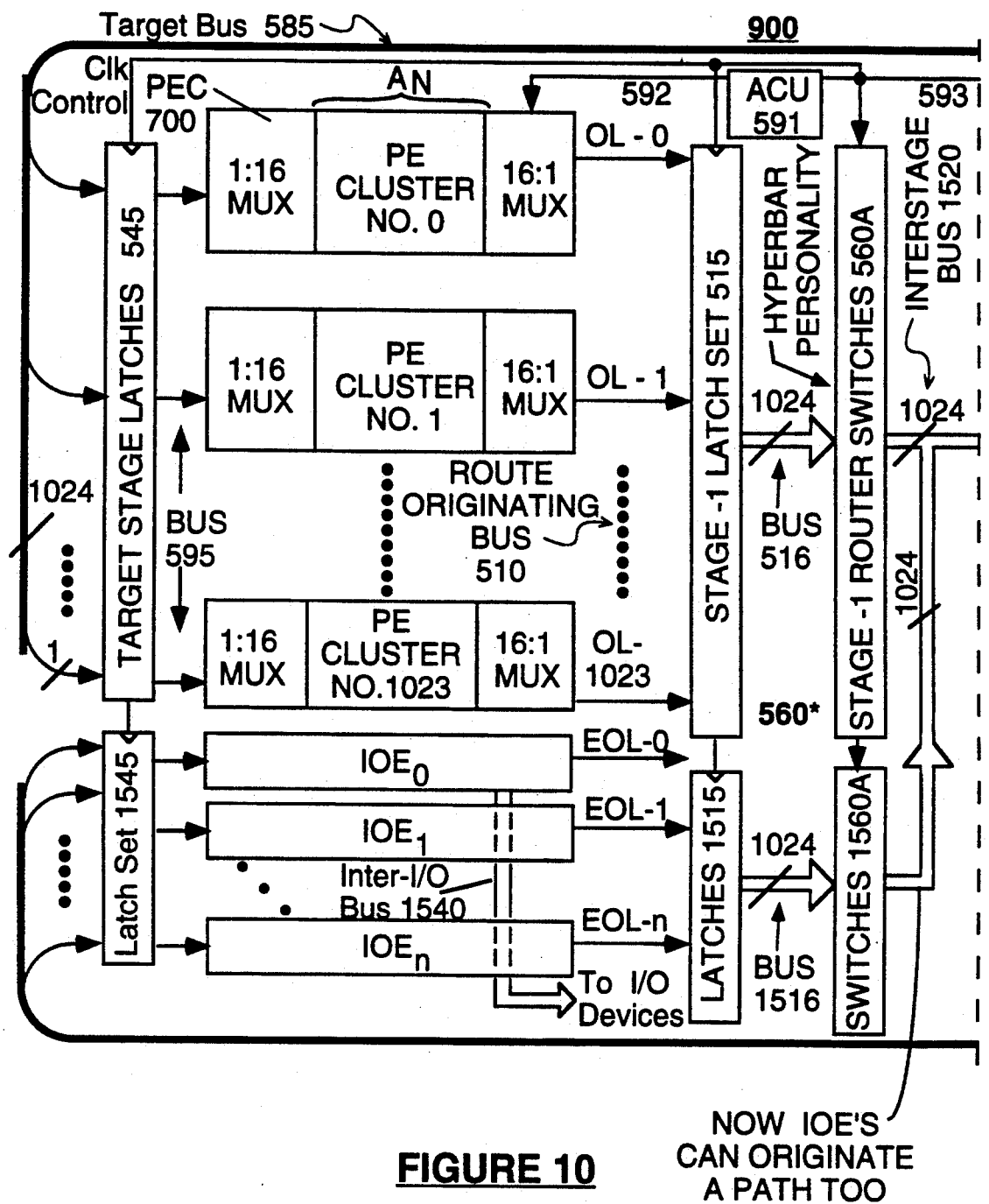
Figure 10:
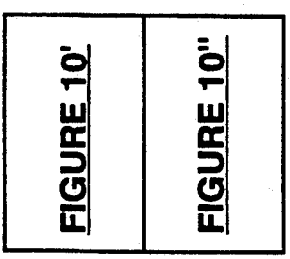

Referring to FIG. 10, an alternate embodiment 900 of the invention is shown. Like reference numbers are used for elements corresponding to similarly referenced elements in FIG. 5A. In FIG. 10, an alternate router network 560* is shown comprising expansion latch set 1515 and expansion switch set 1560A. Interstage bus 1520 is now able to receive route originating packets (ROPEN) from switches 1560A as well as from switches 560A. Switch set 1560A is synchronized with stage-one router switches 560A. Pipeline latches 1515 are synchronized with the stage-one latch set 515. The illustrated input/output elements $IOE_0, IOE_1, \ldots, IOE_n$ now include logic for generating ROPEN packets thus enabling them to open routes through the router network 560* on their own initiative. Inter-I/O bus 1540 couples one IOE to the next and to external I/O devices. It should be apparent that the bank of IOE devices can be replaced with a bank of PE cluster including target end and originating end multiplexers if desired.

What is claimed is:

1. A multi-stage interconnect network (MIN) for a parallel processor array comprising:

first, second and third switching stages for forming routing paths between processor elements (PEs) of the parallel processor array, each stage resolving one or more bits of a data routing header; and address bit duplicating means for duplicating bits resolved in a first stage such that the same bits are again resolved in a later stage to balance data routing loading; wherein:

each PE is identified as belonging to a cluster of a plurality of PEs;

each cluster is identified as belonging to one of a plurality of PE circuit boards; and said multi-stage interconnect network is divided into first, second, third and fourth resolving stages for resolving a plurality of route-requesting bits identifying each target PE, the second resolving stage being implemented in said second switching stage for revolving route requests according to the PE board on which the target PE resides, the fourth resolving stage being implemented in said each cluster of PEs for resolving the bits of a route requesting signal according to the location of the target PE within a specified PE cluster, and the first and third resolving stages being implemented in said first and third switching stages respectively for resolving the cluster number of the target PE.

2. The network of claim 1 wherein resolution of bits of the data routing header involves a delay in said first and second switching stages, and said route-requesting signal includes first and second groups of rest bits respectively interposed after the stage-1 resolving bits and after the stage-2 resolving bits for allowing the network to stabilize from effects of the delay in resolving stage-1 and the stage-2 bits in said first and second switching stages.

3. A global router network for a massively parallel array of processing elements, the routing network comprising a plurality of data-routing stages, wherein each of said data-routing stages comprises:

a route requesting input wire (RRW-x) for receiving a route-requesting header signal;

a pipeline latch (612) having a data input terminal (D) and a data output terminal (Q);

a first tristate buffer (611) for selectively coupling the route request input wire (RRW-x) to the data input terminal of the pipeline latch (612);

a switching matrix (615) having a router header-in line (621x), horizontal data input lines (650x), vertical output lines (654Y) and switching cells (620) for selectively coupling any one of said horizontal input lines (650x) to one of the vertical output lines (654Y);

a second tristate buffer (652) for selectively coupling the output terminal (Q) of the pipeline latch (612) to said horizontal input line (650x) of the switching matrix (615) during a forward messagingmode;

a third tristate buffer (657) for selectively coupling said horizontal data line (650x) to the data input terminal (D) of the pipeline latch (612) during a reverse messaging mode; and a fourth tristate buffer (658) for selectively coupling the output terminal (Q) of the pipeline latch (612) to the route requesting wire (RRW-x) during the reverse messaging mode.

4. The interconnect network of claim 3 wherein each switching cell (620) comprises:

a route selecting switch (623) for selectively connecting its router header input line (621) either through a single inverter (624) or through a noninverting circuit (622, 624) to a horizontal output wire (625);

a wire-group request latch (630) having a request input terminal (D) and a request output terminal (Q);

gating means (629) for coupling a route requesting bit on the horizontal output line (625) to the request input terminal of the wire-group request latch (630 if the wire-group request latch has not been activated by a previous request bit, and for preventing further bits from entering the wire-group request latch if it has already been activated; and request granting means (631, 632) for receiving a request input signal (631a) from the wire-group request latch and granting said request by connecting (631c) a horizontal data wire (650) to a corresponding vertical data wire (641) if a vertical messaging wire (641) has not already been granted to another route requesting signal.

5. A method for routing data in a global router system between any one processor element (PE) of an array of processor elements (PEs) and any other PE of the array, comprising the steps of:

providing an interconnection network for establishing data routing paths between a set of source PEs and a set of target PEs;

furnishing said PEs with respectively parity identities having precomputed values based on the array addresses of the respective PEs;

generating route requesting signals to be propagated at least in part through said interconnection network from the set of source PEs to the set of target Pes for establishing data carrying routes through said interconnection network in accordance with address information in said route requesting signals, each of said route requesting signals including a protocol bit for indicating to said interconnection network the presence of a route requesting signal;

'generating parity bits respectively associated with said route requesting signals for propagating through said interconnection network to indicate respectively an odd or even parity of the addresses in said route requesting signals; and comparing in each PE of the set of target PEs receiving a parity bit the parity identity thereof with the received parity bit to indicate an error condition in the event the parity identity of said each PE and the parity bit received by said each PE are unequal.

6. A method as in claim 5, further comprising returning signals over said established data carrying routes rom the set of target PEs to the set of source PEs to indicate whether a correct set of routes is established in said interconnection network.

7. A method as in claim 6 wherein each of the returning signals indicating a correct route is included in a reverse acknowledge signal in accordance with a route close protocol.

8. A method as in claim 6 wherein each of the returning signals indicating a correct route is included in a reverse message body signal in accordance with a route reverse protocol.

9. A method as in claim 5, further comprising the steps of:

generating toggle bits respectively associated with said route requesting signals for propagating through said interconnection network, said toggle bits having a particular value; and detecting the values of said toggle bits after propagation through said interconnection network, an error condition being indicated in the event that one or more of said toggle bits is not equal to said particular value.

10. A method as in claim 5, wherein said route requesting signals include respective PE numbers, further comprising, for each of said PEs receiving a PE number through a route requesting signal, in parallel, the steps of:

comparing said received PE number with a PE identification number preassigned to said each PE to obtain a match signal indicative of whether said received PE number and said preassigned PE identification number match; and performing an AND operation with said match signal and the protocol bit received by said each PE to determine whether a valid data routing path is established.

11. In a parallel processor having an array of processor elements, an interconnection network for indirectly routing data from one set of the processor elements to another set of the processor elements comprising:

a first bidirectional latch having a set of first ports and a set of second ports;

first bidirectional routing path segments respectively connected to the first ports of the first latch, the first routing path segments including a first switch stage responsive to header data from the processor elements for configuring the first routing path segments;

second bidirectional routing path segments respectively connected to the second ports of the first latch, the second routing path segments including a second switch stage responsive to header data from the first switch stage for configuring the second routing path segments;

a second bidirectional latch having a set of first ports and a set of second ports, the first ports thereof being connected to the processor elements and the second ports thereof being respectively connected to the first routing path segments;

a third bidirectional latch having a set of first ports and a set of second ports, the first ports thereof being respectively connected to the second routing path segments, and the second ports thereof being connected to the processor elements;

third and fourth bidirectional routing path segments, wherein:

the first ports of the second bidirectional latch are respectively connected to the processor elements by the third bidirectional routing path segments; and the second ports of the third bidirectional latch are respectively connected to the processor elements by the fourth bidirectional routing path segments; and means for operating the first, second and third latches and the processor elements to transfer data between one set of the processor elements and another set of the processor elements in either direction along routing paths comprising the configured first, second, third and fourth routing path segments.

* * * * *